US012723221B2

(12) United States Patent
McGrane et al.

(10) Patent No.: US 12,723,221 B2
(45) Date of Patent: Sep. 1, 2026

(54) SOIL REMOVAL ON COTTON VIA TREATMENT IN THE RINSE STEP FOR ENHANCED CLEANING IN THE SUBSEQUENT WASH

(71) Applicant: ECOLAB USA INC., Saint Paul, MN (US)

(72) Inventors: Peter J. McGrane, Saint Paul, MN (US); Kaustav Ghosh, Saint Paul, MN (US); Sukhwan Soontravanich, Saint Paul, MN (US); Paige Mary Owens-Polta, Saint Paul, MN (US); Ashish Dhawan, Saint Paul, MN (US); Yiqing Chen, Saint Paul, MN (US); Carter M. Silvernail, Saint Paul, MN (US); Lee Monsrud, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 1064 days.

(21) Appl. No.: 17/645,525

(22) Filed: Dec. 22, 2021

(65) Prior Publication Data

US 2022/0195341 A1 Jun. 23, 2022

Related U.S. Application Data

(60) Provisional application No. 63/199,395, filed on Dec. 23, 2020.

(51) Int. Cl.

| | |
|---|---|
| ***B08B 3/04*** | (2006.01) |
| ***C11D 1/38*** | (2006.01) |

(Continued)

(52) U.S. Cl.

CPC ................ *C11D 3/30* (2013.01); *C11D 1/835* (2013.01); *C11D 3/0036* (2013.01); *C11D 3/373* (2013.01);

(Continued)

(58) Field of Classification Search

CPC .... C11D 1/38; C11D 1/40; C11D 1/62; C11D 1/66; C11D 1/72; C11D 1/835;

(Continued)

(56) References Cited

U.S. PATENT DOCUMENTS 4,448,810 A 5/1984 Westall
4,800,026 A 1/1989 Coffindaffer et al.

(Continued)

FOREIGN PATENT DOCUMENTS

CA 2001762 A1 4/1991
CA 2438773 C 12/2008

(Continued)

OTHER PUBLICATIONS

International Search Report and Written Opinion in PCT/US2021/064784, mailed May 10, 2022, 11 pages.

*Primary Examiner* — Brian P Mruk

(74) *Attorney, Agent, or Firm* — McKee, Voorhees & Sease, PLC

(57) ABSTRACT

The disclosure relates to compositions particularly suited for removing soils from textiles, in particular the removal of oily food soils, oily cosmetic soils, and industrial soils from textiles containing cotton, particularly those comprising one or more of surfactants, and cationic amines, or silicone compounds. Methods of making and using such compounds are also provided.

16 Claims, 28 Drawing Sheets

(51) Int. Cl.

| | |
|---|---|
| ***C11D 1/40*** | (2006.01) |
| ***C11D 1/62*** | (2006.01) |
| ***C11D 1/66*** | (2006.01) |
| ***C11D 1/72*** | (2006.01) |
| ***C11D 1/835*** | (2006.01) |
| ***C11D 3/00*** | (2006.01) |
| ***C11D 3/10*** | (2006.01) |
| ***C11D 3/26*** | (2006.01) |
| ***C11D 3/30*** | (2006.01) |
| ***C11D 3/37*** | (2006.01) |
| ***C11D 3/386*** | (2006.01) |
| *C11D 1/75* | (2006.01) |

(52) U.S. Cl.
CPC ................ *C11D 1/62* (2013.01); *C11D 1/721* (2013.01); *C11D 1/75* (2013.01); *C11D 2111/12* (2024.01)

(58) Field of Classification Search
CPC ......... C11D 3/0036; C11D 3/044; C11D 3/10; C11D 3/124; C11D 3/162; C11D 3/26; C11D 3/30; C11D 3/373; C11D 3/386; C11D 11/0017; C11D 17/0047; B08B 3/04
See application file for complete search history.

(56) References Cited

U.S. PATENT DOCUMENTS

| | | | | |
|---|---|---|---|---|
| 4,891,166 | A | 1/1990 | Schaefer et al. | |
| 5,314,748 | A | 5/1994 | Mazurek et al. | |
| 5,500,151 | A | 3/1996 | Cao et al. | |
| 5,593,611 | A | 1/1997 | Czech | |
| 5,668,102 | A | 9/1997 | Severns et al. | |
| 6,071,871 | A | 6/2000 | Gosselink et al. | |
| 6,136,215 | A | 10/2000 | Evans et al. | |
| 7,655,609 | B2 | 2/2010 | Torres et al. | |
| 10,954,475 | B2 * | 3/2021 | Walters | D06L 1/12 |
| 10,954,476 | B2 * | 3/2021 | Stokes | D06L 1/12 |
| 11,718,813 | B2 * | 8/2023 | Anderson | A01N 33/04<br>510/383 |
| 2017/0079266 | A1 * | 3/2017 | Olson | C07C 211/14 |
| 2017/0121650 | A1 | 5/2017 | Lundberg et al. | |
| 2018/0208875 | A1 * | 7/2018 | Man | C11D 1/65 |
| 2018/0343859 | A1 | 12/2018 | Jiang et al. | |
| 2019/0177661 | A1 * | 6/2019 | Walters | C11D 3/08 |

FOREIGN PATENT DOCUMENTS

| | | | |
|---|---|---|---|
| WO | 9732917 | A1 | 9/1997 |
| WO | 0071806 | A1 | 11/2000 |
| WO | 0071807 | A1 | 11/2000 |
| WO | 0123394 | A1 | 4/2001 |
| WO | 0218528 | A1 | 3/2002 |
| WO | 03097778 | A1 | 11/2003 |
| WO | 2013062127 | A1 | 5/2013 |
| WO | 2022029421 | A1 | 2/2022 |

* cited by examiner

A. 1x
B. 2x
C. 1x + 500 ppm Triamine
D. 1x + 500 ppm Triamine
E. 1x + 500 ppm Diamine
F. 1x + 500 ppm Ether diamine
G. 1x + 500 ppm C10-C16 Alcohol Alkoxylate
H. 1x + 500 ppm Lauryl Dimethyl Amine Oxide
I. 1x + 500 ppm Nonylphenol Ethoxylate
J. 1x + 500 ppm Nonionic/Cationic Surfactant Blend
K. 1x + 500 ppm Alkyl Polyethylene Glycol Ether (3EO)
L. 1x + 500 ppm 9EO Alcohol Ethoxylate A. 1x
B. 2x
C. 1x + 50 ppm PDMS + 100 ppm Lauryl Dimethyl Amine Oxide presoak
D. 1x + 50 ppm PDMS presoak
E. 1x + 25 ppm PDMS presoak
F. 1x + 50 ppm PDMS + 200 ppm Lauryl Dimethyl Amine Oxide presoak
G. 1x + 50 ppm PDMS + 50 ppm Lauryl Dimethyl Amine Oxide presoak
H. 1x + 25 ppm PDMS + 50 Lauryl Dimethyl Amine Oxide + 50 ppm Quat S HF presoak

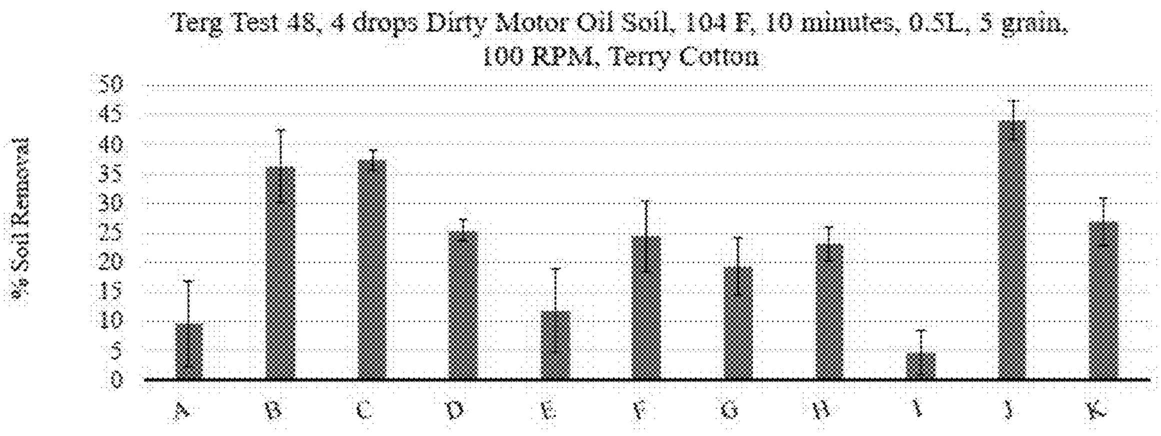

A. 1x
B. 2x
C. 1x + 50 ppm PDMS + 100 ppm Lauryl Dimethyl Amine Oxide presoak
D. 1x + 50 ppm PDMS presoak
E. 1x + 25 ppm PDMS presoak
F. 1x + 50 ppm PDMS + 200 ppm Lauryl Dimethyl Amine Oxide presoak
G. 1x + 50 ppm PDMS + 50 ppm Lauryl Dimethyl Amine Oxide presoak
H. 1x + 50 ppm Lauryl Dimethyl Amine Oxide + 100 ppm Quat S HF + 10 ppm PDMS
I. 1x + 50 ppm Lauryl Dimethyl Amine Oxide + 200 ppm PDMS
J. 1x + 400 ppm Lauryl Dimethyl Amine Oxide + 100 ppm PDMS
K. 1x + 50 ppm Lauryl Dimethyl Amine Oxide + 25 ppm PDMS

*Fig. 4*

A. 1x
B. 2x
C. 1x+ 50 ppm Triamine + 50 ppm Quat 7 presoak
D. 1x+ 50 ppm Lauryl Dimethyl Amine Oxide + 50 ppm Quat 7 presoak
E. 1x+ 50 ppm Triamine + 50 ppm Quat 4 presoak
F. 1x+ 50 ppm Lauryl Dimethyl Amine Oxide + 50 ppm Quat 4 presoak
G. 1x + 50 ppm Triamine presoak A. 1x
B. 2x
C. 1x+ 50 ppm Triamine + 50 ppm Quat 7 presoak
D. 1x+ 50 ppm Lauryl Dimethyl Amine Oxide + 50 ppm Quat 7 presoak
E. 1x+ 50 ppm Triamine + 50 ppm Quat 4 presoak
F. 1x+ 50 ppm Lauryl Dimethyl Amine Oxide + 50 ppm Quat 4 presoak A. 1x
B. 2x
C. 1x+ 50 ppm Triamine + 50 ppm Quat 7 presoak
D. 1x+ 50 ppm Lauryl Dimethyl Amine Oxide + 50 ppm Quat 7 presoak
E. 1x+ 50 ppm Triamine + 50 ppm Quat 4 presoak
F. 1x+ 50 ppm Lauryl Dimethyl Amine Oxide + 50 ppm Quat 4 presoak
G. 1x + 50 ppm Triamine presoak

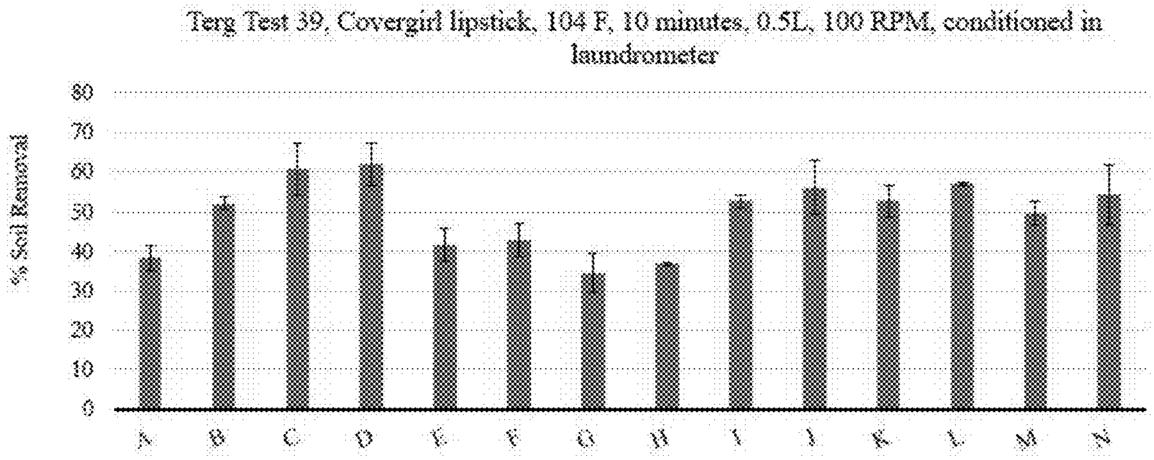

A. 1x
B. 2x
C. 100 ppm Triamine -air
D. 100 ppm Triamine - tumble
E. 100 ppm Ether diamine - air
F. 100 ppm Ether diamine - tumble
G. 100 ppm C12-C14 alcohol ethoxylate (7EO) - air
H. 100 ppm C12-C14 alcohol ethoxylate (7EO) - tumble
I. 50 ppm Quat 4 + 50 ppm Triamine - air
J. 50 ppm Quat 4 + 50 ppm Triamine - tumble
K. 50 ppm Quat 4 + 50 ppm Lauryl Dimethyl Amine Oxide - air
L. 50 ppm Quat 4 + 50 ppm Lauryl Dimethyl Amine Oxide - tumble
M. 900 ppm pressed softener - air
N. 900 ppm pressed softener - tumble

*Fig. 23*

SOIL REMOVAL ON COTTON VIA TREATMENT IN THE RINSE STEP FOR ENHANCED CLEANING IN THE SUBSEQUENT WASH

CROSS-REFERENCE TO RELATED APPLICATION

This application claims priority under 35 U.S.C. § 119 to Provisional Application U.S. Ser. No. 63/199,395, filed on Dec. 23, 2021, which is herein incorporated by reference in its entirety including without limitation, the specification, claims, and abstract, as well as any figures, tables, or examples thereof.

TECHNICAL FIELD

This disclosure relates to methods and compositions suitable for removing soils from textiles, particularly textiles containing cotton or similar fibers. In particular, the methods and compositions are effective at removing soils such as cosmetic soils, oily food soils, and oily industrial soils, among others from textiles.

TECHNICAL BACKGROUND

Textiles contain a variety of different fibers, including natural, manmade, or synthetic fibers. Natural fibers are generally derived from plants or animals. For example, protein-based natural fibers include wool and silk, while cellulosic fibers include cotton and linen. Manmade fibers such as rayon and acetate are generally manufactured from regenerated cellulose. Synthetic fibers include, for example, nylon, olefin, polyester, acrylic, and corterra. Cotton in particular is one of the most popular fibers used in textiles. Cotton can be combined or blended with other fibers to create blends that dry easily, demonstrate excellent elasticity, and feel soft. Cotton-containing textiles also demonstrate high absorbency, which is a desirable property for use but also means cotton stains easily. Additionally, cotton has poor resilience and poor abrasion resistance. The poor resiliency and abrasion resistance combined with harsher cleaning products typically required to remove soil from cotton-containing textiles result in a short lifespan and high replacement rate.

These challenges are only exacerbated in the presence of stubborn soils such as cosmetic soils, oily food soils, and oily industrial soils. In the textile industry, a significant portion of textile replacement comes as a result of stains, such as cosmetic soils, oily food soils, and oily industrial stains, that simply cannot be fully removed from the fabric. Thus, despite various existing cleaning compositions and methods there remains a long-standing need to improve stain removal of cotton-containing textiles so that the replacement rate of fabrics can be reduced, and the textiles can remain in use for a longer time.

Further, many traditional fabric softeners harm, degrade, or provide other problems with the textiles. For example, most fitness apparel is designed to wick away moisture from the body. However, many fabric softening agents coat the textile surface and actually lock sweat into the fabric. Similarly, fabric softening agents can coat the surface of absorbent textiles such as towels, washcloths, and the like, substantially reducing wicking ability. Therefore, there remains a need to develop new fabric softening agents which do not interfere with wicking ability or otherwise harm the textile treated.

A key element of fabric softening and cleaning compounds is their ability to be deposited upon the surface of a textile and remain on the textile surface for one or more subsequent wash cycles. Particle size along with vesicle formation and vesicle distribution are indicative of a composition's ability to deposit on and adhere to textile surfaces. In particular, it is desirable to provide a composition having a more uniform vesicle distribution and a particle size of between about 50 nm to 100 μm. Consequently, there remains a need to develop fabric softening and cleaning compositions which exhibit uniform vesicle distribution and a small particle size of between about 50 nm to about 100 μm.

Accordingly, it is an objective of the disclosure to provide cleaning methods and compositions that are effective at removing a variety of soils, including industrial soils, oily food soils, and cosmetic soils from a variety of textiles, including cotton-containing textiles.

A further object of the disclosure is to provide compositions which soften the textile in addition to removing soils, and particularly to soften the textiles without reducing wicking capability or otherwise damaging the textile.

A still further object of the disclosure is to provide compositions which exhibit uniform vesicle distribution and a small particle size, thereby facilitating composition deposition and adherence to the textile surface.

Another object of the disclosure is to methods and compositions is to provide cleaning methods and compositions that reduce the replacement rate of textiles.

Other objects, advantages and features of this disclosure will become apparent from the following specification taken in conjunction with the accompanying figures.

BRIEF SUMMARY

An advantage of the methods and compositions disclosed herein is that they are effective at cleaning cotton-containing textiles to remove difficult stains. It is an advantage of the methods and compositions that even cosmetic soils, oily food soils, and oily industrial soils are effectively removed. Still a further advantage of the methods and compositions is that by effectively removing difficult stains, such as cosmetic soils, oily food soils, and oily industrial soils, the replacement of cotton-containing textiles is reduced.

In an embodiment, textile treatment compositions are provided, wherein the compositions comprise a branched cationic amine surfactant comprising N, N-bis (3-aminopropyl) dodecylamine; N1,N1,N3-tris(3-aminopropyl)-N3-dodecylpropane-1,3-diamine; N1,N1-bis(3-aminopropyl)-N3-dodecylpropane-1,3-diamine; N1-(3-aminopropyl)-N3-dodecylpropane-1,3-diamine; N-dodecylpropane-1,3-diamine; isotridecyloxypropyl-1,3-diaminopropane; N1-(3-(tridecyl-(branched)-alkyloxy)propyl)propane-1,3-diamine; N1,N1,N3-tris(3-aminopropyl)-N3-octadecyl-1,3-propanediamine; N1,N1,N3-tris(3-aminopropyl)-N3-dodecylpropane-1,3-diamine; N-(3-aminopropyl)-N-octadecyl-N-octadecyl propane-1,3-diamine; or a combination thereof; one or more additional surfactants, wherein the one or more additional surfactants comprises a nonionic surfactant, semi-polar nonionic surfactant, a cationic surfactant, or a combination thereof; and a deposition aid comprising a quaternary ammonium compound, a silicone compound, an amine epoxide adduct, or a combination thereof; wherein a surface of a textile treated with the composition provides improved soil removal after subsequent soiling and washing compared to a textile not treated with the composition.

In an embodiment, the textile treatment composition is deposited on a textile surface the textile treatment composition removes soil from the textile surface for more than one wash cycle.

In an embodiment, the nonionic surfactant comprises a fatty alcohol polyglycol ether, an alcohol ethoxylate, an alcohol alkoxylate, an EO/PO block copolymer, or a combination thereof. According to an embodiment, the silicone compound is a compound according to the formula:

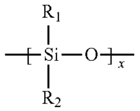

wherein $R_1$ and $R_2$ are each a $C_1$-$C_{10}$ alkyl, alkenyl radical, phenyl, substituted alkyl, or substituted phenyl group; and wherein x is a number from 50 to 300,000; and wherein the substituted alkyl or substituted phenyl are substituted with a halogen, amino group, hydroxyl group, quaternary ammonium group, polyalkoxy group, carboxyl group, or nitro group In an embodiment, the semi-polar nonionic surfactant is dimethyltetradecylamine oxide, dodecyldimethylamine oxide, tridecyldimethylamine oxide, tetradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl)amine oxide, 3,6,9-triocta-decyldimethylamine oxide, 3-dodecoxy-2-hydroxypropyldi-(2-hydroxyethyl)amine oxide, or a combination thereof.

In an embodiment, the textile treatment composition further comprises an alkalinity source. According to a preferred embodiment, the alkalinity source is an alkali metal carbonate, an alkali metal hydroxide, a metal silicate, a metal borate, or a combination thereof.

In an embodiment, the quaternary ammonium compound of the textile treatment composition comprises N,N-diethoxylated-N-coco-N-methylammonium chloride, di(hydrogenated) tallow dimethyl ammonium methyl sulfate ester quaternary ammonium, C12-C16 alkyl dimethyl benzyl ammonium chloride, decyl dimethyl octyl ammonium chloride, didecyl dimethyl ammonium chloride, dimethyl dioctyl ammonium chloride, N,N'-di(alkylcarboxyethyl)-N-hydroxyethyl-N-methylammonium methyl sulfate, or a combination thereof.

According to an embodiment, the composition comprises between about 30 wt. % to about 55 wt. % of the branched cationic amine surfactant, the one or more additional surfactants are present in an amount of between about 10 wt. % to about 70 wt. % of the one or more additional surfactants, between about 1 wt. % to about 75 wt. % of the deposition aid. In a further embodiment, the textile treatment composition is diluted to form a use solution, and wherein the branched cationic amine surfactant is present in the use solution in an amount of between about 50 ppm to about 1000 ppm.

Treated textiles are also provided, wherein the textile comprises a textile and a textile treatment composition, wherein the textile treatment composition is deposited on the surface of the textile and the deposited textile treatment composition removes soil from the surface for more than one wash cycle.

According to an embodiment, the deposited textile treatment composition remains upon the surface of the textile for more than one wash cycle.

In some embodiments, the textile treatment composition comprises a branched cationic amine surfactant, one or more additional surfactants, and a deposition aid; wherein the textile treatment composition is deposited on a textile surface; and wherein the textile treatment composition removes soil from the textile surface for more than one wash cycle. In an embodiment, the branched cationic amine surfactant comprises N, N-bis (3-aminopropyl) dodecylamine; N1,N1,N3-tris(3-aminopropyl)-N3-dodecylpropane-1,3-diamine; N1,N1-bis(3-aminopropyl)-N3-dodecylpropane-1,3-diamine; N1-(3-aminopropyl)-N3-dodecylpropane-1,3-diamine; N-dodecylpropane-1,3-diamine; isotridecyloxypropyl-1,3-diaminopropane; N1-(3-(tridecyl-(branched)-alkyloxy)propyl)propane-1,3-diamine; N1,N1,N3-tris(3-aminopropyl)-N3-octadecyl-1,3-propanediamine; N1,N1,N3-tris(3-aminopropyl)-N3-dodecylpropane-1,3-diamine; N-(3-aminopropyl)-N-octadecyl-N-octadecyl propane-1,3-diamine; or a combination thereof. In a further embodiment, the one or more additional surfactants comprises nonionic surfactant, semi-polar nonionic surfactant, a cationic surfactant, or a combination thereof.

In a still further embodiment, the deposition aid comprises a quaternary ammonium compound, a silicone compound, an amine epoxide adduct, or a combination thereof. In a further embodiment, the nonionic surfactant comprises a fatty alcohol polyglycol ether, an alcohol ethoxylate, an alcohol alkoxylate, an EO/PO block copolymer, or a combination thereof; and the silicone compound is a compound according to the formula:

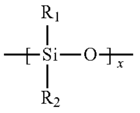

wherein $R_1$ and $R_2$ are each a $C_1$-$C_{10}$ alkyl, alkenyl radical, phenyl, substituted alkyl, or substituted phenyl group; and wherein x is a number from 50 to 300,000; wherein the substituted alkyl or substituted phenyl are substituted with a halogen, amino group, hydroxyl group, quaternary ammonium group, polyalkoxy group, carboxyl group, or nitro group.

In some embodiments, the textile treatment composition of the textile further comprises an alkalinity source, wherein the alkalinity source is an alkali metal carbonate, an alkali metal hydroxide, a metal silicate, a metal borate, or a combination thereof. In an embodiment, the quaternary ammonium compound of the textile comprises N,N-diethoxylated-N-coco-N-methylammonium chloride, di(hydrogenated) tallow dimethyl ammonium methyl sulfate ester quaternary ammonium, C12-C16 alkyl dimethyl benzyl ammonium chloride, decyl dimethyl octyl ammonium chloride, didecyl dimethyl ammonium chloride, dimethyl dioctyl ammonium chloride, N,N'-di(alkylcarboxyethyl)-N-hydroxyethyl-N-methylammonium methyl sulfate, or a combination thereof.

According to an embodiment, the textile is treated with between about 50 ppm to about 1000 ppm of the textile treatment composition.

Further provided are methods of removing soil from a textile, wherein the method comprises applying a textile treatment composition to a surface of the textile; and washing the textile treated with the textile treatment composition to remove the soil from the textile.

In an embodiment, the textile treatment composition used in the method comprises a branched cationic amine surfactant comprising N, N-bis (3-aminopropyl) dodecylamine; N1,N1,N3-tris(3-aminopropyl)-N3-dodecylpropane-1,3-diamine; N1,N1-bis(3-aminopropyl)-N3-dodecylpropane-1,3-diamine; N1-(3-aminopropyl)-N3-dodecylpropane-1,3-diamine; N-dodecylpropane-1,3-diamine; isotridecyloxypropyl-1,3-diaminopropane; N1-(3-(tridecyl-(branched)-alkyloxy)propyl)propane-1,3-diamine; N1,N1,N3-tris(3-aminopropyl)-N3-octadecyl-1,3-propanediamine; N1,N1,N3-tris(3-aminopropyl)-N3-dodecylpropane-1,3-diamine; N-(3-aminopropyl)-N-octadecyl-N-octadecyl propane-1,3-diamine; or a combination thereof; one or more additional surfactants, wherein the one or more additional surfactants comprises a nonionic surfactant, semi-polar nonionic surfactant, a cationic surfactant, or a combination thereof and a deposition aid comprising a quaternary ammonium compound, a silicone compound, an amine epoxide adduct, or a combination thereof.

In an embodiment, the method of removing soil from the textile occurs during a wash cycle, wherein the wash cycle comprises a pre-soak phase, a wash phase, a rinsing phase, a finishing phase, and an extraction phase. In a further embodiment, the textile treatment composition is applied to the textile during the pre-soak phase or the finishing phase.

According to an embodiment, the method of removing soil from the textile removes cosmetic and oily soils from the textile. In an embodiment, the textile is a textile from the restaurant industry or hospitality industry. In a further embodiment, the textile is a tablecloth, napkin, uniform, apron, washcloth, dishcloth, mop, bedsheet, pillowcase, bedspread, towel, or robe.

While multiple embodiments are disclosed, still other embodiments of the present disclosure will become apparent based on the detailed description, which shows and describes illustrative embodiments of the disclosure. Each feature of the technology described herein may be combined with any one or more other features of the disclosure, e.g., the methods may be used with any elements of compositions described herein. Accordingly, the drawings and detailed description are to be regarded as illustrative in nature and not restrictive.

BRIEF DESCRIPTION OF THE FIGURES

FIG. 4 depicts the results of tergotometer tests assessing the extent to which compositions comprising a silicone and semi-polar nonionic surfactant remove industrial/motor oil soils.

FIG. 23 shows the results of a tergotometer test assessing soil removal of Covergirl lipstick cosmetic soil, wherein the samples are conditioned in the laundrometer.

Figure 1A:
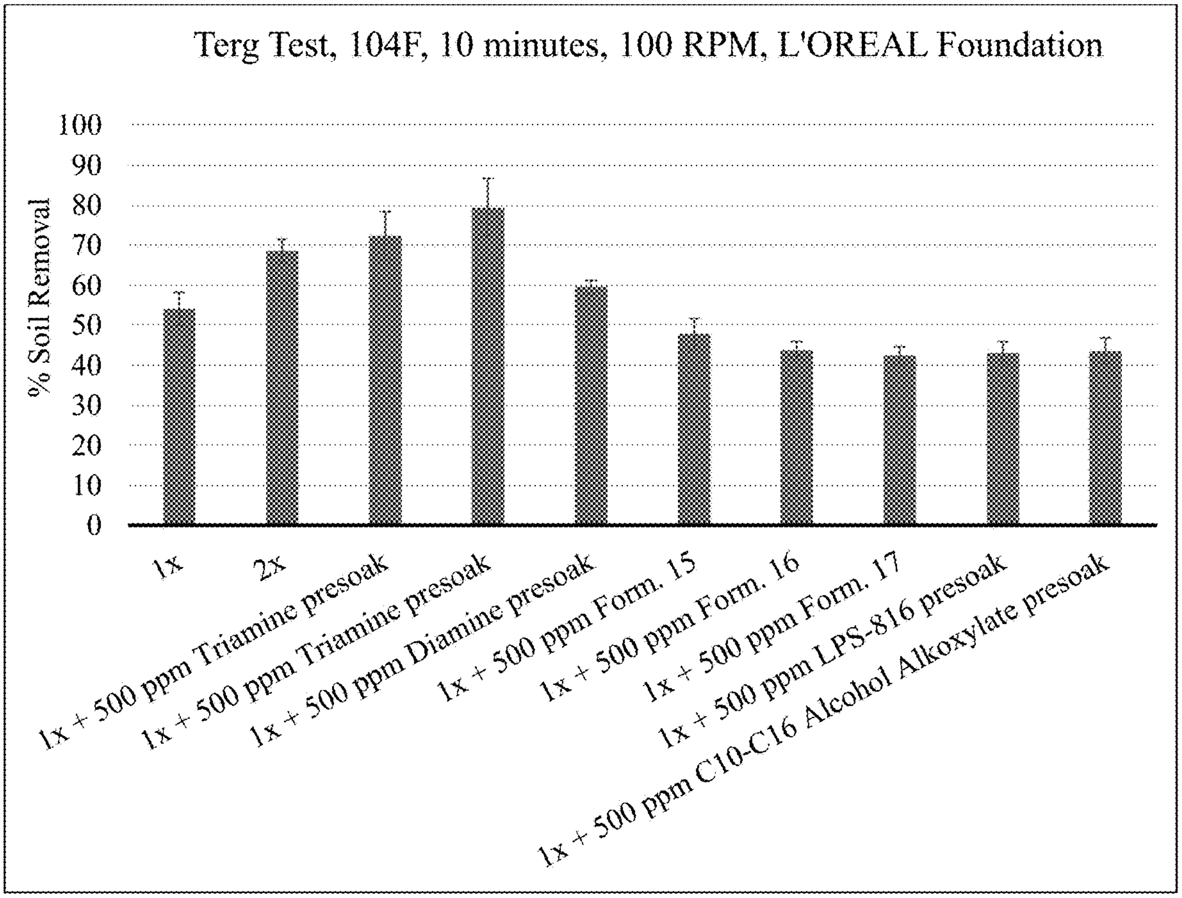
FIGS. 1A-1D show the results of tergotometer tests for cotton terry swatches soiled with various cosmetic soils, including foundations, lipstick, and mascara.

Various embodiments of the present disclosure will be described in detail with reference to the drawings, wherein like reference numerals represent like parts throughout the several views. Reference to various embodiments does not limit the scope of the disclosure. Figures represented herein are not limitations to the various embodiments according to the disclosure and are presented for example illustration of the disclosure.

DETAILED DESCRIPTION OF THE PREFERRED EMBODIMENT

The present disclosure relates to methods and compositions for cleaning cotton-containing textiles. The cleaning methods and compositions have many advantages over existing cleaning compositions for use in cleaning cotton-containing textiles. For example, the cleaning compositions provide improved cleaning of cosmetic soils, oily food soils, and oily industrial soils, particularly when cleaning cotton textiles. Further, the methods and compositions reduce the damage and wear to textiles due to retained soils, thereby reducing the replacement of cotton-containing textiles. This is beneficial for many reasons. For example, time and money spent seeking to remove the retained stains is reduced. Further, money is saved by reducing the necessary replacement of cotton-containing textiles. Additionally, it provides an environmental benefit by reducing waste of rejected linens.

The embodiments of this disclosure are not limited to particular types of cotton-containing textiles, which can vary. It is further to be understood that all terminology used herein is for the purpose of describing particular embodiments only and is not intended to be limiting in any manner or scope. For example, as used in this specification and the appended claims, the singular forms "a," "an" and "the" can include plural referents unless the content clearly indicates otherwise. Unless indicated otherwise, "or" can mean any one alone or any combination thereof, e.g., "A, B, or C" means the same as any of A alone, B alone, C alone, "A and B," "A and C," "B and C" or "A, B, and C." Further, all units, prefixes, and symbols may be denoted in its SI accepted form.

Numeric ranges recited within the specification are inclusive of the numbers defining the range and include each integer within the defined range. Throughout this disclosure, various aspects of this disclosure are presented in a range format. It should be understood that the description in range format is merely for convenience and brevity and should not be construed as an inflexible limitation on the scope of the disclosure. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾ This applies regardless of the breadth of the range.

So that the present disclosure may be more readily understood, certain terms are first defined. Unless defined otherwise, all technical and scientific terms used herein have the same meaning as commonly understood by one of ordinary skill in the art to which embodiments of the disclosure pertain. Many methods and materials similar, modified, or equivalent to those described herein can be used in the practice of the embodiments of the present disclosure without undue experimentation, the preferred materials and methods are described herein. In describing and claiming the embodiments of the present disclosure, the following terminology will be used in accordance with the definitions set out below.

The term "about," as used herein, refers to variation in the numerical quantity that can occur, for example, through typical measuring techniques and equipment, with respect to any quantifiable variable, including, but not limited to, mass, volume, time, temperature, pH, reflectance, whiteness, etc. Further, given solid and liquid handling procedures used in the real world, there is certain inadvertent error and variation that is likely through differences in the manufacture, source, or purity of the ingredients used to make the compositions or carry out the methods and the like. The term "about" also encompasses amounts that differ due to different equilibrium conditions for a composition resulting from a particular initial mixture. The term "about" also encompasses these variations. Whether or not modified by the term "about," the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur, or oxygen. Heterocyclic groups may be saturated or unsaturated. Example heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

As used herein, the term "cleaning" refers to a method used to facilitate or aid in soil removal, bleaching, and any combination thereof.

The terms "dimensional stability" and "dimensionally stable" as used herein, refer to a solid composition having a growth exponent of less than about 3% in any dimension.

The term "laundry" refers to items or articles that are cleaned in a laundry washing machine. In general, laundry refers to any item or article made from or including textile materials, woven fabrics, non-woven fabrics, and knitted fabrics. Preferably, the textile materials contain cotton fibers. The textile materials can comprise natural or synthetic fibers. Further, the textile materials can comprise additional non-cotton fibers such as silk fibers, linen fibers, polyester fibers, polyamide fibers including nylon, acrylic fibers, acetate fibers, and blends thereof including, but not limited, cotton and polyester blends. The fibers can be treated or untreated. Example treated fibers include those treated for flame retardancy. It should be understood that the term “linen” is often used to describe certain types of laundry items including bed sheets, pillowcases, towels, table linen, tablecloth, bar mops and uniforms.

As used herein, the term “polymer” generally includes, but is not limited to, homopolymers, copolymers, such as for example, block, graft, random and alternating copolymers, terpolymers, and higher “x”mers, further including their derivatives, combinations, and blends thereof. Furthermore, unless otherwise specifically limited, the term “polymer” shall include all possible isomeric configurations of the molecule, including, but are not limited to isotactic, syndiotactic, and random symmetries, and combinations thereof. Furthermore, unless otherwise specifically limited, the term “polymer” shall include all possible geometrical configurations of the molecule.

“Soil” or “stain” refers to a non-polar oily substance which may or may not contain particulate matter such as mineral clays, sand, natural mineral matter, carbon black, graphite, kaolin, environmental dust, colorant, dyes, polymers, and oils. The terms “soil” and “stain” include, but are not limited to, cosmetic stains.

As used herein, a solid cleaning composition refers to a cleaning composition in the form of a solid such as a powder, a particle, an agglomerate, a flake, a granule, a pellet, a tablet, a lozenge, a puck, a briquette, a brick, a solid block, a unit dose, or another solid form known to those of skill in the art. The term “solid” refers to the state of the cleaning composition under the expected conditions of storage and use of the solid cleaning composition. In general, it is expected that the cleaning composition will remain in solid form when exposed to temperatures of up to about 100° F. and greater than about 120° F. A cast, pressed, or extruded “solid” may take any form including a block. When referring to a cast, pressed, or extruded solid it is meant that the hardened composition will not flow perceptibly and will substantially retain its shape under moderate stress or pressure or mere gravity, as for example, the shape of a mold when removed from the mold, the shape of an article as formed upon extrusion from an extruder, and the like. The degree of hardness of the solid cast composition can range from that of a fused solid block, which is relatively dense and hard, for example, like concrete, to a consistency characterized as being malleable and sponge-like, similar to caulking material. In embodiments of the disclosure, the solid compositions can be further diluted to prepare a use solution or added directly to a cleaning application, including, for example, a laundry machine.

As used herein, the term “substantially free” refers to compositions completely lacking the component or having such a small amount of the component that the component does not affect the performance of the composition. The component may be present as an impurity or as a contaminant and shall be less than 0.5 wt. %. In another embodiment, the amount of the component is less than 0.1 wt. % and in yet another embodiment, the amount of component is less than 0.01 wt. %.

As used herein the terms “use solution,” “ready to use,” or variations thereof refer to a composition that is diluted, for example, with water, to form a use composition having the desired components of active ingredients for cleaning. For reasons of economics, a concentrate can be marketed, and an end user can dilute the concentrate with water or an aqueous diluent to a use solution.

The term “weight percent,” “wt. %,” “percent by weight,” “% by weight,” and variations thereof, as used herein, refer to the concentration of a substance as the weight of that substance divided by the total weight of the composition and multiplied by 100. It is understood that, as used here, “percent,” “%,” and the like are intended to be synonymous with “weight percent,” “wt. %,” etc.

As used herein, the term “antiredeposition” or “antiredeposition agent” refers to a compound that helps keep soil suspended in water instead of redepositing onto the article being cleaned. Antiredeposition agents are useful in reducing redepositing of the removed soil onto the surface being cleaned.

As used herein, the term “cleaning” refers to a method used to facilitate, or a composition used in, soil removal, bleaching, microbial population reduction, rinsing, pretreating, post-treating, or any combination thereof.

The term “commercially acceptable cleaning performance” refers generally to the degree of cleanliness, extent of effort, or both that a typical consumer would expect to achieve or expend when using a cleaning product or cleaning system to address a typical soiling condition on a typical substrate. This degree of cleanliness may, depending on the particular cleaning product and particular substrate, correspond to a general absence of visible soils, or to some lesser degree of cleanliness. Cleanliness may be evaluated in a variety of ways depending on the particular cleaning product being used (e.g., textile detergent) and the particular hard or soft surface being cleaned (e.g., textile, fabric, and the like), and normally may be determined using generally agreed industry standard tests or localized variations of such tests. In the absence of such agreed industry standard tests, cleanliness may be evaluated using the test or tests already employed by a manufacturer or seller to evaluate the cleaning performance of its phosphorus-containing cleaning products sold in association with its brand.

As used herein, the term “microorganism” refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term “microbe” is synonymous with microorganism.

The term “substantially similar cleaning performance” refers generally to achievement by a substitute cleaning product or substitute cleaning system of generally the same degree (or at least not a significantly lesser degree) of cleanliness or with generally the same expenditure (or at least not a significantly lesser expenditure) of effort, or both.

As used herein, the term “soil” refers to polar or non-polar organic or inorganic substances including, but not limited to carbohydrates, proteins, fats, oils, and the like. These substances may be present in their organic state or complexed to a metal to form an inorganic complex. Soils are also referring to the more specific lip cosmetic soils described herein.

The methods, systems, apparatuses, and compositions disclosed herein may comprise, consist essentially of, or consist of the components and ingredients described herein as well as other ingredients not described herein. As used herein, “consisting essentially of” means that the methods, systems, apparatuses, and compositions may include additional steps, components, or ingredients, but only if the additional steps, components, or ingredients do not materially alter the basic and novel characteristics of the claimed methods, systems, apparatuses, and compositions.

It should also be noted that, as used in this specification and the appended claims, the term "configured" describes a system, apparatus, or other structure that is constructed or configured to perform a particular task or adopt a particular configuration. The term "configured" can be used interchangeably with other similar phrases such as arranged and configured, constructed, and arranged, adapted, and configured, adapted, constructed, manufactured, and arranged, and the like.

Compositions

Example ranges of the cationic amine compositions are shown in Tables 1 and 2A-2C below in weight percentage of the solid or liquid compositions, including both concentrate and ready-to-use compositions.

TABLE 1

Silicone Surfactant Package

| Material | First Example Range wt. % | Second Example Range wt. % | Third Example Range wt. % | Fourth Example Range wt. % |
|---|---|---|---|---|
| One or More Silicone Compounds | 0.0001-99 | 0.005-95 | 0.1-50 | 10-25 |
| One or More Surfactants | 0-99 | 15-90 | 45-90 | 55-80 |
| Additional Functional Ingredients | 0-25 | 0-20 | 0-10 | 0-5 |

TABLE 2A

Cationic Amine and a Deposition Aid

| Material | First Example Range wt. % | Second Example Range wt. % | Third Example Range wt. % |
|---|---|---|---|
| Cationic Amine | 0.0005-50 | 0.001-30 | 0.005-20 |
| Deposition Aid (e.g., Quaternary Ammonium, Amine Epoxide Adduct, Silicone) | 1-95 | 10-80 | 20-75 |
| Additional Functional Ingredients | 0-25 | 0-20 | 0-10 |

TABLE 2B

Cationic Amine with a Surfactant Package

| Material | First Example Range wt. % | Second Example Range wt. % | Third Example Range wt. % |
|---|---|---|---|
| Cationic Amine | 0.0005-50 | 0.001-30 | 0.005-20 |
| Nonionic Surfactant | 10-90 | 10-75 | 10-60 |
| Cationic Surfactant | 5-90 | 10-75 | 10-60 |
| Semi-Polar Nonionic Surfactant | 5-80 | 10-60 | 10-50 |
| Additional Functional Ingredients | 0-25 | 0-20 | 0-10 |

TABLE 2C

Cationic Amine, Amine Epoxide Adduct, or Quaternary Ammonium Composition

| Material | Ex. 1 (wt. %) | Ex. 2 (wt. %) | Ex. 3 (wt. %) | Ex. 4 (wt. %) | Ex. 5 (wt. %) | Ex. 6 (wt. %) | Ex. 7 (wt. %) |
|---|---|---|---|---|---|---|---|
| Quaternary Ammonium Compound - Dialkyl Quat | | 45-55 | | | 75-85 | 45-55 | |

TABLE 2C-continued

| Cationic Amine, Amine Epoxide Adduct, or Quaternary Ammonium Composition | | | | | | | |
|---|---|---|---|---|---|---|---|
| Material | Ex. 1 (wt. %) | Ex. 2 (wt. %) | Ex. 3 (wt. %) | Ex. 4 (wt. %) | Ex. 5 (wt. %) | Ex. 6 (wt. %) | Ex. 7 (wt. %) |
| Quaternary Ammonium Compound - Ester Quat | 45-55 | | | 55-65 | | | |
| First Amine Epoxide Adduct | | | 70-80 | | | | |
| Cationic Amine | 45-55 | | | | | 30-40 | 30-55 |
| Surfactant(s) | | | | | 15-25 | 10-20 | 10-70 |
| Second Amine Epoxide Adduct | | | 20-30 | | | | |
| Silicone Compound(s) | | | | | | | 0-20 |
| Additional Functional Ingredients (e.g., water. alkalinity source, etc.) | Remainder | Remainder | Remainder | Remainder | Remainder | Remainder | Remainder |

In some instances, the cationic amine compositions of Tables 1-2 are combined with a cleaning composition, for example a textile detergent. This base detergent composition will generally include one or more alkalinity sources and surfactants to facilitate soil removal and one or more builders or chelating agents to prevent scale formation or combat hard water conditions. An example of a suitable base detergent composition is provided in Table 3 below. The cationic amine composition, when combined with a base detergent composition (as in Table 3), is generally referred to herein as a "cleaning composition" or "textile cleaning composition."

TABLE 3

| Base Detergent Composition | | | |
|---|---|---|---|
| Material | First Example Range wt. % | Second Example Range wt. % | Third Example Range wt. % |
| Acrylic Acid Polymer | 0.1-15 | 0.1-10 | 1-10 |
| Surfactants | 10-99 | 20-90 | 50-90 |
| Additional Polymer(s) | 0.1-15 | 1-10 | 1-5 |
| Stabilizing Agents (e.g., solvents) | 1-50 | 5-50 | 10-50 |
| Alkalinity Source | 0-99 | 0-95 | 0-90 |
| Chelant | 0-50 | 0.1-30 | 0.1-20 |

The compositions can be provided in liquid, solid, paste, or gel forms used as part of a prewash, main wash, souring step, or other step(s). The liquid compositions or may be diluted to form use compositions, as well as ready-to-use compositions. In general, a concentrate refers to a composition that is intended to be diluted with water to provide a use solution that contacts an object to provide the desired cleaning, rinsing, or the like. The cleaning composition that contacts the articles to be washed can be referred to as a concentrate or a use composition (or use solution) dependent upon the formulation employed in methods. It should be understood that the concentration of the cationic amine compound and other components will vary depending on whether the cleaning composition is provided as a concentrate or as a use solution.

A use solution may be prepared from the concentrate by diluting the concentrate with water at a dilution ratio that provides a use solution having desired detersive properties. The water that is used to dilute the concentrate to form the use composition can be referred to as water of dilution or a diluent and can vary from one location to another. The typical dilution factor is between approximately 1 and approximately 10,000 but will depend on factors including water hardness, the amount of soil to be removed and the like. In an embodiment, the concentrate is diluted at a ratio of between about 1:10 and about 1:10,000 concentrate to water, inclusive of all integers with this range, e.g., 1:50, 1:100, 1:1,000, and the like. Particularly, the concentrate is diluted at a ratio of between about 1:100 and about 1:5,000 concentrate to water.

If the textile cleaning composition is a solid, it may be in various forms including, but not limited to, a powder, a flake, a granule, a pellet, a tablet, a lozenge, a puck, a briquette, a brick, a solid block, or a unit dose. Moreover, the methods can include one or more of the following: a prewash cleaning composition, a main wash cleaning composition, pretreatment compositions (including but not limited to soaks and sprays).

As described above, the potential cleaning steps employed in the methods described herein can comprise a variety of ingredients. Those ingredients can be formulated into liquid or solid cleaning compositions or individually dosed. Those ingredients can include, but are not limited to, an alkalinity source, a builder/chelating agent, defoamer, enzyme, enzyme stabilizing agent, polymer, surfactant, and whitening agent. The cleaning compositions can further include the colorants, fragrances, solidification agents, and water as described above. It should be understood that the compositions shown in Tables 1-3 are only example and that the methods and compositions disclosed herein can be used in conjunction with any cleaning compositions.

Cationic Amine Compound

The compositions include one or more cationic amine or ammonium compounds, including non-quaternary multi-branched amine surfactants. In an embodiment, the cationic amine is a hydrophobic cationic amine utilized as a deposition aid. Suitable cationic amines include those which are perpetually cationic or are cationic at a particular pH, i.e., those that are pH dependent. In an embodiment, the one or more of the cationic amine or ammonium compounds are included in the composition in an amount of from about 5 wt. % to about 80 wt. %, 10 wt. % to about 80 wt. %, 15 wt.

% to about 80 wt. %, from about 15 wt. % to about 60 wt. %, from about 25 wt. % to about 60 wt. %, from about 25 wt. % to about 55 wt. % by weight based on the total weight of the solid laundry softening composition. In an embodiment, the compositions are free of quaternary ammonium compounds. In an embodiment, the composition includes a blend of amines. In a further preferred embodiment, the blend of amines comprises N1,N1,N3-Tris(3-aminopropyl)-N3-octadecyl-1,3-propanediamine, N1,N1,-Bis(3-aminopropyl)-N3-octadecyl-1,3-propanediamine, and 1,3-Propanediamine, N-(3-aminopropyl)-N-octadecyl-N-octadecylpropane-1,3-diamine, sold as LPS-816.

Suitable cationic amines further include but are not limited to N-(3-aminopropyl)-N-dodecylpropane-1,3-diamine, N-(3-aminopropyl)-N-dodecylpropane-1,3-diamine, N, N-Bis (3-aminopropyl) dodecylamine, N1,N1,N3-tris(3-aminopropyl)-N3-dodecylpropane-1,3-diamine, N1,N1-bis (3-aminopropyl)-N3-dodecylpropane-1,3-diamine, N1-(3-aminopropyl)-N3-dodecylpropane-1,3-diamine, N-dodecylpropane-1,3-diamine, among others. Suitable cationic amine compounds are available by the trade names Lonzabac 12, Lonzabac 12.100, Lonzabac 12.30, Cotilps 739, Tomamine DA-17, Tomamine DA-14, Tomamine DA-1618, Tomamine DA-1214, and the like.

More particularly, suitable triamines include N,N-bis(3-aminopropyl)-octylamine, N,N-bis(3-aminopropyl)-dodecylamine, 4-aminomethyl-1,8-octanediamine, 1,3,5-tris-(aminomethyl)-benzene, 1,3,5-tris-(aminomethyl)-cyclohexane, tris-(2-aminoethyl)-amine, tris-(2-aminopropyl)-amine, tris-(3 aminopropyl)-amine, or a combination thereof.

Suitable ether diamines include, but are not limited to hexyloxypropyl amine, 2-ethylhexyloxypropyl amine, octyl/decyloxypropyl amine, isodecyloxypropyl amine, dodecyl/tetradecyloxypropyl amine, isotridecyloxypropyl amine, tetradecyl/dodecyloxypropyl amine, linear alkyloxypropyl amines, isotridecyloxypropyl-1,3-diaminopropane, octyl/decyloxypropyl-1,3-diaminopropane, isodecyloxypropyl-1, 3-diaminopropane, dodecyl/tetradecyloxypropyl-1, 3-diaminopropane, or a combination thereof.

Suitable aliphatic diamines include but are not limited to bis (2-aminoethyl) ether, 3,6-dioxoctane-1,8-diamine, 4,7-dioxadecane-1,10-diamine, 4,7-dioxadecane-2, 9-diamine, 4,9-dioxadodecane-1,12-diamine, 5,8-dioxadodecane-3,10-diamine, 4,7,10-trioxatridecane-1,13-diamine, and higher oligomers of these diamines, bis-(3-aminopropyl) polytetrahydrofurans and other polytetrahydrofuran-diamines, as well as polyoxyalkylene-diamines.

Suitable ethoxylated amines include but are not limited to bis-(2-hydroxyethyl) isodecyloxypropylamine, poly (5) oxyethylene isodecyloxypropylamine, bis-(2-hydroxyethyl) isotridecyloxypropylamine, poly (5) oxyethylene isotridecyloxypropylamine, bis-(2-hydroxyethyl) tallow amine (including 5 and 15-mole adducts), N-tallow-poly (3) oxyethylene-1,3-diaminopropane, lauryl dimethyl amine oxide, or a combination thereof.

Preferred cationic multi-branched amine surfactants include, but are not limited to: N, N-bis (3-aminopropyl) dodecylamine; N1,N1,N3-tris(3-aminopropyl)-N3-dodecylpropane-1,3-diamine; N1,N1-bis(3-aminopropyl)-N3-dodecylpropane-1,3-diamine; N1-(3-aminopropyl)-N3-dodecylpropane-1,3-diamine; N-dodecylpropane-1,3-diamine; isotridecyloxypropyl-1,3-diaminopropane; N1-(3-(tridecyl-(branched)-alkyloxy)propyl)propane-1,3-diamine; N1,N1, N3-tris(3-aminopropyl)-N3-octadecyl-1,3-propanediamine; N1,N1,N3-tris(3-aminopropyl)-N3-dodecylpropane-1,3-diamine; N-(3-aminopropyl)-N-octadecyl-N-octadecyl propane-1,3-diamine; or a combination thereof.

Quaternary Ammonium Compound Deposition Aids

In some embodiments the compositions include one or more quaternary ammonium compounds or salts thereof which can provide a variety of benefits for fabric treatment, including functioning as a deposition aid. Deposition aids generally enhance the deposition rate and extend fabric care. Example quaternary ammonium compounds include alkylated quaternary ammonium compounds, ring or cyclic quaternary ammonium compounds, aromatic quaternary ammonium compounds, diquaternary ammonium compounds, alkoxylated quaternary ammonium compounds, amidoamine quaternary ammonium compounds, ester quaternary ammonium compounds, or a combination thereof.

Quaternary ammonium compounds have the following general formula:

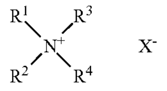

wherein $R^1$, $R^2$, $R^3$, and $R^4$ can each be C1-C24 aliphatic, normal, or branched saturated or unsaturated hydrocarbon groups, alkoxy groups (R—O—), polyalkoxy groups, benzyl groups, allyl groups, hydroxyalkyl groups (HOR—), and the like, and X is an anion, selected from halide, methyl sulphate or ethyl sulphate radicals. The quaternary ammonium compounds can include any anion or counter ion that allows the component to be used in a manner that imparts fabric-softening properties. Example counter ions include chloride, methyl sulfate, ethyl sulfate, and sulfate.

Example quaternary ammonium compounds for the compositions have the following general formula:

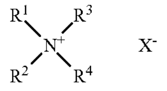

wherein $R^1$ and $R^2$ represent the same or different hydrocarbyl groups having from about 12 to about 24 carbon atoms, from about 12 to about 22 carbon atoms, more from about 14 to about 22 carbon atoms, or still more from about 14 to about 20 carbon atoms; $R^3$ and $R^4$ represent the same or different hydrocarbyl groups containing about 1 to about 4 carbon atoms; and X is any suitable anion, such as a halide.

Preferred quaternary ammonium compounds have highly saturated carbon backbones (i.e., high degree of saturation of alkyl groups) of the hydrocarbyl groups. the quaternary ammonium compounds have two long R alkyl or alkenyl based chains (i.e., $R^1$ and $R^2$) As referred to herein, “highly saturated” or a “high degree of saturation” with reference to the carbon backbones are represented by a low iodine value of the quaternary ammonium compounds, namely an iodine value equal to 15 or less.

Representative examples of these quaternary ammonium compounds include, for example, di(tallow alkyl)dimethyl ammonium methyl sulphate; dihexadecyl dimethyl ammonium chloride; di(hydrogenated tallow alkyl)dimethyl ammonium chloride; dioctadecyl dimethyl ammonium chloride; di(hydrogenated tallow alkyl)dimethyl ammonium methyl sulphate; dihexadecyl diethyl ammonium chloride; di(coconut alkyl)dimethyl ammonium chloride; ditallow alkyl dimethyl ammonium chloride; and di(hydrogenated tallow alkyl)dimethyl ammonium chloride, and combinations thereof.

Further representative examples of quaternary ammonium compounds useful in the compositions include but are not limited to mono-C8-C24 alkyl trimethyl quaternary ammonium compounds, monomethyl tri-C8-24 alkyl quaternary ammonium compounds, imidazolinium quaternary ammonium compounds, dimethyl-C8-24 alkyl benzyl quaternary ammonium compounds, complex di quaternary ammonium compounds, di-C8-24 alkyl dimethyl quaternary ammonium compounds, mono or dialkyl di or trialkoxy quaternary ammonium compounds, mono or dialkyl di or tripolyalkoxy quaternary ammonium compounds, (the alkoxy group being a methoxy, ethoxy or propoxy group or a hydroxyethyl or hydroxypropyl; the polyalkoxy being polyethoxy or polypropoxy group with 2-50 alkoxy groups), diamidoamine-methyl-C8-C22 alkyl-quaternary ammonium compounds, and di-C8-C22 alkyl methyl benzyl quaternary ammonium compounds.

The compositions can include a quaternary ammonium compound having sufficient saturated hydrocarbon groups, such as the alkyl groups, to have an iodine value equal to 15 or less. In a further embodiment, the compositions can include a dialkyl quaternary ammonium compound having saturated alkyl groups for $R^1$ and $R^2$ having from about 8 to about 24 carbon atoms, from about 12 to about 24 carbon atoms, from about 12 to about 22 carbon atoms, more from about 14 to about 22 carbon atoms, or still more from about 14 to about 20 carbon atoms. In a preferred aspect, the dialkyl quaternary ammonium compound is a di(hydrogenated tallowalkyl)dimethyl ammonium chloride (DHTDMAC), DEEDMA© quat, or an ester quat, such as a di(hydrogenated) tallow dimethyl ammonium methyl sulfate (DHTDMAMS) esterquat.

Representative examples of quaternary ammonium compounds include, for example, alkyl benzyl ammonium chloride or alkyl dimethyl benzyl ammonium chloride (ADBAC), such as a C12-C18 alkyl benzyl ammonium chloride or a C12-C16 alkyl dimethyl benzyl ammonium chloride, alkyl ethyl benzyl ammonium chloride or alkyl dimethyl ethyl benzyl ammonium chloride (ADEBAC), such as a C12-C18 alkyl ethyl benzyl ammonium chloride, dialkyl ammonium salt or dialkyl dimethyl ammonium chloride, such as dialkyl C12-C18 dialkyl C1-C4 ammonium salt, decyl dimethyl octyl ammonium chloride, didecyl dimethyl ammonium chloride, dimethyl dioctyl ammonium chloride, or a combination thereof. Suitable commercial products include, without limitation, Quat 4, Quat 7, and other blends of quaternary ammonium compounds.

The compositions can include an amidoamine quaternary ammonium compound, including for example diamidoamine quaternary ammonium compounds. Example diamidoamine quaternary ammonium compounds are available under the name Varisoft®. Example amidoamine quaternary ammonium compounds include methyl-bis(tallow amidoethyl)-2-hydroxyethyl ammonium methyl sulfate, methyl bis(oleylamidoethyl)-2-hydroxyethyl ammonium methyl sulfate, and methyl bis(hydr·tallowamidoethyl)-2-hydroxyethyl ammonium methyl sulfate.

The compositions can include an imidazolinium quaternary compound. Example imidazolinium quaternary ammonium compounds include methyl-lhydr. tallow amido ethyl-2-hydr. tallow imidazolinium-methyl sulfate, methyl-1-tallow amido ethyl-2-tallow imidazolinium-methyl sulfate, methyl-1-oleyl amido ethyl-2-oleyl imidazolinium-methyl sulfate, and 1-ethylene bis(2-tallow, 1-methyl, imidazolinium-methyl sulfate).

The compositions can include an alkylated quaternary compound. Example alkylated quaternary ammonium compounds include ammonium compounds having an alkyl group containing between 6 and 24 carbon atoms. Example alkylated quaternary ammonium compounds include monoalkyl trimethyl quaternary ammonium compounds, monomethyl trialkyl quaternary ammonium compounds, and dialkyl dimethyl quaternary ammonium compounds. The alkyl group is C12-C24, C14-C24, C14-C22, or C14-C20 group that is aliphatic and saturated, straight, or branched.

The compositions can include an ester quaternary compound or a salt thereof. Ester quats refer to a compound having at least two or more alkyl or alkenyl groups connected to the molecule via at least one ester link. An ester quaternary ammonium compound can have at least one or can have two or more ester links present. In an embodiment, the ester quat is a compound according to the structure:

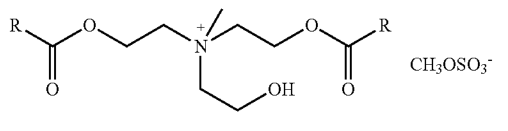

wherein R is an alkyl group, preferably a C16-C18 alkyl chain. Suitable quaternary ammonium compounds are those under the name Rewoquat®, for example Rewoquat® WE 45.

Further example ester quaternary ammonium compounds include for example, di-alkenyl esters of triethanol ammonium methyl sulphate and N,N-di(tallowoyloxy ethyl)N,N-dimethyl ammonium chloride, polyol ester quat (PEQ). Commercial examples of compounds include, but are not limited to, di-oleic ester of triethanol ammonium methyl sulphate, di-oleic ester of triethanol ammonium methyl sulphate, partially hardened tallow ester of triethanol ammonium ethyl sulphate, palm ester of triethanol ammonium methyl sulphate, hardened tallow ester of triethanol ammonium methyl sulphate, unsaturated carboxylic acid reaction products with triethanolamine dimethyl sulphate quaternized. Further examples include triethanolamine (TEA) ester quats (e.g., methyl bis(ethyl tallowate)-2-hydroxyethyl ammonium methyl sulfate), methyldiethanolamine (MDEA) ester quats, diamidoquats (e.g., methyl bis(hydrogenated tallow amidoethyl)-2-hydroxyethyl ammonium methyl sulfate), and dialkyldimethyl quats (e.g., dihydrogenated tallow dimethyl ammonium chloride). Preferred MDEA esterquats include methyl diethanolamine esterquat, commercially available as Variquat S. Preferred DHTDMAMS esterquats include, for example, the esterquat commercially available as Agent 2246. Additional preferred ester quats are those made from the reaction of alkyl carboxylic acid fraction, methyl ester and triglyceride with triethanolamine, for example triethanolamine ester quats, such as those sold under the commercial name WE-45 HF. Other suitable ester quaternary ammonium compounds include those sold as Quat S HF. Additional description of the ammonium quaternary fabric softening actives is disclosed in U.S. Pat. No. 4,769,159, which is herein incorporated by reference.

Silicone Compound

In some embodiments, the compositions include one or more silicone compounds. In an embodiment, the compositions include one or more silicones utilized as a deposition aid. Most preferably the silicone compound comprises a volatile silicone, a curable silicone, or a combination thereof. In a preferred embodiment, the silicone is hydrophobic. In a still further preferred embodiment, the compositions include a blend of PDMS, an aminosilicone, and a high molecular weight silicone polymer, particularly a blend of PDMS, an aminosilicone, a high molecular weight silicone polymer, an amine oxide surfactant, and optionally a quaternary ammonium compound. When present, the one or more silicone compounds may be present in an amount of between about 0 wt. % to about 99 wt. %, between about 0.005 wt. % to about 95 wt. %, between about 0.01 wt. % to about 90 wt. %, or between about 0.015 wt. % to about 90 wt. %, inclusive of all integers within these ranges.

Suitable silicones include those according to the general formula:

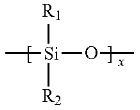

wherein, each $R_1$ and $R_2$ in each repeating unit, —(Si($R_1$)($R_2$)O)—, are independently selected from a $C_1$-$C_{10}$ to alkyl or alkenyl radicals, phenyl, substituted alkyl, substituted phenyl, or units of —[—$R_1R_2$Si—O—]—; x is a number from 50 to 300,000, preferably from 100 to 100,000, more preferably from 200 to 50,000, wherein, the substituted alkyl or substituted phenyl are typically substituted with halogen, amino, hydroxyl groups, quaternary ammonium groups, polyalkoxy groups, carboxyl groups, or nitro groups, and wherein the silicone polymer is terminated by a hydroxyl group, hydrogen or —$SiR_3$, wherein, $R_3$ is hydroxyl, hydrogen, methyl or a functional group. An example of a suitable silicone includes polydimethylsiloxane (PDMS) or an emulsion thereof.

In an embodiment, the silicone typically has an average molecular weight, as measured by viscosity, of from 5,000 cst to 5,000,000 cst, or from 7,500 cst to 1,000,000 cst or even from 10,000 cst to 600,000 cst. Silicones particularly suitable for textile softening and cleaning are described in WO 03/097778, which is herein incorporated by reference in its entirety.

The silicone may be a cationic silicone polymer, such as those described in WO 02/18528, amino-silicones, such as those described in U.S. Pat. Nos. 4,891,166, 5,593,611 and 4,800,026; quaternary-silicones, such as those described in U.S. Pat. No. 4,448,810; high-viscosity silicones, such as those described in WO 00/71806 and WO 00/71807; modified polydimethyl siloxanes; functionalized polydimethyl siloxanes such as those described in U.S. Pat. Nos. 5,668,102 and 6,136,215 including, for example polydimethyl siloxanes comprising a pendant amino functionality; cationic amino-silicones; silicone amino-esters; biodegradable organo-silicones such as those described in WO 01/23394; polyquaternary polysiloxane polymers, cationic silicones comprising repeating $N^+$ units; amino-silicones comprising pendant EO/PO and epoxy glucamine side chains; coated amino-silicones; or block copolymers of polydimethyl siloxane and EO/PO units, as described in WO 97/32917. Each of these documents is herein incorporated by reference in their entirety.

In some embodiments, the silicone may also comprise a mixture of two or more different types of silicone. For example, the silicone may be a mixture of a high-viscosity silicone and a low viscosity silicone. The silicone may comprise a mixture of a functionalized silicone and a non-functionalized silicone.

In some embodiments the silicone is provided in the form of an emulsion and has an average primary particle size of from 1 micrometer to 5,000 micrometers, preferably from 1 micrometer to 50 micrometers. Beneficially, such silicone emulsions are easily deposited onto textile surfaces during the laundering process. Commercially available silicone oils that are suitable for use are DC200™ (12,500 cst to 600,000 cst), supplied by Dow Corning. Alternatively, preformed silicone emulsions are also suitable for use. These emulsions may comprise water or other solvents in an effective amount to aid in the emulsion.

Suitable volatile silicones include but are not limited to dimethyl silicone. Preferred curable silicones include, but are not limited to, an aminosilicone, a phenyl silicone, and a hydroxysilicone. Examples of suitable silicones include, but are not limited to, silicones such as dimethyl silicone, glycol polysiloxane, methylphenol polysiloxane, trialkyl or tetra alkyl silanes, hydrophobic silica compounds, alkali metal silicates, metal silicates, and combinations thereof can all be used in defoaming applications. Commercial defoamers commonly available include silicones such as ARDEFOAM™ from Armour Industrial Chemical Company which is a silicone bound in an organic emulsion; FOAM KILL™ or KRESSEO™ available from Krusable Chemical Company which are silicone and non-silicone type defoamers as well as silicone esters; and ANTI-FOAM A™ and DC-200 from Dow Corning Corporation which are both food grade type silicones among others.

In some embodiments, the silicone is an amino alkyl functionalized silicone; an amino alkyl functionalized MQ silicone; an unreacted MQ silicone; a siloxane or silicone blend; a silicone polyvinyl acetate; a silicone polyvinyl acetate neutralized with ammonium hydroxide; or a silicone functionalized acrylic. Suitable functionalized silicones include but are not limited to oil-in-water emulsions of polydimethylsiloxane, polyorganosiloxane diamines, silicone impregnating agents, and the like.

The polydiorganosiloxane diamines of formula $HR^4N$—$Y^1$-$Q^1$-$Y^1$—$NR^4H$ can be formed using methods such as those described, for example, in U.S. Pat. No. 5,314,748, which is herein incorporated by reference in its entirety. Polydiorganosiloxane diamines also are commercially available under the trade names DMS-A11 (molecular weight 850 to 900 Da), DMS-A32 (molecular weight about 30,000 Da), and DMS-A35 (molecular weight about 50,000 Da) and those sold under the trade names WACKER FLUID (e.g., WACKER FLUID NH 130 D (molecular weight 9,500 to 12,000 Da), NH 30 D (molecular weight 2400 to 3400 Da), and NH 15 D (950 to 1200 Da)), including Wacker® HC 303, Wacker® HC 321, Wacker® HC 401, Wacker® MQ-RESIN POWDER 803 TF, Wacker® HC 103, and Wacker® HC 130. Other suitable silicones include those sold under the trade names DOWSIL™ MQ-1640 Flake Resin; DOWSIL™ FA 4002 ID Silicone Acrylate; TEGOTOP® 210; and BELSIL® P 1101.

Alkalinity Source

In some embodiments, the compositions include an effective amount of one or more alkalinity sources. In some embodiments, when a cationic amine is used as a softening agent, an alkalinity source is also present. In other aspects, the compositions do not include an alkalinity source and instead include a surfactant package. In compositions employing an alkalinity source, an effective amount of one or more alkaline sources should be considered as an amount that provides a composition having a pH between about 7 and about 14. In a particular embodiment the cleaning composition will have a pH of between about 7.5 and about 13.5. In a particular embodiment the cleaning composition will have a pH of between about 8 and about 13. During the wash cycle the use solution will have a pH between about 8 and about 13. In particular embodiments, the use solution will have a pH between about 9 and 11. Examples of suitable alkaline sources of the cleaning composition include but are not limited to carbonate-based alkalinity sources, including, for example, carbonate salts such as alkali metal carbonates; caustic-based alkalinity sources, including, for example, alkali metal hydroxides; other suitable alkalinity sources may include metal silicate, metal borate, and organic alkalinity sources. Example alkali metal carbonates that can be used include, but are not limited to, sodium carbonate, potassium carbonate, bicarbonate, sesquicarbonate, or a combination thereof. Example alkali metal hydroxides that can be used include, but are not limited to sodium, lithium, or potassium hydroxide. Example metal silicates that can be used include, but are not limited to, sodium or potassium silicate or metasilicate. Example metal borates include, but are not limited to, sodium or potassium borate.

Organic alkalinity sources are often strong nitrogen bases including, for example, ammonia (ammonium hydroxide), amines, alkanolamines, and amino alcohols. Typical examples of amines include primary, secondary or tertiary amines and diamines carrying at least one nitrogen linked hydrocarbon group, which represents a saturated or unsaturated linear or branched alkyl group having at least 10 carbon atoms and preferably 16-24 carbon atoms, or an aryl, aralkyl, or alkaryl group containing up to 24 carbon atoms, and wherein the optional other nitrogen linked groups are formed by optionally substituted alkyl groups, aryl group or aralkyl groups or polyalkoxy groups. Typical examples of alkanolamines include monoethanolamine, monopropanolamine, diethanolamine, dipropanolamine, triethanolamine, tripropanolamine and the like. Typical examples of amino alcohols include 2-amino-2-methyl-1-propanol, 2-amino-1-butanol, 2-amino-2-methyl-1,3-propanediol, 2-amino-2-ethyl-1,3-propanediol, hydroxymethyl aminomethane, and the like.

In general, alkalinity sources are commonly available in either aqueous or powdered form, either of which is useful in formulating the present cleaning compositions. The alkalinity may be added to the composition in any form known in the art, including as solid beads, granulated or particulate form, dissolved in an aqueous solution, or a combination thereof.

When present, the alkalinity source(s) may be utilized in an amount between about 0% and about 99% by weight, between about 0.005% and about 95% by weight, between about 0.01% and about 90% by weight, between about 0.015% and about 90% by weight, between about 10% and about 90% by weight, between about 20% and about 90% by weight, between about 40% and about 90% by weight, between about 50% and about 90% by weight, or between about 50% and about 85% by weight of the total weight of the composition.

Amine Epoxide Adduct

In some embodiments, the compositions include one or more amine epoxide adducts, such as a polyamine epoxide adduct, characterized in that an epoxy group is added to the terminal amine group(s) of an amine or polyamine. In some embodiments, the one or more amine epoxide adducts are utilized as a deposition aid, facilitating deposition of the compositions to the surface of textiles. Example methods of preparing amine epoxide adducts are provided in CA2438773C, which is herein incorporated by reference in its entirety. Generally speaking, amine epoxide adducts are prepared by admixing a source of an epoxy group with an amine and allowing the epoxy groups to react with the terminal amino group(s) of the amine or polyamine in order to generate an amine epoxide adduct. Preferably, the polyamine is present in stoichiometric excess relative to the concentration of epoxy groups, so that the epoxy groups are reacted fully on the backbone of the polyamine. In an embodiment, the hydrophobicity and hydrophilicity of the amine epoxide adduct may be adjusted by selecting longer carbon chains and fewer epoxides, respectively.

In an embodiment, the amine epoxide adduct is a compound according to the following formula:

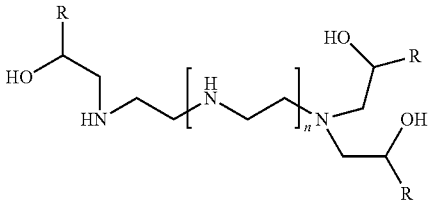

amine-epoxide adduct wherein R is an alkyl or $-(CH_2)k$-O alkyl, k is an integer between 1-10, and wherein n is an integer between 0-1000.

In a preferred embodiment, the amine epoxide adduct is a compound according any one of the following formulae:

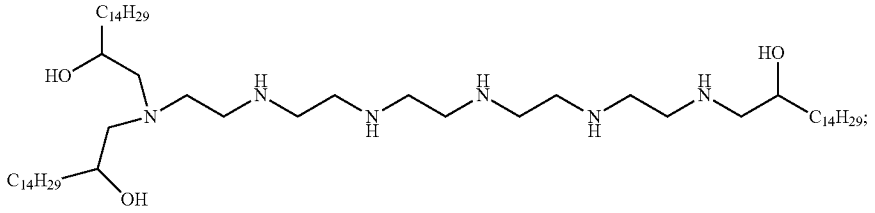

1,2-Epoxyhexadecane-PEHA, having a 1:3 adduct molar ratio

-continued

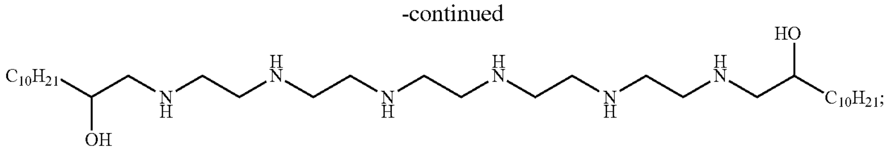

1,2-Epoxydodecane-PEHA, having a 1:2 adduct molar ratio

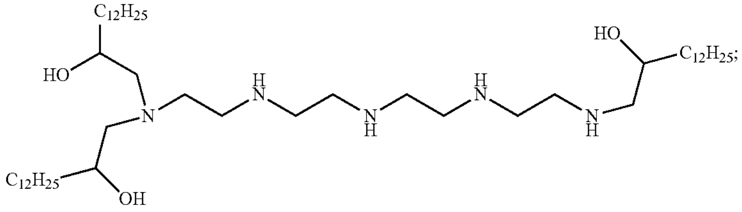

or 1,2-Epoxytetradecane-TEPA, having a 1:3 adduct molar ratio

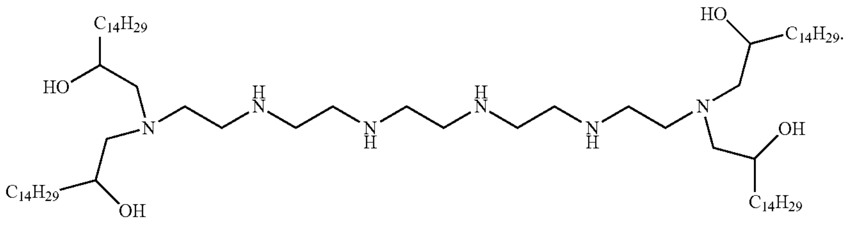

1,2-Epoxyhexadecane-PEHA, having a 1:4 adduct molar ratio

Surfactants

In some embodiments, the cleaning compositions comprise a surfactant. Surfactants suitable for use in the methods and the cleaning compositions can include, but are not limited to, nonionic, anionic, cationic, amphoteric, and zwitterionic surfactants. In a preferred embodiment the cleaning compositions include at least one nonionic surfactant and at least one cationic surfactant. In a still further preferred embodiment, the compositions comprise at least one nonionic surfactant, at least one semi-polar nonionic surfactant, and at least one cationic surfactant. In a preferred embodiment, the nonionic surfactant comprises a fatty alcohol polyglycol ether, the semi-polar nonionic surfactant comprises dodecyl dimethyl amine oxide, and the cationic surfactant comprises N,N-Diethoxylated-N-coco-N-methylammonium chloride. The class, identity, and number of surfactant(s) selected for use in the compositions and methods may be altered and selected based on the other components in the compositions and methods and based on the types of soils targeted for removal.

In an embodiment, the compositions include from about 10 wt. % to about 99 wt. % surfactants, from about 20 wt. % to about 90 wt. % surfactants, from about 40 wt. % to about 80 wt. % surfactants, from about 50 wt. % to about 90 wt. % surfactants, preferably from about 50 wt. % to about 80 wt. % surfactants, inclusive of all integers within these ranges.

Nonionic Surfactants

Useful nonionic surfactants are generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. Practically any hydrophobic compound having a hydroxyl, carboxyl, amino, or amido group with a reactive hydrogen atom can be condensed with ethylene oxide, or its polyhydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water-soluble compound having the desired degree of balance between hydrophilic and hydrophobic properties. Useful nonionic surfactants include:

1. Block polyoxypropylene-polyoxyethylene polymeric compounds based upon propylene glycol, ethylene glycol, glycerol, trimethylolpropane, and ethylenediamine as the initiator reactive hydrogen compound. Examples of polymeric compounds made from a sequential propoxylation and ethoxylation of initiator are commercially available from BASF Corp. One class of compounds are difunctional (two reactive hydrogens) compounds formed by condensing ethylene oxide with a hydrophobic base formed by the addition of propylene oxide to the two hydroxyl groups of propylene glycol. This hydrophobic portion of the molecule weighs from about 1,000 to about 4,000. Ethylene oxide is then added to sandwich this hydrophobe between hydrophilic groups, controlled by length to constitute from about 10% by weight to about 80% by weight of the final molecule. Another class of compounds are tetra-functional block copolymers derived from the sequential addition of propylene oxide and ethylene oxide to ethylenediamine. The molecular weight of the propylene oxide hydrotype ranges from about 500 to about 7,000; and the hydrophile, ethylene oxide, is added to constitute from about 10% by weight to about 80% by weight of the molecule.

2. Condensation products of one mole of alkyl phenol wherein the alkyl chain, of straight chain or branched chain configuration, or of single or dual alkyl constituent, contains from about 8 to about 18 carbon atoms with from about 3 to about 50 moles of ethylene oxide. The alkyl group can, for example, be represented by diisobutylene, di-amyl, polymerized propylene, iso-octyl, nonyl, and di-nonyl. These surfactants can be polyethylene, polypropylene, and polybutylene oxide condensates of alkyl phenols. Examples of commercial compounds of this chemistry are available on the market under the trade names Igepal® manufactured by Rhone-Poulenc and Triton® manufactured by Union Carbide.

3. Condensation products of one mole of a saturated or unsaturated, straight, or branched chain alcohol having from about 6 to about 24 carbon atoms with from about 3 to about 50 moles of ethylene oxide. The alcohol moiety can consist of mixtures of alcohols in the above delineated carbon range, or it can consist of an alcohol having a specific number of carbon atoms within this range. Examples of like commercial surfactant are available under the trade names Lutensol™, Dehydol™ manufactured by BASF, Neodol™ manufactured by Shell Chemical Co. and Alfonic™ manufactured by Vista Chemical Co. A further example of a suitable nonionic surfactant includes alcohol ethoxylates, particularly those of a linear, primary carbon alcohol. In a preferred embodiment, the nonionic surfactant includes a 5-9 mole ethoxylate of a linear primary 12-14 carbon alcohol. Suitable surfactants are commercially available under the trade name Surfonic®, for example Surfonic® L24-7.

4. Condensation products of one mole of saturated or unsaturated, straight, or branched chain carboxylic acid having from about 8 to about 18 carbon atoms with from about 6 to about 50 moles of ethylene oxide. The acid moiety can consist of mixtures of acids in the above defined carbon atoms range, or it can consist of an acid having a specific number of carbon atoms within the range. Examples of commercial compounds of this chemistry are available on the market under the trade names Disponil or Agnique manufactured by BASF and Lipopeg™ manufactured by Lipo Chemicals, Inc.

In addition to ethoxylated carboxylic acids, commonly called polyethylene glycol esters, other alkanoic acid esters formed by reaction with glycerides, glycerin, and polyhydric (saccharide or sorbitan/sorbitol) alcohols have application in this disclosure for specialized embodiments, particularly indirect food additive applications. All of these ester moieties have one or more reactive hydrogen sites on their molecule which can undergo further acylation or ethylene oxide (alkoxide) addition to control the hydrophilicity of these substances. Care must be exercised when adding these fatty esters or acylated carbohydrates to compositions of the present disclosure containing amylase or lipase enzymes because of potential incompatibility.

Examples of nonionic low foaming surfactants include:

5. Compounds from (1) which are modified, essentially reversed, by adding ethylene oxide to ethylene glycol to provide a hydrophile of designated molecular weight; and, then adding propylene oxide to obtain hydrophobic blocks on the outside (ends) of the molecule. The hydrophobic portion of the molecule weighs from about 1,000 to about 3,100 with the central hydrophile including 10% by weight to about 80% by weight of the final molecule. These reverse Pluronics' are manufactured by BASF Corporation under the trade name Pluronic™ R surfactants. Likewise, the Tetronic™ R surfactants are produced by BASF Corporation by the sequential addition of ethylene oxide and propylene oxide to ethylenediamine. The hydrophobic portion of the molecule weighs from about 2,100 to about 6,700 with the central hydrophile including 10% by weight to 80% by weight of the final molecule.

6. Compounds from groups (1), (2), (3) and (4) which are modified by "capping" or "end blocking" the terminal hydroxy group or groups (of multi-functional moieties) to reduce foaming by reaction with a small hydrophobic molecule such as propylene oxide, butylene oxide, benzyl chloride; and short chain fatty acids, alcohols or alkyl halides containing from 1 to about 5 carbon atoms, or a combination thereof. Also included are reactants such as thionyl chloride which convert terminal hydroxy groups to a chloride group. Such modifications to the terminal hydroxy group may lead to all-block, block-heteric, heteric-block or all-heteric nonionics.

Additional examples of effective low foaming nonionics include:

7. The alkylphenoxypolyethoxyalkanols of U.S. Pat. No. 2,903,486 issued Sep. 8, 1959, to Brown et al. and represented by the formula

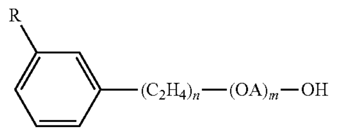

in which R is an alkyl group of 8 to 9 carbon atoms, A is an alkylene chain of 3 to 4 carbon atoms, n is an integer of 7 to 16, and m is an integer of 1 to 10.

The polyalkylene glycol condensates of U.S. Pat. No. 3,048,548 issued Aug. 7, 1962, to Martin et al. having alternating hydrophilic oxyethylene chains and hydrophobic oxypropylene chains where the weight of the terminal hydrophobic chains, the weight of the middle hydrophobic unit and the weight of the linking hydrophilic units each represent about one-third of the condensate.

The defoaming nonionic surfactants disclosed in U.S. Pat. No. 3,382,178 issued May 7, 1968, to Lissant et al. having the general formula $Z[(OR)_nOH]_z$ wherein Z is alkoxylatable material, R is a radical derived from an alkylene oxide which can be ethylene and propylene and n is an integer from, for example, 10 to 2,000 or more and z is an integer determined by the number of reactive oxyalkylatable groups.

The conjugated polyoxyalkylene compounds described in U.S. Pat. No. 2,677,700, issued May 4, 1954, to Jackson et al. corresponding to the formula $Y(C_3H_6O)_n(C_2H_4O)_mH$ wherein Y is the residue of organic compound having from about 1 to 6 carbon atoms and one reactive hydrogen atom, n has an average value of at least about 6.4, as determined by hydroxyl number and m has a value such that the oxyethylene portion constitutes about 10% to about 90% by weight of the molecule.

The conjugated polyoxyalkylene compounds described in U.S. Pat. No. 2,674,619, issued Apr. 6, 1954 to Lundsted et al. having the formula $Y[(C_3H_6O_n(C_2H_4O)_mH]_x$ wherein Y is the residue of an organic compound having from about 2 to 6 carbon atoms and containing x reactive hydrogen atoms in which x has a value of at least about 2, n has a value such that the molecular weight of the polyoxypropylene hydrophobic base is at least about 900 and m has value such that the oxyethylene content of the molecule is from about 10% to about 90% by weight. Compounds falling within the scope of the definition for Y include, for example, propylene glycol, glycerin, glyceride, pentaerythritol, trimethylolpropane, ethylenediamine and the like. The oxypropylene chains optionally, but advantageously, contain small amounts of ethylene oxide and the oxyethylene chains also optionally, but advantageously, contain small amounts of propylene oxide.

Additional conjugated polyoxyalkylene surface-active agents which are advantageously used in the compositions of this disclosure correspond to the formula: $P[(C_3H_6O)_n(C_2H_4O)_mH]_x$ wherein P is the residue of an organic compound having from about 8 to 18 carbon atoms and containing x reactive hydrogen atoms in which x has a value of 1 or 2, n has a value such that the molecular weight of the polyoxyethylene portion is at least about 44 and m has a value such that the oxypropylene content of the molecule is from about 10% to about 90% by weight. In either case the oxypropylene chains may contain optionally, but advantageously, small amounts of ethylene oxide and the oxyethylene chains may contain also optionally, but advantageously, small amounts of propylene oxide.

8. Polyhydroxy fatty acid amide surfactants suitable for use in the present compositions include those having the structural formula $R_2CON_{R1}Z$ in which: R1 is H, $C_1$-$C_4$ hydrocarbyl, 2-hydroxy ethyl, 2-hydroxy propyl, ethoxy, propoxy group, or a combination thereof; $R_2$ is a $C_5$-$C_{31}$ hydrocarbyl, which can be straight-chain; and Z is a polyhydroxy hydrocarbyl having a linear hydrocarbyl chain with at least 3 hydroxyls directly connected to the chain, or an alkoxylated derivative (preferably ethoxylated or propoxylated) thereof. Z can be derived from a reducing sugar in a reductive amination reaction; such as a glycityl moiety.

9. The alkyl ethoxylate condensation products of aliphatic alcohols with from about 0 to about 25 moles of ethylene oxide are suitable for use in the present compositions. The alkyl chain of the aliphatic alcohol can either be straight or branched, primary or secondary, and generally contains from 6 to 22 carbon atoms.

10. Fatty alcohol nonionic surfactants, including ethoxylated $C_6$-$C_{18}$ fatty alcohols and $C_6$-$C_{18}$ mixed ethoxylated and propoxylated fatty alcohols and fatty alcohol polyglycol ether. Suitable ethoxylated fatty alcohols include the $C_6$-$C_{18}$ ethoxylated fatty alcohols with a degree of ethoxylation of from 3 to 50.

11. Suitable nonionic alkylpolysaccharide surfactants, particularly for use in the present compositions include those disclosed in U.S. Pat. No. 4,565,647, Llenado, issued Jan. 21, 1986. These surfactants include a hydrophobic group containing from about 6 to about 30 carbon atoms and a polysaccharide, e.g., a polyglycoside, hydrophilic group containing from about 1.3 to about 10 saccharide units. Any reducing saccharide containing 5 or 6 carbon atoms can be used, e.g., glucose, galactose and galactosyl moieties can be substituted for the glucosyl moieties. (Optionally the hydrophobic group is attached at the 2-, 3-, 4-, etc. positions thus giving a glucose or galactose as opposed to a glucoside or galactoside.) The intersaccharide bonds can be, e.g., between the one position of the additional saccharide units and the 2-, 3-, 4-, or 6-positions on the preceding saccharide units.

12. Fatty acid amide surfactants suitable for use the present compositions include those having the formula: $R_6CON(R_7)_2$ in which $R_6$ is an alkyl group containing from 7 to 21 carbon atoms and each $R_7$ is independently hydrogen, $C_1$-$C_4$ alkyl, $C_1$-$C_4$ hydroxyalkyl, or $—(C_2H_4O)_XH$, where x is in the range of from 1 to 3.

13. A useful class of nonionic surfactants include the class defined as alkoxylated amines or, most particularly, alcohol alkoxylated/aminated/alkoxylated surfactants. These nonionic surfactants may be at least in part represented by the general formulae: $R^{20}—(PO)_SN-(EO)_tH$, $R^{20}—(PO)_SN-(EO)_tH(EO)_tH$, and $R^{20}—N(EO)_tH$; in which $R^{20}$ is an alkyl, alkenyl or other aliphatic group, or an alkyl-aryl group of from 8 to 20, preferably 12 to 14 carbon atoms, EO is oxyethylene, PO is oxypropylene, s is 1 to 20, preferably 2-5, t is 1-10, preferably 2-5, and u is 1-10, preferably 2-5. Other variations on the scope of these compounds may be represented by the alternative formula: $R^{20}—(PO)_V—N[(EO)_wH][(EO)_zH]$ in which $R^{20}$ is as defined above, v is 1 to 20 (e.g., 1, 2, 3, or 4 (preferably 2)), and w and z are independently 1-10, preferably 2-5. These compounds are represented commercially by a line of products sold by Huntsman Chemicals as nonionic surfactants. A preferred chemical of this class includes Surfonic™ PEA 25 Amine Alkoxylate. Preferred nonionic surfactants for the compositions of the disclosure include alcohol alkoxylates, EO/PO block copolymers, alkylphenol alkoxylates, and the like.

The treatise *Nonionic Surfactants*, edited by Schick, M. J., Vol. 1 of the Surfactant Science Series, Marcel Dekker, Inc., New York, 1983 is an excellent reference on the wide variety of nonionic compounds generally employed in the practice of the present disclosure. A typical listing of nonionic classes, and species of these surfactants, is given in U.S. Pat. No. 3,929,678 issued to Laughlin and Heuring on Dec. 30, 1975. Further examples are given in "Surface Active Agents and detergents" (Vol. I and II by Schwartz, Perry and Berch).

Semi-Polar Nonionic Surfactants

The semi-polar type of nonionic surface-active agents are another class of nonionic surfactant useful in compositions of the present disclosure. Generally, semi-polar nonionics are high foaming and foam stabilizers, which can limit their application in CIP systems. However, within compositional embodiments of this disclosure designed for high foam cleaning methodology, semi-polar nonionics would have immediate utility. The semi-polar nonionic surfactants include the amine oxides, phosphine oxides, sulfoxides and their alkoxylated derivatives.

14. Amine oxides are tertiary amine oxides corresponding to the general formula:

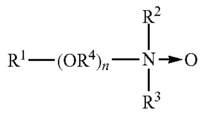

wherein the arrow is a conventional representation of a semi-polar bond; and $R^1$, $R^2$, and $R^3$ may be aliphatic, aromatic, heterocyclic, alicyclic, or combinations thereof. Generally, for amine oxides of detergent interest, $R^1$ is an alkyl radical of from about 8 to about 24 carbon atoms; $R^2$ and $R^3$ are alkyl or hydroxyalkyl of 1-3 carbon atoms or a combination thereof; $R^2$ and $R^3$ can be attached to each other, e.g., through an oxygen or nitrogen atom, to form a ring structure; $R^4$ is an alkaline or a hydroxyalkylene group containing 2 to 3 carbon atoms; and n ranges from 0 to about 20.

Useful water soluble amine oxide surfactants are selected from the coconut or tallow alkyl di-(lower alkyl) amine oxides, specific examples of which are dodecyldimethylamine oxide, tridecyldimethylamine oxide, tetradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl)amine oxide, 3,6,9-trioctadecyldimethylamine oxide and 3-dodecoxy-2-hydroxypropyldi-(2-hydroxyethyl)amine oxide.

Useful semi-polar nonionic surfactants also include the water-soluble phosphine oxides having the following structure:

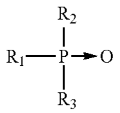

wherein the arrow is a conventional representation of a semi-polar bond; and $R^1$ is an alkyl, alkenyl or hydroxyalkyl moiety ranging from 10 to about 24 carbon atoms in chain length; and $R^2$ and $R^3$ are each alkyl moieties separately selected from alkyl or hydroxyalkyl groups containing 1 to 3 carbon atoms.

Examples of useful phosphine oxides include dimethyldecylphosphine oxide, dimethyl tetradecyl phosphine oxide, methyl ethyl tetradecyl phosphine oxide, dimethyl hexadecyl phosphine oxide, diethyl-2-hydroxyoctyldecylphosphine oxide, bis(2-hydroxyethyl)dodecyl phosphine oxide, and bis(hydroxymethyl)tetradecyl phosphine oxide.

Semi-polar nonionic surfactants useful herein also include the water-soluble sulfoxide compounds which have the structure:

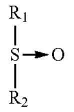

wherein the arrow is a conventional representation of a semi-polar bond; and $R^1$ is an alkyl or hydroxyalkyl moiety of about 8 to about 28 carbon atoms, from 0 to about 5 ether linkages and from 0 to about 2 hydroxyl substituents; and $R^2$ is an alkyl moiety consisting of alkyl and hydroxyalkyl groups having 1 to 3 carbon atoms.

Useful examples of these sulfoxides include dodecyl methyl sulfoxide; 3-hydroxy tridecyl methyl sulfoxide; 3-methoxy tridecyl methyl sulfoxide; and 3-hydroxy-4-dodecoxybutyl methyl sulfoxide.

Semi-polar nonionic surfactants for the compositions of the disclosure include dimethyl amine oxides, such as lauryl dimethyl amine oxide, myristyl dimethyl amine oxide, cetyl dimethyl amine oxide, combinations thereof, and the like. Useful water soluble amine oxide surfactants are selected from the octyl, decyl, dodecyl, isododecyl, coconut, or tallow alkyl di-(lower alkyl) amine oxides, specific examples of which are octyl dimethylamine oxide, nonyldimethylamine oxide, decyl dimethyl amine oxide, undecyldimethylamine oxide, dodecyldimethylamine oxide, iso-dodecyl dimethyl amine oxide, dodecyl dimethyl amine oxide (sold commercially as Barlox 12), tridecyldimethylamine oxide, tetradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl)amine oxide, 3,6,9-trioctadecyldimethylamine oxide and 3-dodecoxy-2-hydroxypropyldi-(2-hydroxyethyl)amine oxide.

Suitable nonionic surfactants suitable for use with the compositions of the present disclosure include alkoxylated surfactants. Suitable alkoxylated surfactants include EO/PO copolymers, capped EO/PO copolymers, alcohol alkoxylates, capped alcohol alkoxylates, or a combination thereof. Suitable alkoxylated surfactants for use as solvents include EO/PO block copolymers, such as the Pluronic and reverse Pluronic surfactants; alcohol alkoxylates, such as Dehypon LS-54 ($R-(EO)_5(PO)_4$) and Dehypon LS-36 ($R-(EO)_3(PO)_6$); capped alcohol alkoxylates, such as Plurafac LF221 and Tegoten EC11; alcohol ethylates such as Surfonic L24-7; or a combination thereof Anionic Surfactants Also useful in the present disclosure are surface active substances which are categorized as anionics because the charge on the hydrophobe is negative; or surfactants in which the hydrophobic section of the molecule carries no charge unless the pH is elevated to neutrality or above (e.g., carboxylic acids). Carboxylate, sulfonate, sulfate and phosphate are the polar (hydrophilic) solubilizing groups found in anionic surfactants. Of the cations (counter ions) associated with these polar groups, sodium, lithium and potassium impart water solubility; ammonium and substituted ammonium ions provide both water and oil solubility; and calcium, barium, and magnesium promote oil solubility. As those skilled in the art understand, anionics are excellent detersive surfactants and are therefore favored additions to heavy duty cleaning compositions.

Anionic sulfate surfactants suitable for use in the present compositions include alkyl ether sulfates, alkyl sulfates, the linear and branched primary and secondary alkyl sulfates, alkyl ethoxysulfates, fatty oleyl glycerol sulfates, alkyl phenol ethylene oxide ether sulfates, the $C_5$-$C_{17}$ acyl-N—($C_1$-$C_4$ alkyl) and —N—($C_1$-$C_2$ hydroxyalkyl) glucamine sulfates, and sulfates of alkylpolysaccharides such as the sulfates of alkylpolyglucoside, and the like. Also included are the alkyl sulfates, alkyl poly(ethyleneoxy) ether sulfates and aromatic poly(ethyleneoxy) sulfates such as the sulfates or condensation products of ethylene oxide and nonyl phenol (usually having 1 to 6 oxyethylene groups per molecule).

Anionic sulfonate surfactants suitable for use in the present compositions also include alkyl sulfonates, the linear and branched primary and secondary alkyl sulfonates, and the aromatic sulfonates with or without substituents.

Anionic carboxylate surfactants suitable for use in the present compositions include carboxylic acids (and salts), such as alkanoic acids (and alkanoates), ester carboxylic acids (e.g., alkyl succinates), ether carboxylic acids, sulfonated fatty acids, such as sulfonated oleic acid, and the like. Such carboxylates include alkyl ethoxy carboxylates, alkyl aryl ethoxy carboxylates, alkyl polyethoxy polycarboxylate surfactants and soaps (e.g., alkyl carboxyls). Secondary carboxylates useful in the present compositions include those which contain a carboxyl unit connected to a secondary carbon. The secondary carbon can be in a ring structure, e.g., as in p-octyl benzoic acid, or as in alkyl-substituted cyclohexyl carboxylates. The secondary carboxylate surfactants typically contain no ether linkages, no ester linkages and no hydroxyl groups. Further, they typically lack nitrogen atoms in the head-group (amphiphilic portion). Suitable secondary soap surfactants typically contain 11-13 total carbon atoms, although more carbons atoms (e.g., up to 16) can be present.

Suitable carboxylates also include acylamino acids (and salts), such as acylglutamates, acyl peptides, sarcosinates (e.g., N-acyl sarcosinates), taurates (e.g., N-acyl taurates and fatty acid amides of methyl tauride), and the like.

Suitable anionic surfactants include alkyl or alkylaryl ethoxy carboxylates of the following formula:

$$R—O—(CH_2CH_2O)_n(CH_2)_m—CO_2X \quad (3)$$

in which R is a $C_8$ to $C_{22}$ alkyl group or

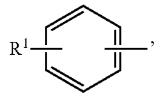

in which $R^1$ is a $C_4$-$C_{16}$ alkyl group; n is an integer of 1-20; m is an integer of 1-3; and X is a counter ion, such as hydrogen, sodium, potassium, lithium, ammonium, or an amine salt such as monoethanolamine, diethanolamine or triethanolamine. In some embodiments, n is an integer of 4 to 10 and m is 1. In some embodiments, R is a $C_5$-$C_{16}$ alkyl group. In some embodiments, R is a $C_{12}$-$C_{14}$ alkyl group, n is 4, and m is 1.

In other embodiments, R is

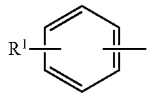

and $R^1$ is a $C_6$-$C_{12}$ alkyl group. In still yet other embodiments, $R^1$ is a $C_9$ alkyl group, n is 10 and m is 1.

Such alkyl and alkylaryl ethoxy carboxylates are commercially available. These ethoxy carboxylates are typically available as the acid forms, which can be readily converted to the anionic or salt form. Commercially available carboxylates include, Neodox 23-4, a $C_{12-13}$ alkyl polyethoxy (4) carboxylic acid (Shell Chemical), and Emcol CNP-110, a $C_9$ alkylaryl polyethoxy (10) carboxylic acid (Witco Chemical). Carboxylates are also available from Clariant, e.g., the product Sandopan® DTC, a C13 alkyl polyethoxy (7) carboxylic acid.

Cationic Surfactants

Surface active substances are classified as cationic if the charge on the hydrotrope portion of the molecule is positive. Surfactants in which the hydrotrope carries no charge unless the pH is lowered close to neutrality or lower, but which are then cationic (e.g., alkyl amines), are also included in this group. According to some embodiments, cationic surfactants, such as cationic polymers or cationic quaternary ammonium compounds are provided as deposition aids, which facilitate the deposition of the composition onto the textile surface. In theory, cationic surfactants may be synthesized from any combination of elements containing an "onium" structure RnX+Y— and could include compounds other than nitrogen (ammonium) such as phosphorus (phosphonium) and sulfur (sulfonium). In practice, the cationic surfactant field is dominated by nitrogen containing compounds, probably because synthetic routes to nitrogenous cationics are simple and straightforward and give high yields of product, which can make them less expensive.

Cationic surfactants preferably include, more preferably refer to, compounds containing at least one long carbon chain hydrophobic group and at least one positively charged nitrogen. The long carbon chain group may be attached directly to the nitrogen atom by simple substitution; or more preferably indirectly by a bridging functional group or groups in so-called interrupted alkylamines and amido amines. Such functional groups can make the molecule more hydrophilic or more water dispersible, more easily water solubilized by co-surfactant mixtures, or water soluble. For increased water solubility, additional primary, secondary or tertiary amino groups can be introduced, or the amino nitrogen can be quaternized with low molecular weight alkyl groups. Further, the nitrogen can be a part of branched or straight chain moiety of varying degrees of unsaturation or of a saturated or unsaturated heterocyclic ring. In addition, cationic surfactants may contain complex linkages having more than one cationic nitrogen atom.

The surfactant compounds classified as amine oxides, amphoterics and zwitterions are themselves typically cationic in near neutral to acidic pH solutions and can overlap surfactant classifications. Polyoxyethylated cationic surfactants generally behave like nonionic surfactants in alkaline solution and like cationic surfactants in acidic solution.

The simplest cationic amines, amine salts and quaternary ammonium compounds can be schematically drawn thus:

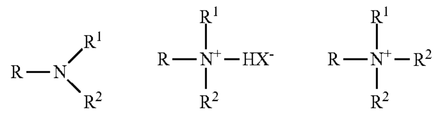

in which, R represents an alkyl chain, R', R", and R'" may be either alkyl chains or aryl groups or hydrogen and X represents an anion. The amine salts and quaternary ammonium compounds are preferred for practical use in this disclosure due to their high degree of water solubility.

The majority of large volume commercial cationic surfactants can be subdivided into four major classes and additional sub-groups known to those or skill in the art and described in "Surfactant Encyclopedia," *Cosmetics & Toiletries*, Vol. 104 (2) 86-96 (1989). The first class includes alkylamines and their salts. The second class includes alkyl imidazolines. The third class includes ethoxylated amines. The fourth class includes quaternaries, such as alkyl benzyl dimethyl ammonium salts, alkyl benzene salts, heterocyclic ammonium salts, tetra alkylammonium salts, and the like. Cationic surfactants are known to have a variety of properties that can be beneficial in the present compositions. These desirable properties can include detergency in compositions of or below neutral pH, antimicrobial efficacy, thickening or gelling in cooperation with other agents, and the like.

Cationic surfactants useful in the compositions of the present disclosure include those having the formula $R^1_mR^2_xY_LZ$ wherein each $R^1$ is an organic group containing a straight or branched alkyl or alkenyl group optionally substituted with up to three phenyl or hydroxy groups and optionally interrupted by up to four of the following structures:

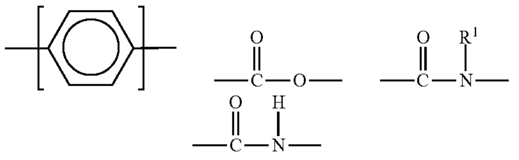

or an isomer or mixture of these structures, and which contains from about 8 to 22 carbon atoms. The $R^1$ groups can additionally contain up to 12 ethoxy groups. m is a number from 1 to 3. Preferably, no more than one $R^1$ group in a molecule has 16 or more carbon atoms when m is 2 or more than 12 carbon atoms when m is 3. Each $R^2$ is an alkyl or hydroxyalkyl group containing from 1 to 4 carbon atoms or a benzyl group with no more than one $R^2$ in a molecule being benzyl, and x is a number from 0 to 11, preferably from 0 to 6. The remainder of any carbon atom positions on the Y group are filled by hydrogens. Y is can be a group including, but not limited to:

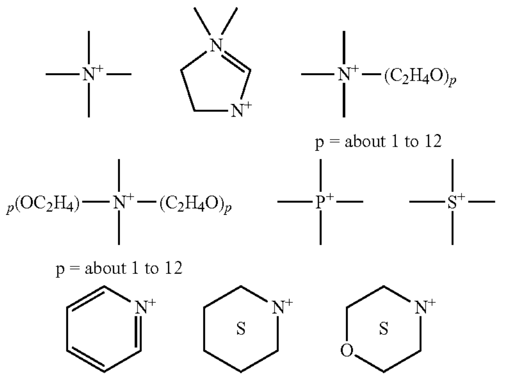

p = about 1 to 12 p = about 1 to 12 or a combination thereof. Preferably, L is 1 or 2, with the Y groups being separated by a moiety selected from $R^1$ and $R^2$ analogs (preferably alkylene or alkenylene) having from 1 to about 22 carbon atoms and two free carbon single bonds when L is 2. Z is a water-soluble anion, such as a halide, sulfate, methylsulfate, hydroxide, or nitrate anion, particularly preferred being chloride, bromide, iodide, sulfate or methyl sulfate anions, in a number to give electrical neutrality of the cationic component.

Additional suitable cationic surfactants include those derived from coconut products such as coconut oil or coconut fatty acid. Additional suitable coconut derived surfactants include, for example, complex fatty tertiary amines with cationic surfactant properties, both as free amines and in the salt form. Such surfactants include, but are not limited to N,N-Diethoxylated-N-coco-N-methylammonium chloride (also sometimes referred to as Coconut oil alkyl)bis(2-hydroxyethyl, ethoxylated)methylammonium Chloride) Such surfactants are commercially available under the trade names Ameenex™ specifically Ameenex™ 1154 and Rewoquat, specifically Rewoquat CQ 100 G.

Amphoteric Surfactants

Amphoteric, or ampholytic, surfactants contain both a basic and an acidic hydrophilic group and an organic hydrophobic group. These ionic entities may be any of anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate or phosphate provide the negative charge.

Amphoteric surfactants can be broadly described as derivatives of aliphatic secondary and tertiary amines, in which the aliphatic radical may be straight chain or branched and wherein one of the aliphatic substituents contains from about 8 to 18 carbon atoms and one contains an anionic water solubilizing group, e.g., carboxy, sulfo, sulfato, phosphato, or phosphono. Amphoteric surfactants are subdivided into two major classes known to those of skill in the art and described in "Surfactant Encyclopedia" *Cosmetics & Toiletries*, Vol. 104 (2) 69-71 (1989), which is herein incorporated by reference in its entirety. The first class includes acyl/dialkyl ethylenediamine derivatives (e.g., 2-alkyl hydroxyethyl imidazoline derivatives) and their salts. The second class includes N-alkylamino acids and their salts. Some amphoteric surfactants can be envisioned as fitting into both classes.

Amphoteric surfactants can be synthesized by methods known to those of skill in the art. For example, 2-alkyl hydroxyethyl imidazoline is synthesized by condensation and ring closure of a long chain carboxylic acid (or a derivative) with dialkyl ethylenediamine. Commercial amphoteric surfactants are derivatized by subsequent hydrolysis and ring-opening of the imidazoline ring by alkylation—for example with chloroacetic acid or ethyl acetate. During alkylation, one or two carboxy-alkyl groups react to form a tertiary amine and an ether linkage with differing alkylating agents yielding different tertiary amines.

Long chain imidazole derivatives having application in the present disclosure generally have the general formula:

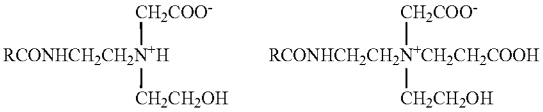

(MONO)ACETATE (DI)PROPIONATE

Neutral pH Zwitterion

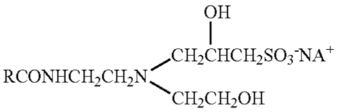

AMPHOTERIC SULFONATE wherein R is an acyclic hydrophobic group containing from about 8 to 18 carbon atoms and M is a cation to neutralize the charge of the anion, generally sodium. Commercially prominent imidazoline-derived amphoterics that can be employed in the present compositions include for example: Cocoamphopropionate, Cocoamphocarboxy-propionate, Cocoamphoglycinate, Cocoamphocarboxy-glycinate, Cocoamphopropyl-sulfonate, and Cocoamphocarboxy-propionic acid. Amphocarboxylic acids can be produced from fatty imidazolines in which the dicarboxylic acid functionality of the amphodicarboxylic acid is diacetic acid or dipropionic acid.

The carboxymethylated compounds (glycinates) described herein above frequently are called betaines. Betaines are a special class of amphoteric discussed herein below in the section entitled, Zwitterion Surfactants.

Long chain N-alkylamino acids are readily prepared by reaction $RNH_2$, in which R═$C_8$-$C_{18}$ straight or branched chain alkyl, fatty amines with halogenated carboxylic acids. Alkylation of the primary amino groups of an amino acid leads to secondary and tertiary amines. Alkyl substituents may have additional amino groups that provide more than one reactive nitrogen center. Most commercial N-alkylamine acids are alkyl derivatives of beta-alanine or beta-N(2-carboxyethyl) alanine. Examples of commercial N-alkylamino acid ampholytes having application in this disclosure include alkyl beta-amino dipropionates, $RN(C_2H_4COOM)_2$ and $RNHC_2H_4COOM$. In an embodiment, R can be an acyclic hydrophobic group containing from about 8 to about 18 carbon atoms, and M is a cation to neutralize the charge of the anion.

Suitable amphoteric surfactants include those derived from coconut products such as coconut oil or coconut fatty acid. Additional suitable coconut derived surfactants include as part of their structure an ethylenediamine moiety, an alkanolamide moiety, an amino acid moiety, e.g., glycine, or a combination thereof; and an aliphatic substituent of from about 8 to 18 (e.g., 12) carbon atoms. Such a surfactant can also be considered an alkyl amphodicarboxylic acid. These amphoteric surfactants can include chemical structures represented as: $C_{12}$-alkyl-C(O)—NH—$CH_2$—$CH_2$—$N^+$($CH_2$—$CH_2$—$CO_2Na$)$_2$—$CH_2$—$CH_2$—OH or $C_{12}$-alkyl-C(O)—N(H)—$CH_2$—$CH_2$—$N^+$($CH_2$—$CO_2Na$)$_2$—$CH_2$—$CH_2$—OH. Disodium cocoampho dipropionate is one suitable amphoteric surfactant and is commercially available under the tradename Miranol™ FBS from Rhodia Inc., Cranbury, N.J. Another suitable coconut derived amphoteric surfactant with the chemical name disodium cocoampho diacetate is sold under the tradename Mirataine™ JCHA, also from Rhodia Inc., Cranbury, N.J.

A typical listing of amphoteric classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references are herein incorporated by reference in their entirety.

Zwitterionic Surfactants

Zwitterionic surfactants can be thought of as a subset of the amphoteric surfactants and can include an anionic charge. Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. Typically, a zwitterionic surfactant includes a positive charged quaternary ammonium or, in some cases, a sulfonium or phosphonium ion; a negative charged carboxyl group; and an alkyl group. Zwitterionics generally contain cationic and anionic groups which ionize to a nearly equal degree in the isoelectric region of the molecule and which can develop strong "inner-salt" attraction between positive-negative charge centers. Examples of such zwitterionic synthetic surfactants include derivatives of aliphatic quaternary ammonium, phosphonium, and sulfonium compounds, in which the aliphatic radicals can be straight chain or branched, and wherein one of the aliphatic substituents contains from 8 to 18 carbon atoms and one contains an anionic water solubilizing group, e.g., carboxy, sulfonate, sulfate, phosphate, or phosphonate.

Betaine and sultaine surfactants are example zwitterionic surfactants for use herein. A general formula for these compounds is:

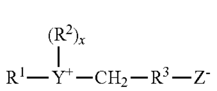

wherein $R^1$ contains an alkyl, alkenyl, or hydroxyalkyl radical of from 8 to 18 carbon atoms having from 0 to 10 ethylene oxide moieties and from 0 to 1 glyceryl moiety; Y is selected from the group consisting of nitrogen, phosphorus, and sulfur atoms; $R^2$ is an alkyl or monohydroxy alkyl group containing 1 to 3 carbon atoms; x is 1 when Y is a sulfur atom and 2 when Y is a nitrogen or phosphorus atom, $R^3$ is an alkylene or hydroxy alkylene or hydroxy alkylene of from 1 to 4 carbon atoms and Z is a radical selected from the group consisting of carboxylate, sulfonate, sulfate, phosphonate, and phosphate groups.

Examples of zwitterionic surfactants having the structures listed above include: 4-[N,N-di(2-hydroxyethyl)-N-octadecylammonio]-butane-1-carboxylate; 5-[S-3-hydroxypropyl-S-hexadecylsulfonio]-3-hydroxypentane-1-sulfate; 3-[P,P-diethyl-P-3,6,9-trioxatetracosanephosphonio]-2-hydroxypropane-1-phosphate; 3-[N,N-dipropyl-N-3-dodecoxy-2-hydroxypropyl-ammonio]-propane-1-phosphonate; 3-(N,N-dimethyl-N-hexadecylammonio)-propane-1-sulfonate; 3-(N,N-dimethyl-N-hexadecylammonio)-2-hydroxy-propane-1-sulfonate; 4-[N,N-di(2(2-hydroxyethyl)-N(2-hydroxydodecyl)ammonio]-butane-1-carboxylate; 3-[S-ethyl-S-(3-dodecoxy-2-hydroxypropyl)sulfonio]-propane-1-phosphate; 3-[P,P-dimethyl-P-dodecylphosphonio]-propane-1-phosphonate; and S[N,N-di(3-hydroxypropyl)-N-hexadecylammonio]-2-hydroxy-pentane-1-sulfate. The alkyl groups contained in said detergent surfactants can be straight or branched and saturated or unsaturated.

The zwitterionic surfactant suitable for use in the present compositions includes a betaine of the general structure:

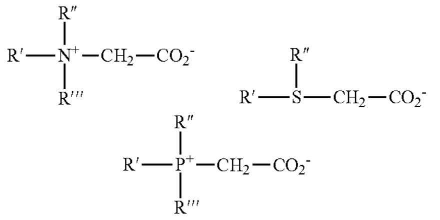

These surfactant betaines typically do not exhibit strong cationic or anionic characters at pH extremes, nor do they show reduced water solubility in their isoelectric range. Unlike "external" quaternary ammonium salts, betaines are compatible with anionics. Examples of suitable betaines include coconut acylamidopropyldimethyl betaine; hexadecyl dimethyl betaine; $C_{12-14}$ acylamidopropylbetaine; $C_{8-14}$ acylamidohexyldiethyl betaine; 4-$C_{14-16}$ acylmethylamidodiethylammonio-1-carboxybutane; $C_{16-18}$ acylamidodimethylbetaine; $C_{12-16}$ acylamidopentanediethylbetaine; and $C_{12-16}$ acylmethylamidodimethylbetaine.

Sultaines useful in the present disclosure include those compounds having the formula $(R(R^1)_2N^+R^2SO^{3-}$, in which R is a $C_6$-$C_{18}$ hydrocarbyl group, each $R^1$ is typically independently $C_1$-$C_3$ alkyl, e.g., methyl, and $R^2$ is a $C_1$-$C_6$ hydrocarbyl group, e.g., a $C_1$-$C_3$ alkylene or hydroxyalkylene group.

A typical listing of zwitterionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references are herein incorporated in their entirety.

Water Conditioning Agent

The cleaning compositions can optionally include a water conditioning agent. Water conditioning agents aid in removing metal compounds and in reducing harmful effects of hardness components in service water. Example water conditioning agents include antiredeposition agents, chelating agents, sequestering agents and inhibitors. Polyvalent metal cations or compounds such as a calcium, a magnesium, an iron, a manganese, or a molybdenum cation or compound, or combination thereof, can be present in service water and in complex soils. Such compounds or cations can interfere with the effectiveness of a washing or rinsing compositions during a cleaning application. A water conditioning agent can effectively complex and remove such compounds or cations from soiled surfaces and can reduce or eliminate the inappropriate interaction with active ingredients including the nonionic surfactants and anionic surfactants of the disclosure. Both organic and inorganic water conditioning agents can be used in the cleaning compositions.

Suitable organic water conditioning agents can include both polymeric and small molecule water conditioning agents. Organic small molecule water conditioning agents are typically organocarboxylate compounds or organophosphate water conditioning agents. Polymeric inhibitors commonly comprise polyanionic compositions such as polyacrylic acid compounds. More recently the use of sodium carboxymethyl cellulose as an antiredeposition agent was discovered. This is discussed more extensively in U.S. Pat. No. 8,729,006 to Miralles et al., which is incorporated herein in its entirety.

Small molecule organic water conditioning agents include, but are not limited to: sodium gluconate, sodium glucoheptonate, N-hydroxy ethylene diamine triacetic acid (HEDTA), ethylenediaminetetraacetic acid (EDTA), nitrilotriacetic acid (NTA), diethylenetriaminepentaacetic acid (DTPA), ethylene diamine tetraproprionic acid, triethylenetetraaminehexaacetic acid (TTHA), and the respective alkali metal, ammonium and substituted ammonium salts thereof, ethylenediaminetetraacetic acid tetrasodium salt (EDTA), nitrilotriacetic acid trisodium salt (NTA), ethanol diglycine disodium salt (EDG), diethanolglycine sodium-salt (DEG), and 1,3-propylenediaminetetraacetic acid (PDTA), dicarboxymethyl glutamic acid tetrasodium salt (GLDA), methylglycine-N—N-diacetic acid trisodium salt (MGDA), and iminodisuccinate sodium salt (IDS). All of these are known and commercially available.

Suitable inorganic water conditioning agents include, but are not limited to, sodium tripolyphosphate and other higher linear and cyclic polyphosphates species.

Builders/Chelating and Sequestering Agents

The cleaning compositions can also include effective amounts of chelating/sequestering agents, also referred to as builders. In addition, the cleaning compositions may optionally include one or more additional builders as a functional ingredient. In general, a chelating agent is a molecule capable of coordinating (i.e., binding) the metal ions commonly found in water sources to prevent the metal ions from interfering with the action of the other ingredients of a rinse aid or other cleaning composition. The chelating/sequestering agent may also function as a water conditioning agent when included in an effective amount.

Often, the cleaning composition is also phosphate-free or sulfate-free. In embodiments, the cleaning compositions can be phosphate-free, the additional functional materials, including builders exclude phosphorous-containing compounds such as condensed phosphates and phosphonates.

Suitable additional builders include aminocarboxylates and polycarboxylates. Some examples of aminocarboxylates useful as chelating/sequestering agents, include, N-hydroxyethyliminodiacetic acid, nitrilotriacetic acid (NTA), ethylenediaminetetraacetic acid (EDTA), N-hydroxyethyl-ethylenediaminetriacetic acid (HEDTA), diethylenetriaminepentaacetic acid (DTPA), and the like. Some examples of polymeric polycarboxylates suitable for use as sequestering agents include those having a pendant carboxylate (—$CO_2$) groups and include, for example, polyacrylic acid, maleic/olefin copolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, hydrolyzed acrylonitrile-methacrylonitrile copolymers, and the like.

In embodiments, the cleaning composition is not phosphate-free and may include added chelating/sequestering agents comprising phosphates, such as a condensed phosphate, a phosphonate, and the like. Some examples of condensed phosphates include sodium and potassium orthophosphate, sodium and potassium pyrophosphate, sodium tripolyphosphate, sodium hexametaphosphate, and the like. A condensed phosphate may also assist, to a limited extent, in solidification of the composition by fixing the free water present in the composition as water of hydration.

In embodiments of the cleaning composition which are not phosphate-free, the composition may include a phosphonate such as 1-hydroxyethane-1,1-diphosphonic acid $CH_3C(OH)[PO(OH)_2]_2$; aminotri(methylene phosphonic acid) $N[CH_2PO(OH)_2]_3$; aminotri(methylene phosphonate), sodium salt

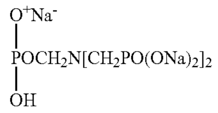

2-hydroxyethyliminobis(methylene phosphonic acid) $HOCH_2CH_2N[CH_2PO(OH)_2]_2$; diethylenetriaminepenta(methylene phosphonic acid) $(HO)_2POCH_2N[CH_2N[CH_2PO(OH)_2]_2]_2$; diethylenetriaminepenta(methylene phosphonate), sodium salt $C_9H_{(28-x)}N_3Na_xO_{15}P_5$ (x=7); hexamethylenediamine(tetramethylene phosphonate), potassium salt $C_{10}H_{(28-x)}N_2K_xO_{12}P_4$ (x=6); bis(hexamethylene)triamine(pentamethylene phosphonic acid) $(HO_2)POCH_2N[(CH_2)_6N[CH_2PO(OH)_2]_2]_2$; and phosphorus acid $H_3PO_3$. In some embodiments, a phosphonate combination such as ATMP and DTPMP may be used. A neutralized or alkaline phosphonate, or a combination of the phosphonate with an alkali source prior to being added into the mixture such that there is little or no heat or gas generated by a neutralization reaction when the phosphonate is added can be used.

For a further discussion of chelating agents/sequestrants, see Kirk-Othmer, Encyclopedia of Chemical Technology, Third Edition, volume 5, pages 339-366 and volume 23, pages 319-320, the disclosure of which is incorporated by reference herein.

When present, the compositions include from about 0.1 wt. % to about 15 wt. % of one or more chelants, including from about 1 wt. % to about 10 wt. % chelant, from about 1 wt. % to about 5 wt. % chelant, inclusive of all integers within the defined range.

Defoaming Agent

The cleaning compositions employed in some of the cleaning steps can comprise a defoamer. Defoaming agents include a variety of different materials adapted for defoaming a variety of compositions. Defoaming agents can comprise an anionic or nonionic material such as polyethylene glycol, polypropylene glycol, fatty acids and fatty acid derivatives, fatty acid sulfates, phosphate esters, sulfonated materials, silicone-based compositions, and others.

Preferred silicone defoaming agents can include a polydialkylsiloxane, such as polydimethylsiloxane, or a silicone emulsion such as silicone emulsion. In some embodiments, silicone based defoaming agents can be combined with silica, including, for example silica, fumed silica, derivatized silica, and silanized silica.

Preferred fatty acid defoaming agents can comprise simple alkali metal or alkaline earth metal salts of a fatty acid or fatty acid derivatives. Examples of such derivatives include mono, di- and tri-fatty acid esters of polyhydroxy compounds such as ethylene glycol, glycerin, propylene glycol, hexylene glycol, etc. Preferably such defoaming agents comprise a fatty acid monoester of glycerol. Fatty acids useful in such defoaming compositions can include any C8-24 saturated or unsaturated, branched or unbranched mono or polymeric fatty acid and salts thereof, including for example myristic acid, palmitic acid, stearic acid, behenic acid, lignoceric acid, palmitoleic acid, oleic acid, linoleic acid, arachidonic acid, and others commonly available.

Other suitable defoaming agents include water insoluble waxes, preferably microcrystalline wax, petroleum wax, synthetic petroleum wax, rice base wax, beeswax having a melting point in the range from about 35° C. to 125° C. with a low saponification value, white oils, etc.

When a defoaming agent is added it can be added in an amount suitable to reduce foam to the desired amount. Thus, the amount of defoaming agent added can depend on the other ingredients in the formulation.

Enzyme

Embodiments of the disclosure can include the use of one or more enzymes. The one or more enzymes can comprise a protease. The one or more enzymes can comprise an amylase. In certain embodiments, the methods employ a protease and an amylase. The enzymes can be included in a cleaning composition in any step of the methods. In some preferred embodiments, the enzymes are in a booster composition used in the pre-wash step or in its own step.

Protease enzymes are particularly advantageous for cleaning soils containing protein, such as blood, cutaneous scales, mucus, grass, food (e.g., egg, milk, spinach, meat residue, tomato sauce), or the like. Additionally, proteases have the ability to retain their activity at elevated temperatures. Protease enzymes are capable of cleaving macromolecular protein links of amino acid residues and convert substrates into small fragments that are readily dissolved or dispersed into the aqueous use solution. Proteases are often referred to as detersive enzymes due to the ability to break soils through the chemical reaction known as hydrolysis. Protease enzymes can be obtained, for example, from *Bacillus subtilis, Bacillus licheniformis* and *Streptomyces griseus*. Protease enzymes are also commercially available as serine endoproteases.

Examples of commercially available protease enzymes are available under the following trade names: Esperase, Purafect, Purafect L, Purafect Ox, Everlase, Liquanase, Savinase, Prime L, Prosperase and Blap.

The enzyme compositions can be an independent entity or may be formulated in combination with a cleaning composition. According to an embodiment, an enzyme composition may be formulated into the cleaning compositions in either liquid or solid formulations. In addition, enzyme compositions may be formulated into various delayed or controlled release formulations. For example, a solid molded cleaning composition may be prepared without the addition of heat. As a skilled artisan will appreciate, enzymes tend to become denatured by the application of heat and therefore use of enzymes within cleaning compositions require methods of forming a cleaning composition that does not rely upon heat as a step in the formation process, such as solidification. Enzymes can improve cleaning in cold water wash conditions. Further, cold water wash conditions can ensure the enzymes are not thermally denatured.

The enzyme composition may further be obtained commercially in a solid (i.e., puck, powder, etc.) or liquid formulation. Commercially available enzymes are generally combined with stabilizers, buffers, cofactors and inert vehicles. The actual active enzyme content depends upon the method of manufacture, which is well known to a skilled artisan and such methods of manufacture are not critical to the present disclosure.

Alternatively, the enzyme composition may be provided separate from the cleaning composition, such as added directly to the wash liquor or wash water of a particular application of use, e.g., laundry machine or dishwasher.

Additional description of enzyme compositions suitable for use in the cleaning methods is disclosed for example in U.S. Pat. Nos. 7,670,549, 7,723,281, 7,670,549, 7,553,806, 7,491,362, 6,638,902, 6,624,132, and 6,197,739 and U.S. Patent Publication Nos. 2012/0046211 and 2004/0072714, each of which are herein incorporated by reference in its entirety. In addition, the reference "Industrial Enzymes", Scott, D., in Kirk-Othmer Encyclopedia of Chemical Technology, 3rd Edition, (editors Grayson, M. and EcKroth, D.) Vol. 9, pp. 173-224, John Wiley & Sons, New York, 1980 is incorporated herein in its entirety.

Enzyme Stabilizer

The cleaning compositions and methods can optionally include enzyme stabilizers (or stabilizing agent(s)) which may be dispensed manually or automatically into a use solution of the cleaning composition or enzyme composition. In the alternative, a stabilizing agent and enzyme may be formulated directly into the cleaning compositions. The formulations of the cleaning compositions or the enzyme composition may vary based upon the particular enzymes or stabilizing agents employed.

In an embodiment, the stabilizing agent is a starch, poly sugar, amine, amide, polyamide, or poly amine. In still further aspects, the stabilizing agent may be a combination of any of the aforementioned stabilizing agents. In an embodiment, the stabilizing agent may include a starch and optionally an additional food soil component (e.g., fat or protein). In an embodiment, the stabilizing agent is a poly sugar. Beneficially, poly sugars are biodegradable and often classified as Generally Recognized As Safe (GRAS). Example poly sugars include, but are not limited to amylose, amylopectin, pectin, inulin, modified inulin, potato starch, modified potato starch, corn starch, modified corn starch, wheat starch, modified wheat starch, rice starch, modified rice starch, cellulose, modified cellulose, dextrin, dextran, maltodextrin, cyclodextrin, glycogen, oligofructose and other soluble starches. Particularly suitable poly sugars include, but are not limited to: inulin, carboxymethyl inulin, potato starch, sodium carboxymethylcellulose, linear sulfonated alpha-(1,4)-linked D-glucose polymers, gamma-cyclodextrin and the like. Combinations of poly sugars may also be used according to embodiments of the disclosure.

The stabilizing agent according to the disclosure may be an independent entity or may be formulated in combination with the cleaning composition or enzyme composition. According to an embodiment of the disclosure, a stabilizing agent may be formulated into the cleaning composition (with or without the enzyme) in either liquid or solid formulations. In addition, stabilizing agent compositions may be formulated into various delayed or controlled release formulations. For example, a solid molded cleaning composition may be prepared without the addition of heat. Alternatively, the stabilizing agent may be provided separate from the detergent or enzyme composition, such as added directly to the wash liquor or wash water of a particular application of use, e.g., dishwasher.

Stabilizing Agent

The compositions may optionally include at least one stabilizing agent, such as a carrier or solvent. Suitable solvents for the detergent compositions include water and other solvents such as lipophilic fluids. Examples of suitable lipophilic fluids include glycol ethers, glycerin derivatives such as glycerin ethers, perfluorinated amines, perfluorinated and hydrofluoroether solvents, low volatility nonfluorinated organic solvents, diol solvents, siloxanes, other silicones, hydrocarbons, other environmentally friendly or a combination thereof. In some embodiments, the solvent includes water, propylene glycol, or dipropylene glycol methyl ether.

In other aspects, examples of suitable carriers include, but are not limited to organic solvents, such as simple alkyl alcohols, e.g., ethanol, isopropanol, n-propanol, benzyl alcohol, and the like. Polyols are also useful carriers, including glycerol, sorbitol, and the like. Suitable carriers include glycol ethers. Suitable glycol ethers include diethylene glycol n-butyl ether, diethylene glycol n-propyl ether, diethylene glycol ethyl ether, diethylene glycol methyl ether, diethylene glycol t-butyl ether, dipropylene glycol n-butyl ether, dipropylene glycol methyl ether, dipropylene glycol ethyl ether, dipropylene glycol propyl ether, dipropylene glycol tert-butyl ether, ethylene glycol butyl ether, ethylene glycol propyl ether, ethylene glycol ethyl ether, ethylene glycol methyl ether, ethylene glycol methyl ether acetate, propylene glycol n-butyl ether, propylene glycol ethyl ether, propylene glycol methyl ether, propylene glycol n-propyl ether, tripropylene glycol methyl ether and tripropylene glycol n-butyl ether, ethylene glycol phenyl ether, propylene glycol phenyl ether, and the like, or a combination thereof.

In other aspects, examples of suitable stabilizing agents include, but are not limited to borate, calcium ions, magnesium ions, or a combination thereof. The concentrate need not include a stabilizing agent, but when the concentrate includes a stabilizing agent, it can be included in an amount that provides the desired level of stability of the concentrate.

In an embodiment, the compositions include from about 1 wt. % to about 50 wt. % solvents or stabilizing agents, from about 5 wt. % to about 50 wt. % solvents or stabilizing agents, from about 10 wt. % to about 50 wt. % solvents or stabilizing agents, and preferably from about 10 wt. % to about 30 wt. % solvents or stabilizing agents, inclusive of all integers within these ranges.

Polymer

In some embodiments the compositions include one or more polymers A polymer can be beneficial to serve as a binder, improve performance, and inhibit crystal growth thereby preventing precipitation of carbonates. Suitable polymers include but are not limited to high molecular weight polyacrylates (or polyacrylic acid homopolymers). Suitable high molecular weight polyacrylates can have a molecular weight of at least about 5000. The high molecular weight polyacrylates can contain a polymerization unit derived from the monomer selected from the group consisting of acrylic acid, methacrylic acid, methyl acrylate, methyl methacrylate, ethyl acrylate, ethyl methacrylate, butyl acrylate, butyl methacrylate, iso-butyl acrylate, iso-butyl methacrylate, iso-octyl acrylate, iso-octyl methacrylate, cyclohexyl acrylate, cyclohexyl methacrylate, glycidyl acrylate, glycidyl methacrylate, hydroxyethyl acrylate, hydroxypropyl acrylate, 2-hydroxyethyl acrylate, 2-hydroxyethyl methacrylate, 2-hydroxypropyl acrylate, 2-hydroxypropyl methacrylate and hydroxypropyl methacrylate or a combination thereof.

Methacrylic acid, methyl acrylate, methyl methacrylate, butyl acrylate, butyl methacrylate, iso-butyl acrylate, isobutyl methacrylate, hydroxyethyl acrylate, 2-hydroxyethyl acrylate, 2-hydroxyethyl methacrylate, 2-hydroxypropyl acrylate, and 2-hydroxypropyl methacrylate, or a combination thereof, are preferred.

The above-mentioned acrylate monomers can be selected from the group consisting of methyl acrylate, methyl methacrylate, butyl acrylate, 2-phenoxy ethyl acrylate, ethoxylated 2-phenoxy ethyl acrylate, 2-(2-ethoxyethoxy)ethyl acrylate, cyclic trimethylolpropane formal acrylate, O-carboxyethyl acrylate, lauryl(meth)acrylate, isooctyl acrylate, stearyl(meth)acrylate, isodecyl acrylate, isobornyl(meth) acrylate, benzyl acrylate, hydroxypivalyl hydroxypivalate diacrylate, ethoxylated 1,6-hexanediol diacrylate, dipropylene glycol diacrylate, ethoxylated dipropylene glycol diacrylate, neopentyl glycol diacrylate, propoxylated neopentyl glycol diacrylate, ethoxylated bisphenol-A di(meth)acrylate, 2-methyl-1,3-propanediol diacrylate, ethoxylated 2-methyl-1,3-propanediol diacrylate, 2-butyl-2-ethyl-1,3-propanediol diacrylate, ethylene glycol dimethacrylate, diethylene glycol dimethacrylate, 2-hydroxyethyl methacrylate phosphate, tris (2-hydroxy ethyl)isocyanurate triacrylate, pentaerythritol triacrylate, ethoxylated trimethylolpropane triacrylate, propoxylated trimethylolpropane triacrylate, trimethylolpropane trimethacrylate, pentaerythritol tetraacrylate, ethoxylated pentaerythritol tetraacrylate, di(trimethylolpropane) tetraacrylate, propoxylated pentaerythritol tetraacrylate, pentaerythritol tetraacrylate, dipentaerythritol hexaacrylate, (meth)acrylate, hydroxyethyl acrylate (HEA), 2-hydroxyethyl methacrylate (HEMA), tripropylene glycol di(meth) acrylate-1,4-butanediol di(meth)acrylate, 1,6-hexanediol di(meth)acrylate, allylated cyclohexyl di(meth)acrylate, isocyanurate di(meth)acrylate, ethoxylated trimethylol propane tri(meth)acrylate, propoxylated glycerol tri(meth)acrylate, trimethylol propane tri(meth)acrylate, and tris(acryloxyethyl)isocyanurate, or a combination thereof.

Preferred are polyacrylic acids, $(C_3H_4O_2)_n$ or 2-Propenoic acid homopolymers; Acrylic acid polymer; Poly(acrylic acid); Propenoic acid polymer; PAA have the following structural formula:

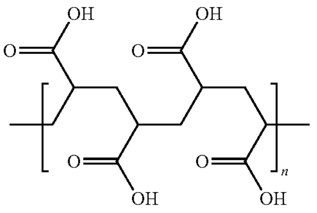

where n is any integer.

One source of commercially available polyacrylates (polyacrylic acid homopolymers) useful for the disclosure includes the Acusol 445 series from The Dow Chemical Company, Wilmington Delaware, USA, including, for example, Acusol® 445 (acrylic acid polymer, 48% total solids) (4500 MW), Acusol® 445N (sodium acrylate homopolymer, 45% total solids)(4500 MW), and Acusol®445ND (powdered sodium acrylate homopolymer, 93% total solids)(4500 MW) Other polyacrylates (polyacrylic acid homopolymers) commercially available from Dow Chemical Company suitable for the disclosure include, but are not limited to Acusol 929 (10,000 MW) and Acumer 1510. Yet another example of a commercially available polyacrylic acid is AQUATREAT AR-6 (100,000 MW).

When present, the compositions one or more polymers in an amount of between about 1 wt. % to about 10 wt. % of the composition, from about 2 wt. % to about 10 wt. % of the composition, from about 4 wt. % to about 7.5 wt. % of the composition, and more preferably about 5 wt. % of the composition, inclusive of all integers within these ranges.

Acrylic Acid Polymer

In addition, or in alternative to the polymers described herein, the compositions may include an acrylic acid polymer. As referred to herein, the acrylic acid polymer refers to a copolymer or terpolymer as disclosed herein. In addition, as used herein the term acrylic refers to acrylic or methacrylic. In an embodiment, the compositions include from about 0.1 wt. % to about 15 wt. % acrylic acid polymer, from about 1 wt. % to about 10 wt. % acrylic acid polymer, from about 1 wt. % to about 10 wt. % acrylic acid polymer, preferably from about 1 wt. % to about 5 wt. % acrylic acid polymer. In addition, without being limited according to the disclosure, all ranges recited are inclusive of the numbers defining the range, including for example each integer within the defined range.

The acrylic acid polymer has at least 50 wt. % polymerized residues of acrylic monomers, preferably at least 60 wt. %, preferably at least 70 wt. %, preferably at least 80 wt. %, preferably at least 90 wt. %, or preferably at least 95 wt. %. Acrylic monomers include acrylic acids, methacrylic acids and their $C_1$-$C_{25}$ alkyl or hydroxyalkyl esters, including for example monomers of structure $H_2C{=}C(R)CRCO_2(CH_2CH_2O)_n(CH(R')CH_2O)_m$— R"; crotonic acid, itaconic acid, fumaric acid, maleic acid, maleic anhydride, (meth) acrylamides, (meth)acrylonitrile and alkyl or hydroxyalkyl esters of crotonic acid, itaconic acid, fumaric acid or maleic acid.

The acrylic acid polymer is provided in an aqueous composition with the polymer as discrete particles dispersed therein. The acrylic polymer comprising other polymerized monomer residues, may include for example, non-ionic (meth)acrylate esters, cationic monomers, $H_2C{=}C(R)C_6H_4C(CH_3)_2NHCO_2(CH_2CH_2O)_n(CH(R')CH_2O)_mR"$, $H_2C{=}C(R)C(O)X(CH_2CH_2O)_n(CH(R')CH_2O)_mR"$—, monounsaturated dicarboxylates, vinyl esters, vinyl amides (e.g., N-vinylpyrrolidone), sulfonated acrylic monomers, vinyl sulfonic acid, vinyl halides, phosphorus-containing monomers, heterocyclic monomers, styrene and substituted styrenes. In a preferred aspect, the polymer contains no more than 5 wt. % sulfur- or phosphorus-containing monomers, preferably no more than 3 wt. %, preferably no more than 2 wt. %, preferably no more than 1 wt. %.

The acrylic acid polymer may comprise, consist of or consist essentially of polymerized residues of:

(i) C1-C18 alkyl (meth)acrylates;

(ii) C3-C6 carboxylic acid monomers, wherein the monomer is a mono-ethylenically unsaturated compound having one or two carboxylic acid groups. For example, the monomer may include acrylic acid, methacrylic acid, maleic acid, fumaric acid, itaconic acid, maleic anhydride, crotonic acid, etc.; and (iii) monomers having the following structures $H_2C{=}C(R)C(O)X(CH_2CH_2O)_n(CH(R')CH_2O)_mR"$ or $H_22C{=}C(R)C_6H_4C(CH_3)_2NHCO_2(CH_2CH_2O)_n(CH(R')CH_2O)_mR"$; wherein X is O or NH, R is H or $CH_3$, R' is $C_1$-$C_2$ alkyl; R" is $C_8$-$C_{25}$ alkyl, $C_8$-$C_{16}$ alkyl phenyl or $C_{13}$-$C_{36}$ aralkylphenyl; n is an average number from 6-100 and m is an average number from 0-50, provided that n≥m and m+n is 6-100.

As referred to herein, alkyl groups are saturated hydrocarbyl groups which may be straight or branched. Aralkyl groups are alkyl groups substituted by aryl groups. Examples of aralkyl groups include, for example, benzyl, 2-phenylethyl and 1-phenylethyl. Aralkylphenyl groups are phenyl groups having one or more aralkyl substituents.

In an embodiment, the polymer has a weight average molecular weight of at least 25,000, at least 50,000, at least 100,000, at least 150,000, preferably at least 180,000, preferably at least 200,000, preferably at least 300,000. In some cases, including cross-linked polymers, the MW can be as high as 10,000,000. In preferred aspects, the MW is less than 5,000,000, less than 2,000,000, and more preferably less than 1,000,000.

Cross-linked polymers, such as a monomer having two or more non-conjugated ethylenically unsaturated groups, included with the copolymer components during polymerization. Examples of such monomers include, di- or tri-allyl ethers and di- or tri-(meth)acrylic esters of diols or polyols (e.g., trimethylolpropane diallyl ether (TMPDE), ethylene glycol dimethacrylate), di- or tri-allyl esters of di- or tri-acids, allyl (meth)acrylate, divinyl sulfone, triallyl phosphate, divinyl aromatics (e.g., divinylbenzene). In a preferred aspect, the amount of polymerized crosslinker residue in the polymer is less than 0.3 wt. %, less than 0.2 wt. %, less than 0.1 wt. %, less than 0.05 wt. %, or less than 0.01 wt. %.

In a preferred aspect, polymerized residues may include from 40 to 65 wt. % C1-C18 alkyl (meth)acrylates; from 25 to 55 wt. % C3-C6 carboxylic acid monomers; and from 0 to 20 wt. % of monomers having the following structures $H_2C{=}C(R)C(O)X(CH_2CH_2O)_n(CH(R')CH_2O)_mR"$ or $H_22C{=}C(R)C_6H_4C(CH_3)_2NHCO_2(CH_2CH_2O)_n(CH(R')CH_2O)_mR"$; wherein X is O or NH, R is H or $CH_3$, R' is $C_1$-$C_2$ alkyl; R" is $C_8$-$C_{25}$ alkyl, $C_8$-$C_{16}$ alkyl phenyl or $C_{13}$-$C_{36}$ aralkylphenyl; n is an average number from 6-100 and m is an average number from 0-50, provided that n≥m and m+n is 6-100.

A commercially available acrylic acid polymer is a methacrylic acid/ethyl acrylate polymer (Acusol 845, Dow Chemical) which beneficially suspends both oils and metals according to the formulated compositions according to the disclosure for industrial laundering. Additional disclosure of suitable embodiments of the acrylic acid polymer is set forth in U.S. Publication Nos. 2012/0165242 and 2012/0015861, which are herein incorporated by reference in their entirety.

Colorant

The finishing composition can optionally comprise a colorant. Preferred colorants include natural and synthetic colorants or dyes. Most preferably the colorant comprises FD&C Blue 1 (Sigma Chemical), FD&C Yellow 5 (Sigma Chemical), Direct Blue 86 (Miles), Fastusol Blue (Mobay Chemical Corp.), Acid Orange 7 (American Cyanamid), Basic Violet 10 (Sandoz), Acid Yellow 23 (GAF), Acid Yellow 17 (Sigma Chemical), Sap Green (Keyston Analine and Chemical), Metanil Yellow (Keystone Analine and Chemical), Acid Blue 9 (Hilton Davis), Sandolan Blue/Acid Blue 182 (Sandoz), Hisol Fast Red (Capitol Color and Chemical), Fluorescein (Capitol Color and Chemical), Acid Green 25 (Ciba-Geigy), or a combination thereof.

In an embodiment, the colorant or dye may comprise dyes which are generally recognized as safe. Suitable dyes include, but are not limited to, FDC Blue #1, FDC Blue #2, FDC Green #3, FDC Red #3, FDC Red #4, FDC Red #40, Violet #1, FDC Yellow #5, and FDC Yellow #6.

When present, the colorant may be present in an amount of between about 0.001 wt. % and about 5 wt. %, more preferably between about 0.01 wt. % and about 2 wt. %, most preferably between about 0.1 wt. % and about 1 wt. %, inclusive of all integers within this range.

Fragrance

The finishing composition can optionally comprise a fragrance. Preferred fragrances include natural and synthetic fragrances and perfumes. Most preferably the fragrance comprises terpenoids such as citronellol, aldehydes such as amyl cinnamaldehyde, a jasmine such as C1S-jasmine or jasmal, vanillin, and the like, or a combination thereof Solidification Agent If it is desirable to prepare compositions as a solid, one or more solidification agents may be included into the composition. In some embodiments, the solidification agent can form or maintain the composition as a solid rinse aid composition. In other embodiments, the solidification agent can solidify the composition without unacceptably detracting from the eventual release of the active ingredients. The solidification agent can include, for example, an organic or inorganic solid compound having a neutral inert character or making a functional, stabilizing or detersive contribution to the present composition. Suitable solidification agents include solid polyethylene glycol (PEG), solid polypropylene glycol, solid EO/PO block copolymer, amide, urea (also known as carbamide), nonionic surfactant (which can be employed with a coupler), anionic surfactant, starch that has been made water-soluble (e.g., through an acid or alkaline treatment process), cellulose that has been made water-soluble, inorganic agent, poly(maleic anhydride/methyl vinyl ether), polymethacrylic acid, other generally functional or inert materials with high melting points, or a combination thereof.

Suitable glycol solidification agents include a solid polyethylene glycol or a solid polypropylene glycol, which can, for example, have molecular weight of about 1,400 to about 30,000. In certain embodiments, the solidification agent includes or is solid PEG, for example PEG 1500 up to PEG 20,000. In certain embodiments, the PEG includes PEG 1450, PEG 3350, PEG 4500, PEG 8000, PEG 20,000, and the like. Suitable solid polyethylene glycols are commercially available from Union Carbide under the tradename CARBOWAX.

Suitable amide solidification agents include stearic monoethanolamide, lauric diethanolamide, stearic diethanolamide, stearic monoethanol amide, coco diethylene amide, an alkylamide, urea, or a combination thereof.

Suitable inorganic solidification agents include phosphate salt (e.g., alkali metal phosphate), sulfate salt (e.g., magnesium sulfate, sodium sulfate or sodium bisulfate), acetate salt (e.g., anhydrous sodium acetate), Borates (e.g., sodium borate), Silicates (e.g., the precipitated or fumed forms (e.g., Sipernat 50® available from Degussa), carbonate salt (e.g., calcium carbonate or carbonate hydrate), other known hydratable compounds, or a combination thereof. In an embodiment, the inorganic solidification agent can include organic phosphonate compound and carbonate salt, such as an E-Form composition.

When present, the one or more solidification agents may be present in an amount of between about 1 wt.-% to about 99 wt. %, between about 5 wt. % to about 90 wt. %, or between about 15% to about 70 wt. %, inclusive of all integers within these ranges.

Water

The finishing compositions preferably include water. Water can be added to solid cleaning compositions in sufficient amount for the solidification process and potentially for hydration. In a liquid composition, can be added to achieve the desired concentration or viscosity.

Water may be independently added to the finishing composition or may be provided in as a result of its presence in an aqueous material that is added to the finishing composition. For example, materials added to the finishing composition include water or in a solid embodiment, preferably, may be prepared in an aqueous premix available for reaction with the solidification agent component(s). In a solid embodiment, the water can be introduced into the to provide the finishing composition with a desired powder flow characteristic prior to solidification, and to provide a desired rate of solidification.

In general, it is expected that water may be present as a processing aid and may be removed or become water of hydration. It is expected that water may be present in the solid composition. It is expected that the water will be present in a solid finishing composition in the range of between 0 wt. % and 15 wt. %. The amount of water can be influenced by the ingredients in the particular formulation and by the type of solid the finishing composition is formulated into. For example, in pressed solids, the water may be between 2 wt. % and about 10 wt. %, preferably between about 4 wt. % and about 8 wt. %. In embodiments, the water may be provided as deionized water or as softened water.

The components used to form the solid finishing composition can include water as hydrates or hydrated forms of the binding agent, hydrates or hydrated forms of any of the other ingredients, or added aqueous medium as an aid in processing. It is expected that the aqueous medium will help provide the components with a desired viscosity for processing. In addition, it is expected that the aqueous medium may help in the solidification process when is desired to form the concentrate as a solid.

Bleaching Agent

The methods and cleaning compositions can optionally include a whitening or bleaching agent. Such can be included in a cleaning composition or part of a separate whitening/bleaching step. Suitable whitening agents include halogen-based bleaching agents and oxygen-based bleaching agents. The whitening agent can be added to the cleaning compositions; however, in some embodiments of the disclosure, the whitening agent can be used in the pre-soak or pre-treatment step so that the later laundering step may be free of bleaching agents. This can be beneficial in formulating solid cleaning compositions as there can be difficulties in formulating solid compositions with bleaching agents.

If no enzyme material is present in the compositions, a halogen-based bleach may be effectively used as ingredient in a main wash detergent. Other suitable halogen bleaches are alkali metal salts of di- and tri-chloro and di- and tri-bromo cyanuric acids. Preferred halogen-based bleaches comprise chlorine.

Some examples of classes of compounds that can act as sources of chlorine include a hypochlorite, a chlorinated phosphate, a chlorinated isocyanurate, a chlorinated melamine, a chlorinated amide, and the like, or a combination thereof.

Some specific examples of sources of chlorine can include sodium hypochlorite, potassium hypochlorite, calcium hypochlorite, lithium hypochlorite, chlorinated trisodium phosphate, sodium dichloroisocyanurate, potassium dichloroisocyanurate, pentaisocyanurate, trichloromelamine, sulfodichloro-amide, 1,3-dichloro 5,5-dimethyl hydantoin, N-chlorosuccinimide, N,N'-dichloro azodicarbonamide, N,N'-chloroacetyl urea, N,N'-dichloro biuret, trichlorocyanuric acid and hydrates thereof, or a combination thereof.

Suitable oxygen-based bleaches include peroxygen bleaches, such as sodium perborate (tetra- or monohydrate), sodium percarbonate or hydrogen peroxide. These are preferably used in conjunction with a bleach activator which allows the liberation of active oxygen species at a lower temperature. Numerous examples of activators of this type, often also referred to as bleach precursors, are known in the art and amply described in the literature such as U.S. Pat. Nos. 3,332,882 and 4,128,494 herein incorporated by reference. Preferred bleach activators are tetra acetyl ethylene diamine (TAED), sodium nonanoyl oxybenzene sulphonate (SNOBS), glucose pentaacetate (GPA), tetraacetylmethylene diamine (TAMD), triacetyl cyanurate, sodium sulphonyl ethyl carbonic acid ester, sodium acetyloxy benzene and the mono long-chain acyl tetra acetyl glucoses as disclosed in WO-91/10719, but other activators, such as choline sulphophenyl carbonate (CSPC), as disclosed in U.S. Pat. Nos. 4,751,015 and 4,818,426 can also be used.

Peroxybenzoic acid precursors are known in the art as described in GB-A-836,988, herein incorporated by reference. Examples of suitable precursors are phenylbenzoate, phenyl p-nitrobenzoate, o-nitrophenyl benzoate, o-carboxyphenyl benzoate, p-bromophenyl benzoate, sodium or potassium benzoyloxy benzene sulfonate and benzoic anhydride.

Preferred peroxygen bleach precursors are sodium p-benzoyloxy-benzene sulfonate, N,N,N,N-tetraacetyl ethylene diamine (TEAD), sodium nonanoyl oxybenzene sulfonate (SNOBS) and choline sulphophenyl carbonate (CSPC).

Optical Brightener

In some embodiments, an optical brightener component may be utilized in the compositions. The optical brightener can include any brightener that is capable of lessening graying and yellowing of textiles. Typically, these substances attach to the fibers and bring about a brightening action by converting invisible ultraviolet radiation into visible longer-wavelength light, the ultraviolet light absorbed from sunlight being irradiated as a pale bluish fluorescence and, together with the yellow shade of the grayed or yellowed laundry, producing pure white.

Fluorescent compounds belonging to the optical brightener family are typically aromatic or aromatic heterocyclic materials often containing condensed ring systems. An important feature of these compounds is the presence of an uninterrupted chain of conjugated double bonds associated with an aromatic ring. The number of such conjugated double bonds is dependent on substituents as well as the planarity of the fluorescent part of the molecule. Most brightener compounds are derivatives of stilbene or 4,4'-diamino stilbene, biphenyl, five membered heterocycles (triazoles, oxazoles, imidazoles, etc.) or six membered heterocycles (cumarins, naphthalamides, triazines, etc.).

Commercial optical brighteners which may be useful in the present disclosure can be classified into subgroups, which include, but are not necessarily limited to, derivatives of stilbene, pyrazoline, coumarin, carboxylic acid, methinecyanines, dibenzothiophene-5,5-dioxide, azoles, 5- and 6-membered-ring heterocycles and other miscellaneous agents. Examples of these types of brighteners are disclosed in "The Production and Application of Fluorescent Brightening Agents," M. Zahradnik, Published by John Wiley & Sons, New York (1982), the disclosure of which is incorporated herein by reference.

Stilbene derivatives which may be useful in the present disclosure include, but are not necessarily limited to, derivatives of bis(triazinyl)amino stilbene; bisacylamino derivatives of stilbene; triazole derivatives of stilbene; oxadiazole derivatives of stilbene; oxazole derivatives of stilbene; and styryl derivatives of stilbene. In an embodiment, optical brighteners include stilbene derivatives.

In some embodiments, the optical brightener includes Tinopal CBS-X, which is commercially available through BASF Corp.

Additional optical brighteners include, but are not limited to, the classes of substance of 4,4'-diamino-2,2'-stilbenedisulfonic acids (flavonic acids), 4,4'-distyrylbiphenyls, methylumbelliferones, coumarins, dihydroquinolinones, 1,3-diarylpyrazolines, naphthalimides, benzoxazol, benzisoxazol and benzimidazol systems, and pyrene derivatives substituted by heterocycles, and the like. Suitable optical brightener levels include lower levels of from about 0.01, from about 0.05, from about 0.1 or even from about 0.2 wt. % to upper levels of 0.5 or even 0.75 wt. %.

Additional Functional Ingredients

The components of the cleaning composition can further be combined with various functional components suitable for use in laundering applications. In some embodiments, the cleaning composition including the acrylic acid polymers, water, stabilizing agents (chelants) and water conditioning polymers make up a large amount, or even substantially all of the total weight of the cleaning composition. For example, in some embodiments few or no additional functional ingredients are disposed therein.

In other embodiments, additional functional ingredients may be included in the compositions. The functional ingredients provide desired properties and functionalities to the compositions. For the purpose of this application, the term "functional ingredient" includes a material that when dispersed or dissolved in a use or concentrate solution, such as an aqueous solution, provides a beneficial property in a particular use. Some particular examples of functional materials are discussed in more detail below, although the particular materials discussed are given by way of example only, and that a broad variety of other functional ingredients may be used Additional functional ingredients may include further defoaming agents, bleaching agents or optical brighteners, solubility modifiers, buffering agents, dye transfer inhibiting agents, dispersants, stabilizing agents, sequestrants or chelating agents to coordinate metal ions and control water hardness, fragrances or dyes, rheology modifiers or thickeners, hydrotropes or couplers, buffers, solvents and the like.

In an embodiment, the compositions include from about 0 wt. % to about 25 wt. % additional functional ingredients, from about 0 wt. % to about 20 wt. % additional functional ingredients, from about 0 wt. % to about 10 wt. % additional functional ingredients, or from about 0 wt. % to about 5 wt. % additional functional ingredients, inclusive of all integers within these ranges.

Methods of Preparing the Compositions

The compositions disclosed herein, including the finishing compositions as well as cleaning compositions used in other stages of the methods can be in the form of solids or liquids as described above. Accordingly, the finishing compositions and other compositions can be prepared as described below.

In a pressed solid process, a flowable solid, such as granular solids or other particle solids are combined under pressure. In a pressed solid process, flowable solids of the compositions are placed into a form (e.g., a mold or container). The method can include gently pressing the flowable solid in the form to produce the solid composition. Pressure may be applied by a block machine or a turntable press, or the like. Pressure may be applied at about 1 to about 2000 psi, about 1 to about 300 psi, about 5 psi to about 200 psi, or about 10 psi to about 100 psi. In certain embodiments, the methods can employ pressures as low as greater than or equal to about 1 psi, greater than or equal to about 2, greater than or equal to about 5 psi, or greater than or equal to about 10 psi. As used herein, the term "psi" or "pounds per square inch" refers to the actual pressure applied to the flowable solid being pressed and does not refer to the gauge or hydraulic pressure measured at a point in the apparatus doing the pressing. The method can include a curing step to produce the solid composition. As referred to herein, an uncured composition including the flowable solid is compressed to provide sufficient surface contact between particles making up the flowable solid that the uncured composition will solidify into a stable solid composition. A sufficient quantity of particles (e.g., granules) in contact with one another provides binding of particles to one another effective for making a stable solid composition. Inclusion of a curing step may include allowing the pressed solid to solidify for a period of time, such as a few hours, or about 1 day (or longer). In additional aspects, the methods could include vibrating the flowable solid in the form or mold, such as the methods disclosed in U.S. Pat. No. 8,889,048, which is herein incorporated by reference in its entirety.

The use of pressed solids provide numerous benefits over conventional solid block or tablet compositions requiring high pressure in a tablet press, or casting requiring the melting of a composition consuming significant amounts of energy, or by extrusion requiring expensive equipment and advanced technical know-how. Pressed solids overcome such various limitations of other solid formulations for which there is a need for making solid compositions. Moreover, pressed solid compositions retain its shape under conditions in which the composition may be stored or handled.

The degree of hardness of the solid cast composition or a pressed solid composition may range from that of a fused solid product which is relatively dense and hard, for example, like concrete, to a consistency characterized as being a hardened paste. In addition, the term "solid" refers to the state of the cleaning composition under the expected conditions of storage and use of the solid cleaning composition. In general, it is expected that the cleaning composition will remain in solid form when exposed to temperatures of up to approximately 100° F. and particularly up to approximately 120° F.

The solid compositions can be used as concentrated solid compositions or may be diluted to form use compositions. In general, a concentrate refers to a composition that is intended to be diluted with water to provide a use solution that contacts an object to provide the desired cleaning, rinsing, or the like. The cleaning composition that contacts the articles to be washed can be referred to as a concentrate or a use composition (or use solution) dependent upon the formulation employed in methods according to the disclosure. It should be understood that the concentration of the ingredients in the cleaning composition will vary depending on whether the cleaning composition is provided as a concentrate or as a use solution.

A concentrated liquid composition can be prepared by combining and mixing the ingredients of the composition. If incompatible ingredients are to be formulated, the liquid compositions can be prepared as a multi-part system.

A use solution may be prepared from the concentrate by diluting the concentrate with water at a dilution ratio that provides a use solution having desired detersive properties. The water that is used to dilute the concentrate to form the use composition can be referred to as water of dilution or a diluent and can vary from one location to another. The typical dilution factor is between approximately 1 and approximately 10,000 but will depend on factors including water hardness, the amount of soil to be removed and the like. In an embodiment, the concentrate is diluted at a ratio of between about 1:10 and about 1:10,000 concentrate to water. Particularly, the concentrate is diluted at a ratio of between about 1:100 and about 1:5,000 concentrate to water. More particularly, the concentrate is diluted at a ratio of between about 1:250 and about 1:2,000 concentrate to water.

In an embodiment of the disclosure, the cleaning composition preferably provides efficacious cleaning at low use dilutions, i.e., require less volume to clean effectively. In an embodiment, a concentrated liquid cleaning composition may be diluted in water prior to use at dilutions ranging from about 1/16 oz./gal. to about 2 oz./gal. or more. A detergent concentrate that requires less volume to achieve the same or better cleaning efficacy and provides hardness scale control or other benefits at low use dilutions is desirable.

Methods of Cleaning Textiles

The methods of cleaning are particularly well suited for removing a variety of soils including, but not limited to, cosmetic soils, oily food soils, and industrial oily soils. While not wanting to be held to a scientific theory, it is believed that the hydrophobic portion of the cosmetic soils, oily food soils, and oily industrial soils make the soil particularly difficult to remove from textiles. The hydrophobic portion of the cosmetic may be an oil, a viscous solid, or a wax, depending on the desired consistency of the final product. For example, a lip gloss that is rolled onto the lips will tend to be more liquid in consistency than a lip gloss that is applied using a fingertip. Naturally, one would expect the roll-on lip gloss to have a higher oil content than a fingertip lip gloss, which would have more solids or waxes. The hydrophobic component of cosmetics may be natural or synthetic. The following is a list of non-limiting examples of hydrophobic materials that are found in cosmetics: apple (*Pyrus malus*) peel wax, avocado (*Persea Gratissima*) wax, bayberry (*Myrica cerifera*) wax, beeswax, candelilla (*Euphorbia cerifera*) wax, canola oil, carnauba (*Copernicia cerifera*) wax, castor oil, ceresin, cetyl alcohol, cetyl esters, cocoa (*Theobroma cacao*) butter, coconut (*Cocos nucifera*) oil, hydrogenated jojoba oil, hydrogenated jojoba wax, hydrogenated microcrystalline wax, hydrogenated rice bran wax, hydrolyzed beeswax, isosteric acid, jojoba butter, jojoba esters, jojoba wax, lanolin oil, lanolin wax, microcrystalline wax, mineral oil, mink wax, montan acid wax, montan wax, olive (*Olea europaea*) oil, orange (Citrus aurantium *dulcis*) peel wax, ouricury wax, oxidized beeswax, oxidized microcrystalline wax, ozokerite, palm kernel wax, paraffin, PEG-6 beeswax, PEG-8 beeswax, PEG-12 beeswax, PEG-20 beeswax, PEG-12 carnauba, petrolatum, petroleum jelly, potassium oxidized microcrystalline wax, rice (*Oryza sativa*) wax, sesame (*Sesamum indicum*) oil, shea butter (*Butyrospermum parkii*), shellac wax, spent grain wax, stearic acid, sulfurized jojoba oil, synthetic beeswax, synthetic candelilla wax, synthetic carnauba, synthetic japan wax, synthetic jojoba oil, synthetic wax, and vegetable oil. Additional materials found in cosmetics include, for example, silicones, such as dimethicone, along with other pigments, dyes, colorants and fragrances.

It is understood that the compositions disclosed herein are capable of removing cosmetic soils, oily food soils, and oily industrial soils having the hydrophobic and other materials described above as well as those not included in the list above.

The methods are particularly well suited for removing cosmetic soils, oily food soils, and oily industrial soils that accumulate on any type of textiles, namely any item or article made from or including natural fabrics, synthetic fabrics, woven fabrics, non-woven fabrics, and knitted fabrics. The textile materials can include natural or synthetic fibers such as silk fibers, linen fibers, cotton fibers, hemp fibers, angora fibers, bamboo fibers, polyester fibers, polyamide fibers such as nylon, acrylic fibers, acetate fibers, wool, rayon, cashmere, satin, spandex, and blends thereof, including cotton and polyester blends. The fibers can be treated or untreated. Example treated fibers include those treated for flame retardancy. It should be understood that the term "linen" describes a type of material derived from flax plants which is often used in certain types of laundry items including bed sheets, pillowcases, towels, table linen, tablecloth, bar mops and uniforms. The linens which may be treated include those in the restaurant industry such as tablecloths, napkins, uniforms, aprons, washcloths, dishcloths, mops, and the like, and those in the hospitality industry such as bedsheets, pillowcases, bedspreads, towels, robes, and the like.

The methods of cleaning include contacting a textile in need of removing cosmetic soils, oily food soils, and oily industrial soils, including for example lipstick, lip stain, lip gloss, lip balm, or chap stick. In an embodiment, the textile surface is soiled with a waxy, oily or greasy soil. Any means of contacting can be used to place the textile surface in contact with the cleaning compositions, including for example, soaking, spraying, dripping, wiping, or the like. Included within the scope of contacting described herein, the textile can also be soaked, including a pretreatment, with the non-quaternary cationic amine composition or the full cleaning composition. As a result of the contacting step the textile is washed, and the soils removed.

In certain embodiments a concentrate can be sprayed onto a textile surface or provided in water as part of a pre-treatment. The contacting time may vary about 10 seconds to six hours, for example 1 minute to four hours, 10 minutes to two hours, 15 minutes to an hour, inclusive of all integers within this range. In another aspect the pre-treatment may last as long as several hours (e.g., overnight soak).

In textile cleaning applications, the non-quaternary cationic amine can be added to the cleaning composition in a use solution. Alternatively, a fully formulated cleaning composition can be provided. A first step of diluting or creating an aqueous use solution (such as from a solid) can also be included in the methods. An example dilution step includes contacting the liquid or solid composition with water.

Beneficially, the methods of cleaning textiles involves the deposition of a surfactant package, namely a non-quaternary cationic surfactant, a nonionic surfactant, or a semi-polar nonionic surfactant onto the surface of textiles during the finishing step of the wash process, wherein the surfactant package remains on the textile. During later use and soiling, the surfactant package remains on the textile. Then, during subsequent wash cycles, particularly during the wash step, soil removal efficacy is substantially enhanced due to the presence and deposition of the surfactant package.

More particularly, in a typical cleaning method, the washing process comprises a pre-wash or pre-soak where the textiles are wetted, and a pre-soak composition is added. The wash phase follows the pre-soak phase; a detergent is added to the wash tank to facilitate soil removal. In some cases, a bleach phase follows the wash phase in order to remove oxidizable stains and whiten the textiles. Next, the rinsing phase removes all suspended soils. In some cases, a laundry sour is added in a souring or finishing phase to neutralize any residual alkalinity from the detergent composition or complete and post-treatment of the textiles needed. In many cases a fabric softener or other finishing chemical like a starch is also added in the finishing step. Finally, the extraction phase removes as much water from the wash tank and textiles as possible. In some cases, a wash cycle may have two rinse and extraction phases, i.e., a rinse cycle, an intermediate-extract cycle, a final rinse cycle, and a final extraction cycle. After the wash cycle is complete, the resulting wastewater is typically removed and discarded. As described herein, the cationic amine compound by itself or as part of a surfactant package (comprising, for example, a non-quaternary cationic surfactant, a nonionic surfactant, or a semi-polar nonionic surfactant) as described in Table 1 and Table 2 may be applied to a textile as part of a pre-wash or pre-soak phase or as a finishing phase. Additionally, or in the alternative, the cationic amine or surfactant package may be combined with a detergent (for example a detergent as in Table 3) to form a cleaning composition and may be applied to the textile as part of the wash phase.

The cleaning compositions can be provided at an actives level in a ready to use or concentrate composition providing a desired quantity of actives of the components of the compositions. In an embodiment, cationic amine is provided at a concentration from about 10 ppm to about 200 ppm in a use solution, or from about 100 ppm to about 200 ppm in a use solution.

In an embodiment, the compositions will contact the textile to be cleaned for a sufficient amount of time to remove the soils, including from a few seconds to a few hours, including all ranges therebetween. In an embodiment, the composition contacts the textiles for at least about 15 seconds, at least about 30 seconds, at least about 45 seconds, or at least about 60 seconds. In an embodiment, the composition contacts the textiles for at least about 1 minute, at least about 2 minutes, at least about 3 minutes, at least about 4 minutes, or at least about 5 minutes.

EXAMPLES

Embodiments of the finishing compositions and methods disclosed herein are further defined in the following non-limiting Examples. It should be understood that these Examples, while indicating certain embodiments of the disclosure, are given by way of illustration only. From the above discussion and these Examples, one skilled in the art can ascertain the essential characteristics of this disclosure, and without departing from the spirit and scope thereof, can make various changes and modifications of the embodiments of the disclosure to adapt it to various usages and conditions. Thus, various modifications of the embodiments of the disclosure, in addition to those shown and described herein, will be apparent to those skilled in the art from the foregoing description. Such modifications are also intended to fall within the scope of the appended claims.

Materials used in these examples include:

PDMS: polydimethylsiloxane

DHTDMAMS: di(hydrogenated) tallow dimethyl ammonium methyl sulfate esterquat

Clearly Soft: a commercially available composition comprising a quaternary ammonium softening agent and an aminofunctional silicone Lonzabac 12: A triamine, specifically N, N-Bis (3-aminopropyl) dodecylamine Cotilps 739: a diamine, specifically N1,N1,N3-tris(3-aminopropyl)-N3-dodecylpropane-1,3-diamine (60-100%)

N1,N1-bis(3-aminopropyl)-N3-dodecylpropane-1,3-diamine (10-30%)

N1-(3-aminopropyl)-N3-dodecylpropane-1,3-diamine (10-30%)

N-dodecylpropane-1,3-diamine (5-10%)

Tomamine DA-17: an ether diamine, specifically N1-(3-(tridecyl-(branched)-alkyloxy)propyl)propane-1,3-diamine (90-95%)

Rewoquat CQ 100 G: a blend of nonionic and cationic surfactants, specifically

Potassium hydroxide (<0.01%)

Methyl chloride (<0.05%)

1,2,3-Propanetriol (<2%)

1,2-Propanediol (15%-25%)

(Coconut oil alkyl)bis(2-hydroxyethyl, ethoxylated)methylammonium chloride (>20%)

Fatty alcohol polyglycol ether (40%-60%)

LPS-816: An amine blend, specifically

N1,N1,N3-tris(3-aminopropyl)-N3-octadecyl-1,3-propanediamine

N1,N1,-Bis(3-aminopropyl)-N3-octadecyl-1,3-propanediamine 1,3-Propanediamine, N-(3-aminopropyl)-N-octadecyl-N-octadecyl propane-1,3-diamine Quat 7: a quaternary ammonium compound blend, specifically C12-C16 alkyl dimethyl benzyl ammonium chloride Decyl dimethyl octyl ammonium chloride Didecyl dimethyl ammonium chloride Dimethyl dioctyl ammonium chloride Quat 4: a quaternary ammonium compound blend, specifically C12-C16 alkyl dimethyl benzyl ammonium chloride Decyl dimethyl octyl ammonium chloride Didecyl dimethyl ammonium chloride Dimethyl dioctyl ammonium chloride Quat S HF: an ester quaternary ammonium salt Barlox 12: lauryl dimethyl amine oxide, specifically lauramine oxide and dimethyl tetradecyl amine oxide Surfonic L24-7: C12-C14 alcohol ethoxylate (7E0)

Wacker HC 303: a water-based silicone emulsion

Rewoquat WE 45: a triethanolamine (TEA) ester quaternary ammonium compound, specifically N,N'-di(alkylcarboxyethyl)-N-hydroxyethyl-N-methylammonium methyl sulfate

Example 1—Performance Assessment of Non-Quaternary Amine Compositions

A performance assessment of the compositions was conducted to determine the effects of different presoaking surfactant packages' ability to help remove soil from a variety of textiles. Textiles evaluated included percale, weave, and terry cotton.

Use solutions were prepared with 500 ppm of example cationic amine compounds using at least one amine and at least one surfactant disclosed accordingly:

| | Component | Type |
|---|---|---|
| Amine(s) | Triamine | N,N-Bis (3-aminopropyl) dodecylamine |
| | Diamine | N1,N1,N3-tris(3-aminopropyl)-N3-dodecylpropane-1,3-diamine; N1,N1-bis(3-aminopropyl)-N3-dodecylpropane-1,3-diamine; N1-(3-aminopropyl)-N3-dodecylpropane-1,3-diamine; N-dodecylpropane-1,3-diamine |
| | Ether Diamine | N'[3-(11-methyldodecoxy)propyl]propane-1,3-diamine |
| Surfactant(s) | Nonionic Surfactant | Fatty alcohol polyglycol ether |
| | Cationic Quaternary Ammonium Compound | (Coconut oil alkyl)bis(2-hydroxyethyl, ethoxylated)methylammonium Chloride |
| | Semi-Polar Nonionic Surfactant | Dimethyl tetradecyl Amine oxide |

The solutions were stirred and heated to about 38° C. Once adequately stirred, cotton terry cloth swatches were soaked in the use solutions for 30 minutes. The swatches were removed from the use solutions and dried. After drying the swatches were soiled with example cosmetic soils, including, two types of foundation (L'Oreal and Neutrogena), an example lipstick and an example waterproof mascara.

Figure 1B:
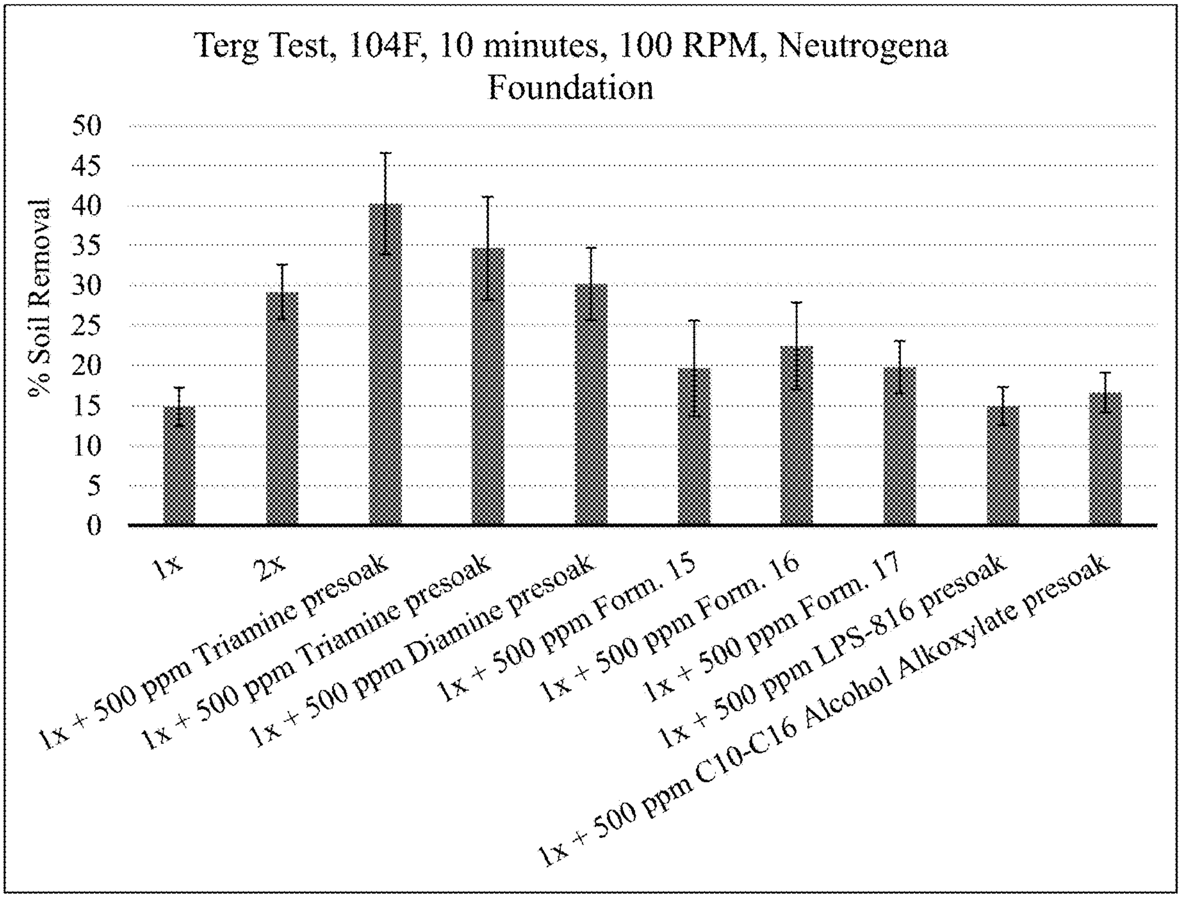
Figure 1C:
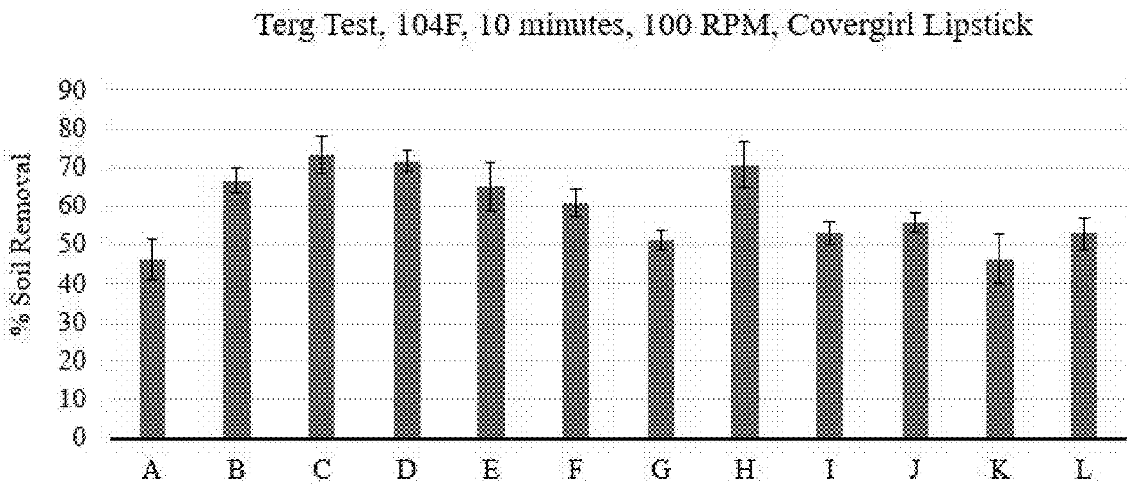
Figure 1D:
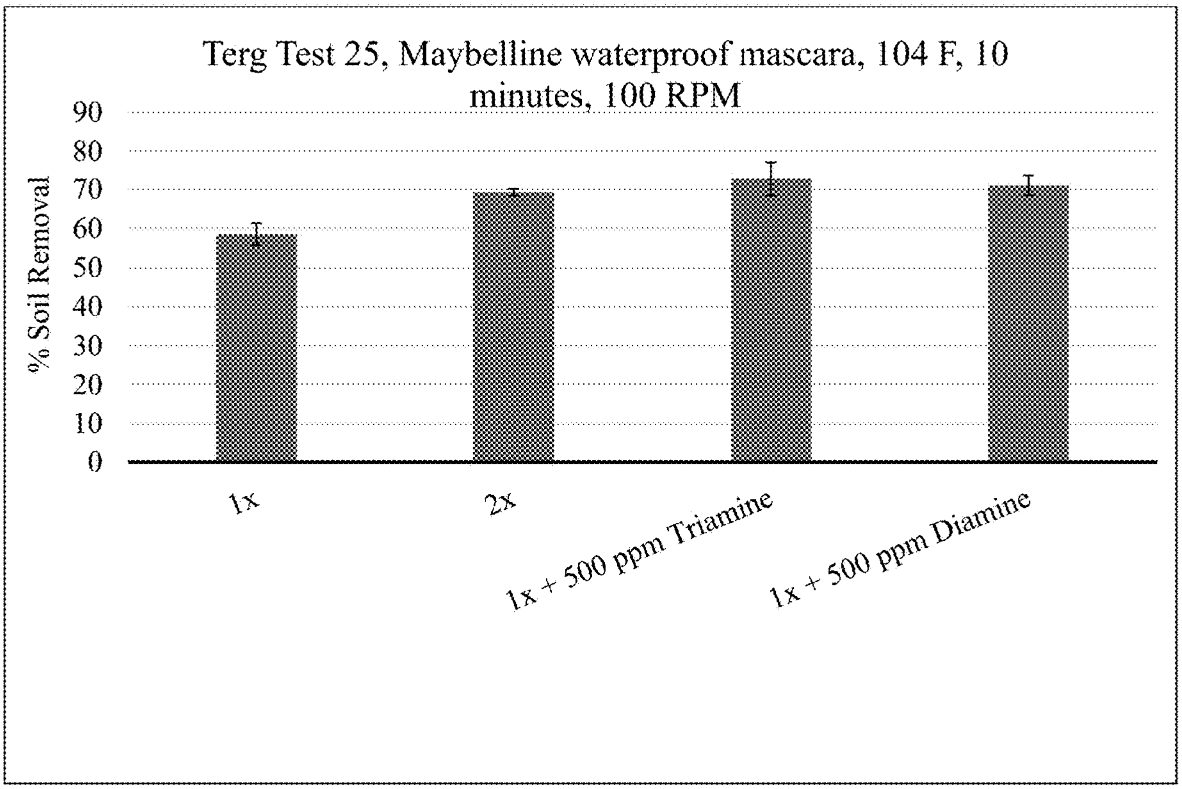

After soiling the swatches, they were read on the camera-based multispectral color measurement instrument for an initial reflectance value. Then the swatches were washed in traditional wash cycles. Control swatches were also tested. Stain removal was evaluated according to detergency testing methods using a tergotometer. The tergotometer contains six pots filled with 0.5 L of water sitting in a temperature-controlled water bath. A Mach5 color instrument was used to determine the lightness or darkness of each swatch, as measured by the L* value, prior to washing. After completion of the wash cycles, the swatches were removed, rinsed with cold water, and squeezed to remove the excess water. After drying, the swatches were again read on the color instrument to determine the post-wash L* value. The % stain removal is calculated from the difference between the initial (before washing) L* value and the final L* value (after washing). The results of the tergotometer testing are shown in FIGS. 1A-1D. FIG. 1A provides the results for swatches soiled with L'Oreal foundation. FIG. 1B provides the results for swatches soiled with Neutrogena foundation. FIG. 1C provides the results for swatches soiled with Covergirl lipstick. FIG. 1D provides the results for swatches soiled with Maybelline waterproof mascara.

As can be seen in FIGS. 1A-1D, the swatches first treated with the example cationic amine compounds provided improved soil removal after subsequent soiling and washing.

Figure 2A:
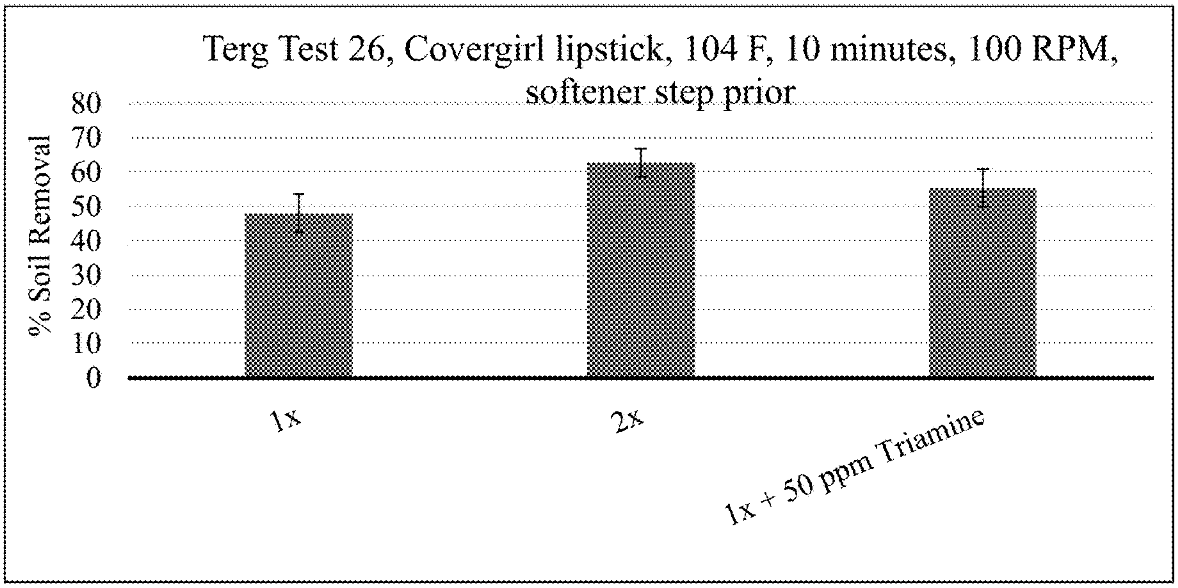
FIGS. 2A-2C show the results of tergotometer tests evaluating the compatibility of the compositions with traditional softeners and quaternary ammonium compounds.
Figure 2B:
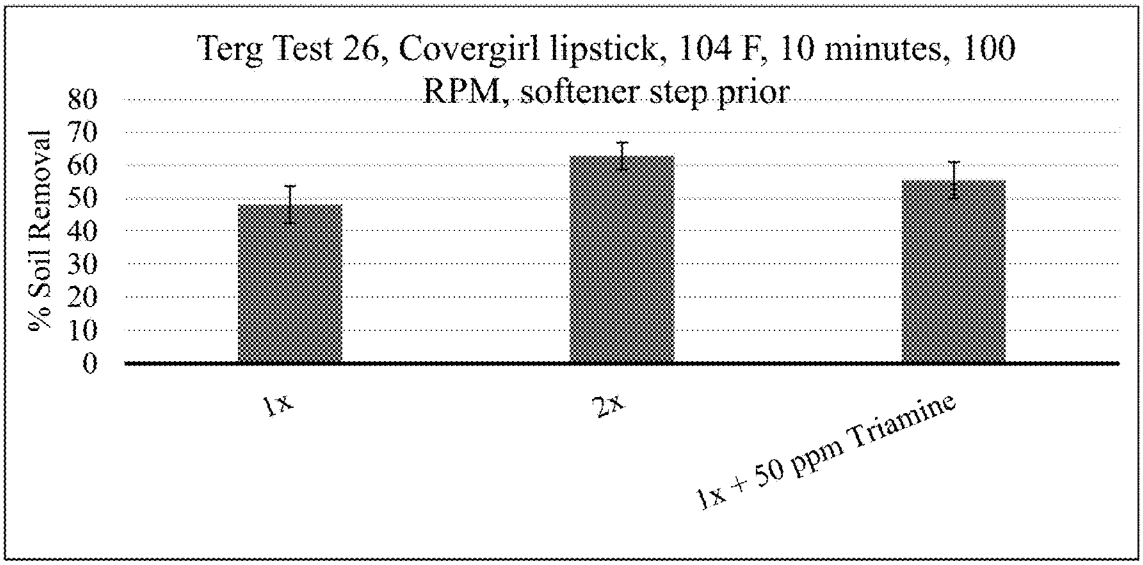
Figure 2C:
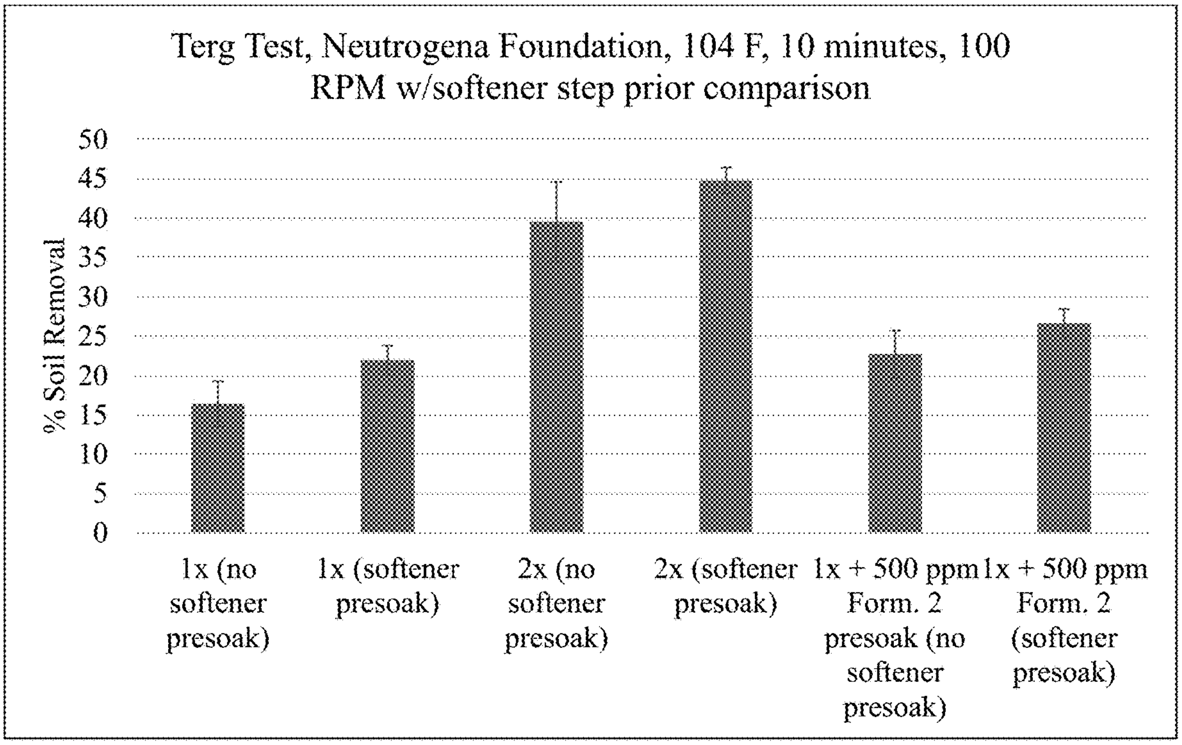

Example 2—Compatibility Assessment of Non-Quaternary Amine Compositions and Traditional Softeners The example finishing compositions were also tested for compatibility with traditional softeners to evaluate the potential use of co-softeners in the formulation. For this, swatches were again treated with a 500-ppm use solution of an example finishing compound including both a cationic amine compound and a traditional softener compound as a co-softener. The procedures from Example 1 were followed with treating, drying, soiling, washing, and the tergotometer test. For this test, the swatches were soiled with an example lipstick, waterproof mascara, or foundation. The results are provided in FIGS. 2A-2C. FIG. 2A provides the results for swatches soiled with Maybelline waterproof mascara. FIG. 2B provides the results for swatches soiled with Covergirl lipstick. FIG. 2C provides the results for swatches soiled with Neutrogena foundation.

As can be seen in FIGS. 2A-2C, the example cationic amine compounds provided improved soil removal after subsequent soiling and washing when formulated with co-softeners.

Example 3—Performance Assessment of Silicone Soil Release Agent and Surfactant Package Example compositions were prepared according to Table 4 below. Clean cotton terry swatches were soaked in use solutions of these compositions at varying concentrations of between 50 ppm to 100 ppm of each of the silicone or surfactant to emulate the finishing step of a wash cycle. The swatches were then soiled with Covergirl lipstick. The soiled swatches were left to set overnight under ambient conditions. The swatches were then washed with 500 ppm of the liquid detergent according to Table 3 along with 600 ppm builder. These swatches were compared to soiled swatches washed with 1× (500 ppm detergent and 600 ppm builder) and 2× (1000 ppm detergent and 1200 ppm builder) according to Table 3. Tergotometer testing was performed on the swatches according to the procedure outlined in Example 1.

TABLE 4

| Material | Exp. F. 1 (wt. %) | Exp. F. 2 (wt. %) | Exp. F. 3 (wt. %) | Exp. F. 4 (wt. %) |
|---|---|---|---|---|
| Silicone | 16 | 15 | 20 | 19 |
| Dodecyl dimethyl amine oxide | | 8 | | 5 |
| Methyl diethanolamine esterquat | 84 | 77 | | |
| Dihydrogenated tallow dimethyl ammonium methyl sulfate | | | | |
| Triethanolamine esterquat | | | 80 | 76 |

Figure 3:
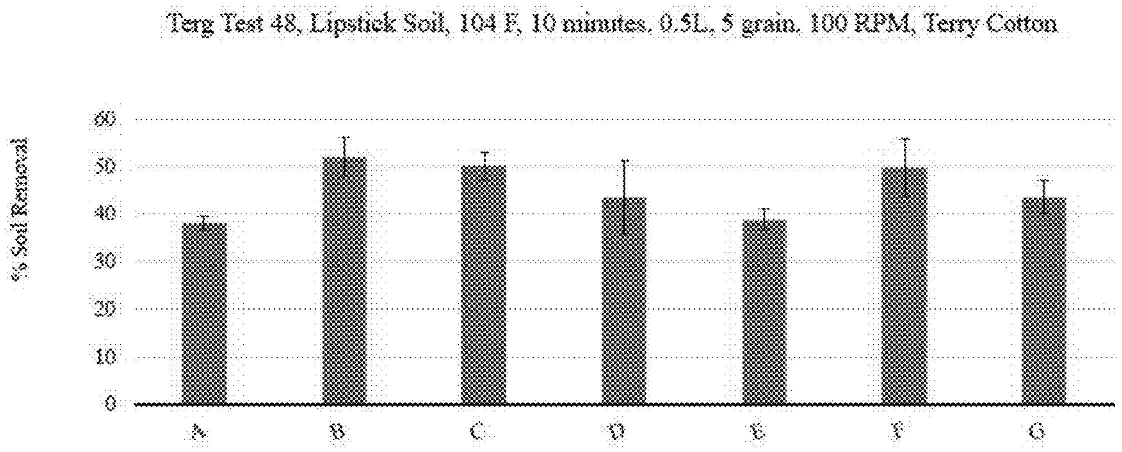
FIG. 3 shows the results of tergotometer tests assessing the extent to which compositions comprising a silicone and semi-polar nonionic surfactant remove cosmetic soils.

The results of this analysis are shown in FIG. 3. As illustrated in FIG. 3, combining the detergent composition with between a 1:1 to 1:4 ratio of silicone to semi-polar nonionic surfactant beneficially provided improved soil removal compared to the same concentration of the detergent alone. Beneficially, a 1:2 to 1:4 ratio of silicone to semi-polar nonionic surfactant combined with 500 ppm detergent provide substantially similar cleaning/soil removal performance as double the concentration of detergent alone (i.e. 1000 ppm detergent alone). These data show that the use of a silicone and semi-polar nonionic surfactant package beneficially reduces to amount of detergent needed to provide effective soil removal. Thus, where the soil load is light, the concentration of the silicone-surfactant packages may be reduced, thereby reducing cleaning costs. Alternatively, where the soil load is heavy, increasing the concentration of the silicone-surfactant packages to traditional quantities beneficially improves soil removal efficacy beyond that of a detergent alone.

The same tergotometer testing was repeated using the compositions of Table 4 with dirty motor oil soil. Cotton "shop towel" swatches were soaked in use solutions of the compositions of Table 4 at varying concentrations, and then soiled with dirty motor oil. The soiled swatches were left to set overnight under ambient conditions. The swatches were then washed with 2860 ppm Performance Industrial XXL liquid detergent and 2180 ppm Performance Industrial XXL Booster, and results compared to soiled swatches washed with 1× (2860 ppm detergent and 2180 ppm booster) and 2× (5720 ppm detergent and 4360 ppm booster) detergent. The results of this analysis are shown in FIG. 4.

As shown in FIG. 4, the addition of the silicone-surfactant package significantly improves soil release compared to the silicone component alone. In particular, the data illustrate the efficacy of 1:2 ratios silicone to surfactant and below. 2:1 silicone to surfactant ratios and lower also provide excellent soil removal efficacy, both from low (25 ppm silicone: 50 ppm surfactant) to high concentrations (100 ppm silicone: 400 ppm surfactant).

Example 4—Performance Assessment of Silicone/Sem-Polar Nonionic Surfactant Package and Quaternary Ammonium Compounds Many finishing products, including fabric softeners, contain both silicone and quaternary ammonium compounds. Consequently, a formulation containing a quaternary ammonium, silicone, and surfactant was compared to a composition having just a quaternary ammonium and silicone. The results of this analysis are shown in FIG. 5.

Figure 5:
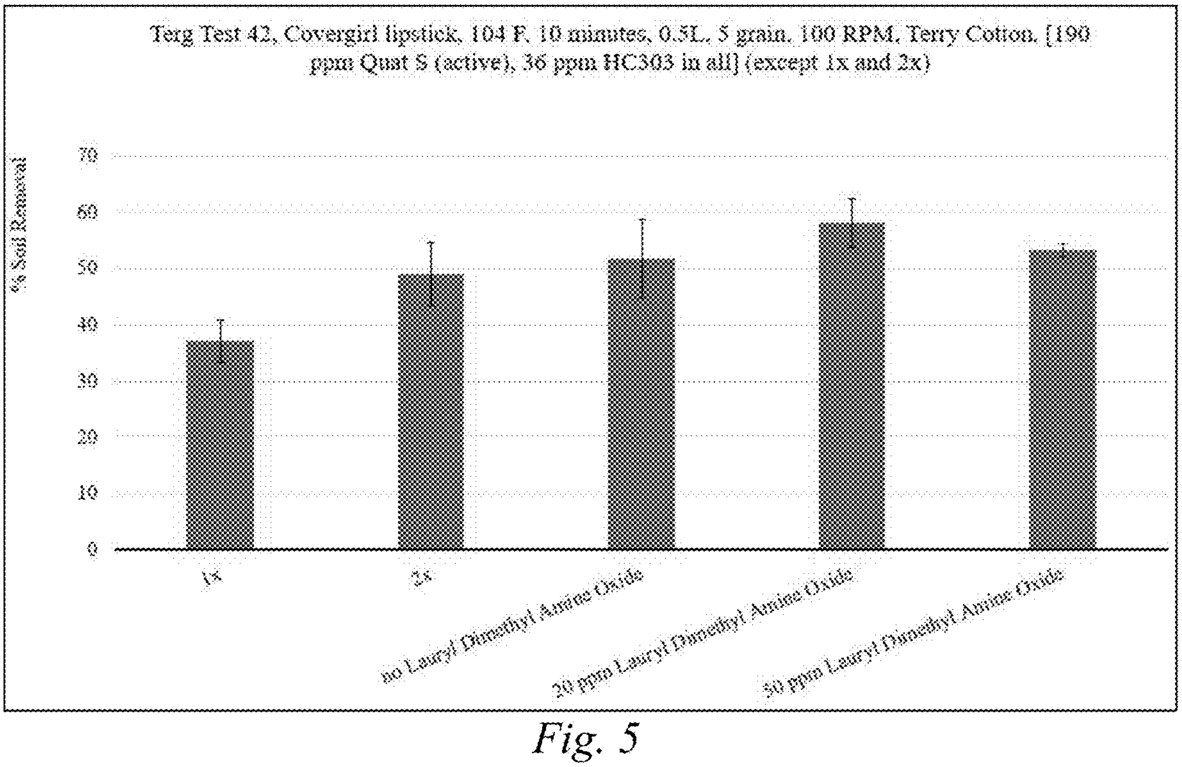
FIG. 5 shows the results of a tergotometer test assessing the impact of adding a semi-polar nonionic surfactant to the textile treatment compositions.

FIG. 5 illustrates that while there is some soil release benefit with the silicone and quaternary ammonium alone, soil release is substantially improved with the addition of even small amounts of semi-polar nonionic surfactant (20 ppm).

Example 5—Wicking and Water Absorption Assessment

Compositions for treating textiles, particularly finishing compositions, should provide softness without causing any significant loss of water absorption or wicking to the treated textile. As one of the primary functions of certain textiles, such as towels, is to absorb water, it is undesirable for fabric softener actives to hydrophobize and decrease the amount of water that can be absorbed. Additionally, excessive hydrophobization of the surface may reduce the ability of water and cleaning agents to penetrate and clean the textile. However, many soil release treatments, including many silicone compounds, are hydrophobic. Alone, they cause a "rain coating" effect on textiles, significantly reducing water absorption and making them unsuitable for general laundry applications, particularly as finishing compositions.

Wicking, or water absorption, was measured by first treating the textile swatches with the compositions of Table 5, then measuring the distance water can wick up a treated linen in a fixed period of time. 20 mm is considered acceptable wicking. More particularly, rectangular swatches are prepared and treated with the compositions of Table 4 and the swatches were marked with a line 10 mm from the bottom of the swatch. The swatches were then suspended over and in a wicking apparatus having a colored dye. The swatch was allowed to rest for six minutes as the colored dye was absorbed by and moved up the swatches. The distance the dye traveled from the 10 mm line was then measured. The process was repeated for three cycles. The representative compositions and test results are shown in Table 5.

TABLE 5

| | Untreated control | 500 ppm PDMS | 500 ppm PDMS & 133 Dodecyl dimethyl amine oxide | 500 ppm DHTDMAMS | 500 ppm DHTDMAMS, 100 ppm Silicone & 133 ppm Dodecyl dimethyl amine oxide |
|---|---|---|---|---|---|
| Avg Height (mm) | >100 | <10 | 32 | 10 (no wicking post dip) | 25 |
| Rain coating | No | Yes - immediate beading | No | Yes | No |

The results of Table 5 demonstrate that adding a semi-polar nonionic surfactant to the silicone compound significantly improves wicking even at relatively high doses (500 ppm).

Example 6—Fabric Softening Assessment

Because an important benefit of textile treatment compositions, particularly finishing compositions, is fabric softening, it is necessary to test these samples for softness performance. Cotton towel samples were treated with softener formulations and softness was evaluated with a phabrometer. In the phabrometer test, the swatches were individually weighed down and forced through an orifice while calculating the attributes of softness and resilience. Softness is an indicator of the "fluffiness" of the fabric while resilience is an indicator of the stiffness of the fabric. The treated fabrics were compared to a untreated but scoured sample. In general, a larger softness value is attributed to a softer fabric. A larger resilience value is attributed to a stiffer fabric (resulting in a less "soft" feel).

More particularly, textile samples were treated with a composition comprising a quaternary ammonium and soil release silicone agent; and another composition comprising a quaternary ammonium, soil release silicone agent, and semi-polar nonionic surfactant. These sample were compared against a scoured control (no finishing treatment). After treatment, the samples were placed in the Phabrometer which measures and records sample weight, thickness, softness, and resilience.

The results of this analysis are shown in the Table below as well as FIGS. 6 and 7.

TABLE 6

| Composition | Resilience Score | Softness Score | Smoothness Score |
|---|---|---|---|
| Silicone emulsion + TEA Ester Quat + Amine Oxide | 49.3279 | 63.9181 | 51.6037 |
| Silicone emulsion + TEA Ester Quat + Amine Oxide | 50.3652 | 63.5343 | 51.4908 |
| Silicone emulsion + TEA Ester Quat | 50.4377 | 63.655 | 51.6673 |
| Silicone emulsion + TEA Ester Quat | 50.5054 | 63.3085 | 51.5987 |
| Silicone emulsion + TEA Ester Quat + Amine Oxide | 50.694 | 63.9252 | 51.8314 |
| Silicone emulsion + WE45 4 | 50.8211 | 63.6022 | 51.4215 |
| Silicone emulsion + TEA Ester Quat + Amine Oxide | 51.1785 | 63.7907 | 51.8121 |
| Silicone emulsion + TEA Ester Quat | 51.1864 | 63.9118 | 51.7615 |
| Scoured Control 4 | 58.9754 | 59.3733 | 50.2347 |
| Scoured Control 1 | 60.1455 | 59.6329 | 50.7838 |
| Scoured Control 2 | 60.592 | 59.4393 | 50.896 |
| Scoured Control 3 | 61.1158 | 59.1764 | 50.5302 |

Figure 6:
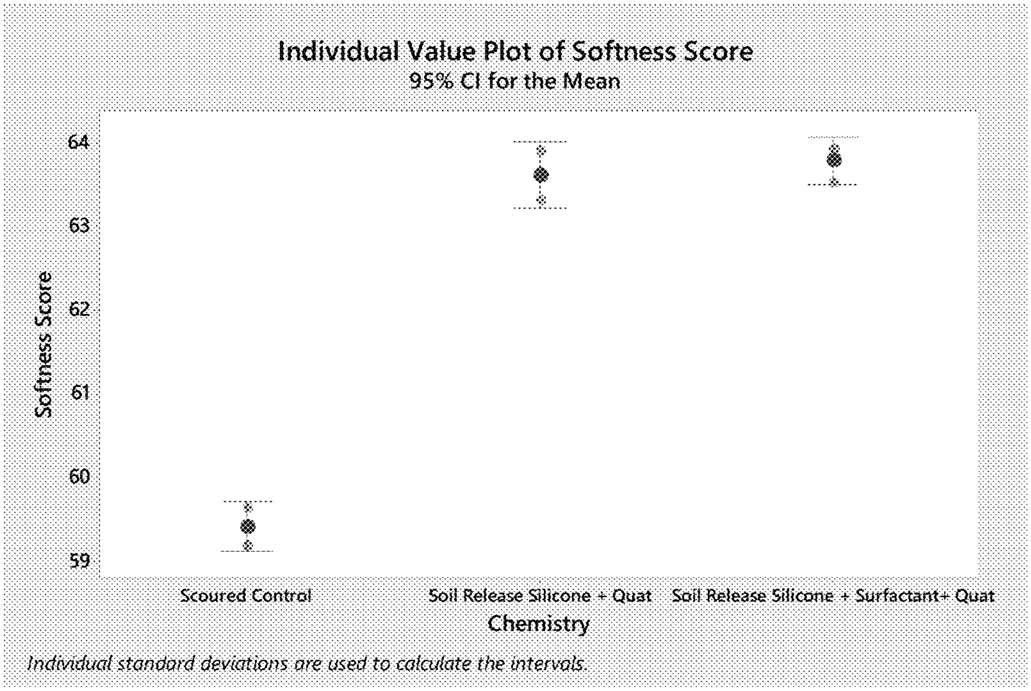
FIG. 6 depicts the results of a Phabrotemer analysis of the softness score for compositions comprising a silicone and quaternary ammonium compound.
Figure 7:
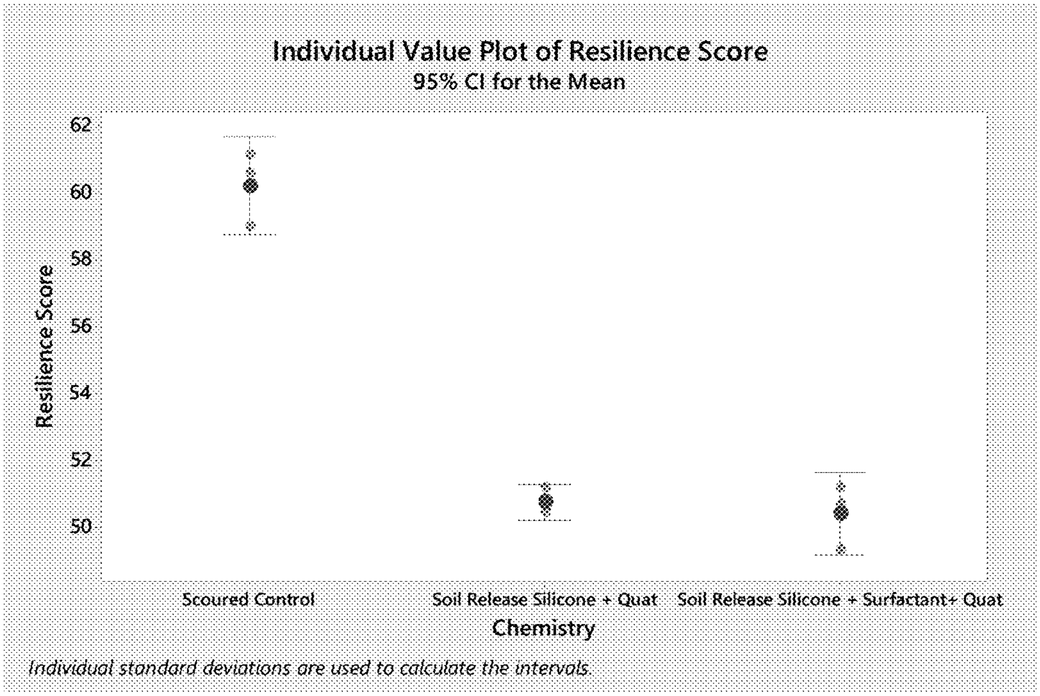
FIG. 7 shows the results of a Phabrotemer analysis of the resilience score for compositions comprising a silicone and quaternary ammonium compound.
Figure 8:
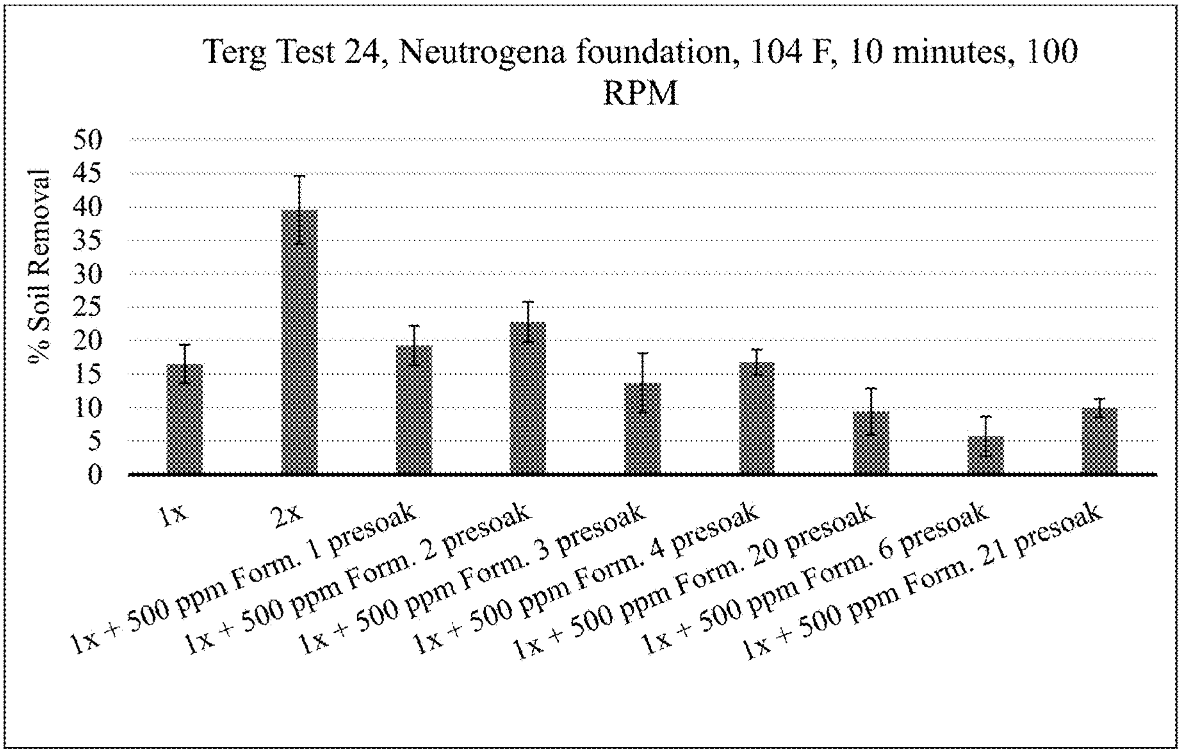
FIG. 8 shows the results of a tergotometer test assessing soil removal of Neutrogena cosmetic soil and using presoak compositions.
Figure 9:
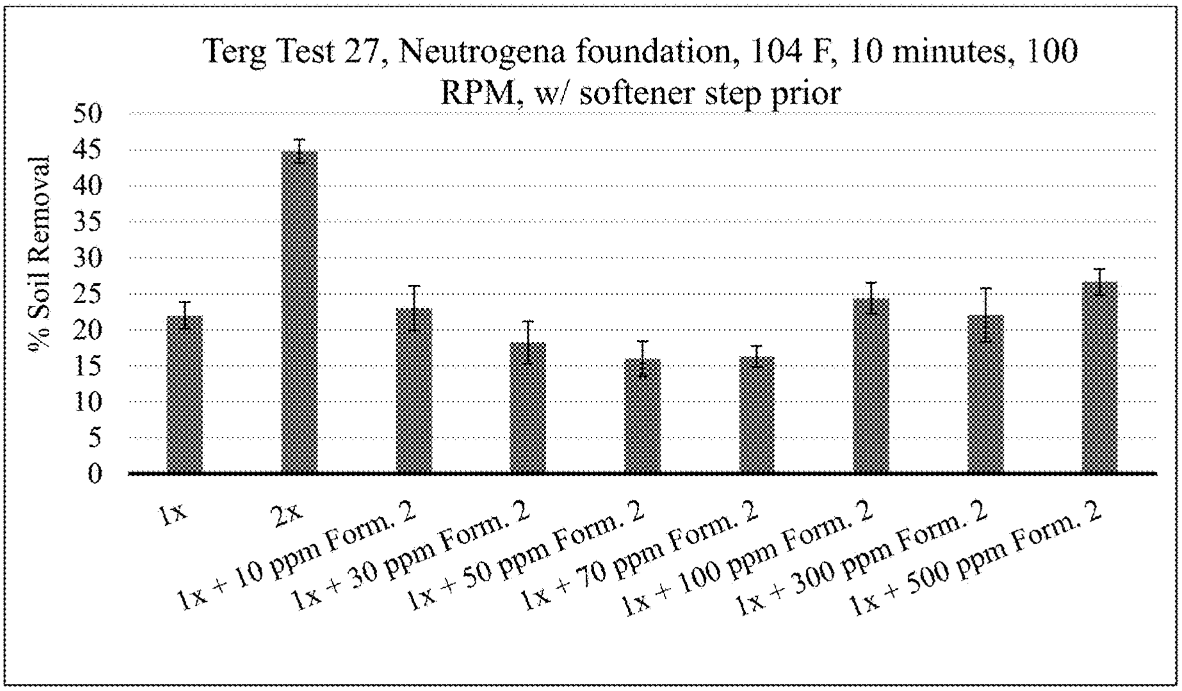
FIG. 9 shows the results of a tergotometer test assessing soil removal of Neutrogena cosmetic soil and using presoak compositions and a softener step.
Figure 10:
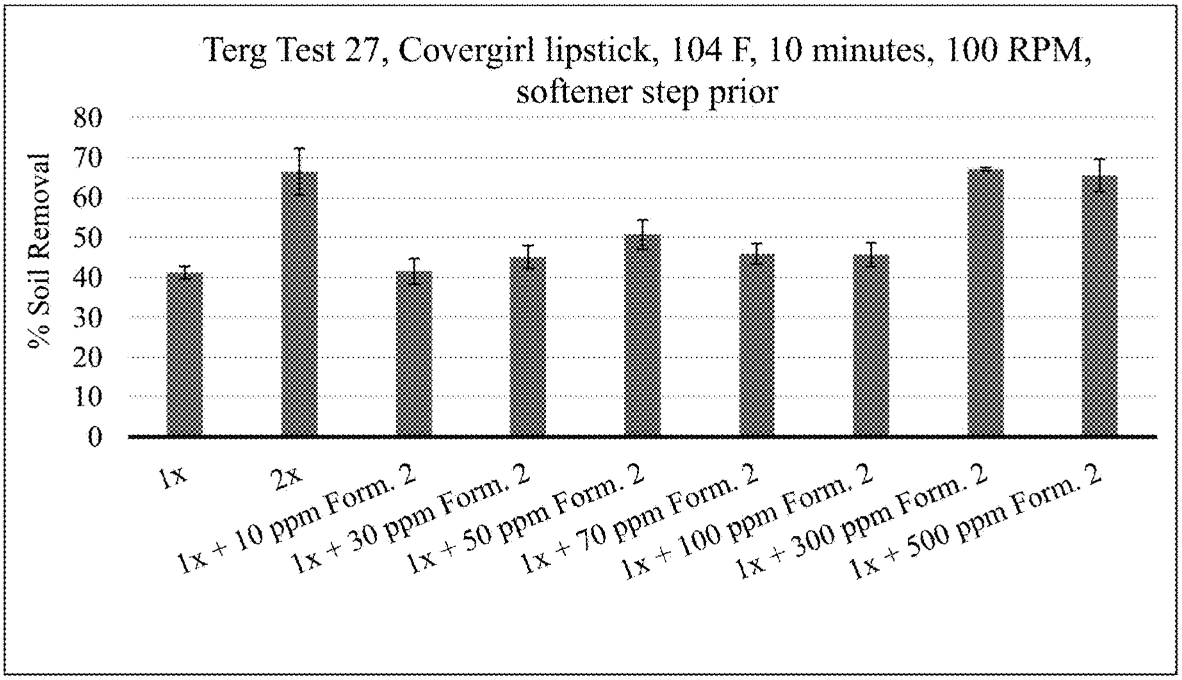
FIG. 10 shows the results of a tergotometer test assessing soil removal of Covergirl lipstick cosmetic soil and using presoak compositions and a softener.
Figure 11:
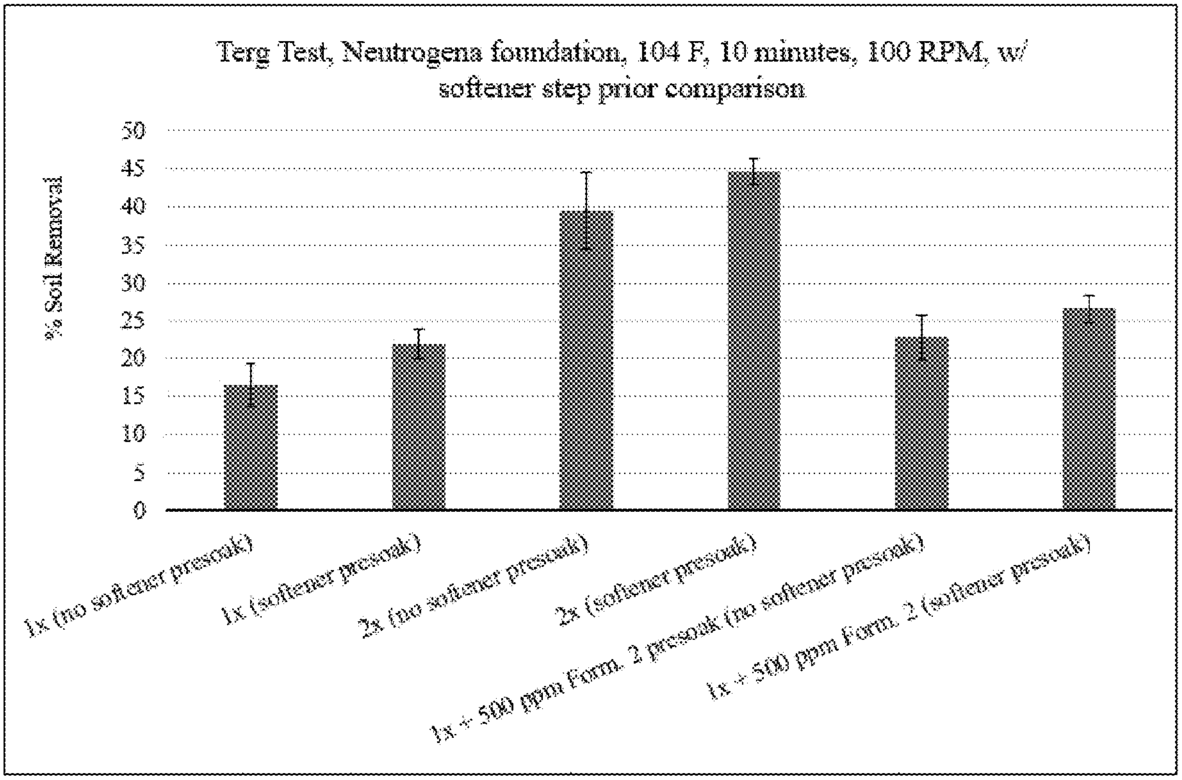
FIG. 11 shows the results of a tergotometer test assessing soil removal of Neutrogena cosmetic soil and using presoak compositions and a softener.
Figure 12:
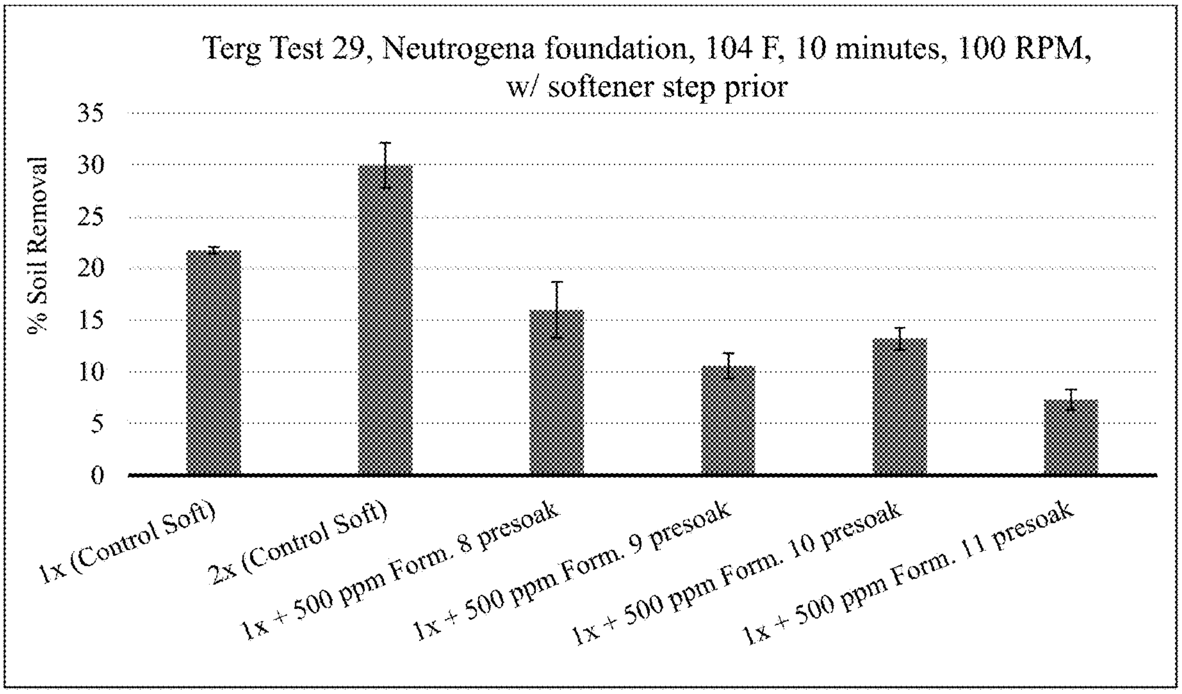
FIG. 12 shows the results of a tergotometer test assessing soil removal of Neutrogena cosmetic soil and using presoak compositions and a softener step.
Figure 13:
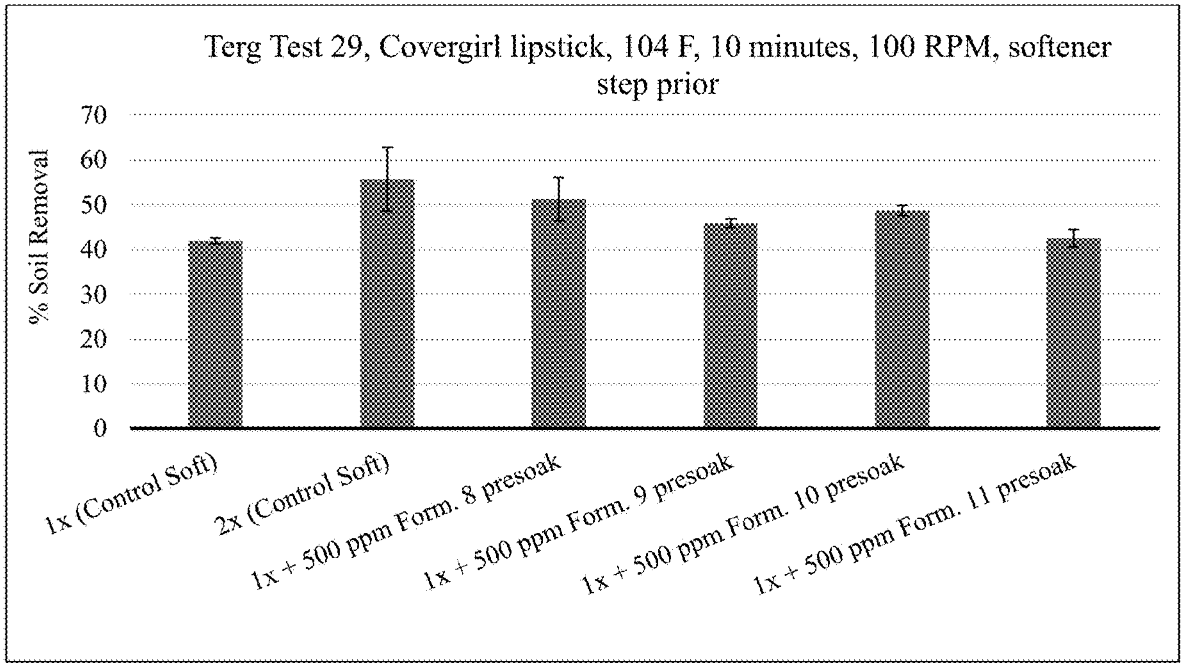
FIG. 13 shows the results of a tergotometer test assessing soil removal of Covergirl lipstick cosmetic soil and using presoak compositions and a softener.
Figure 14:
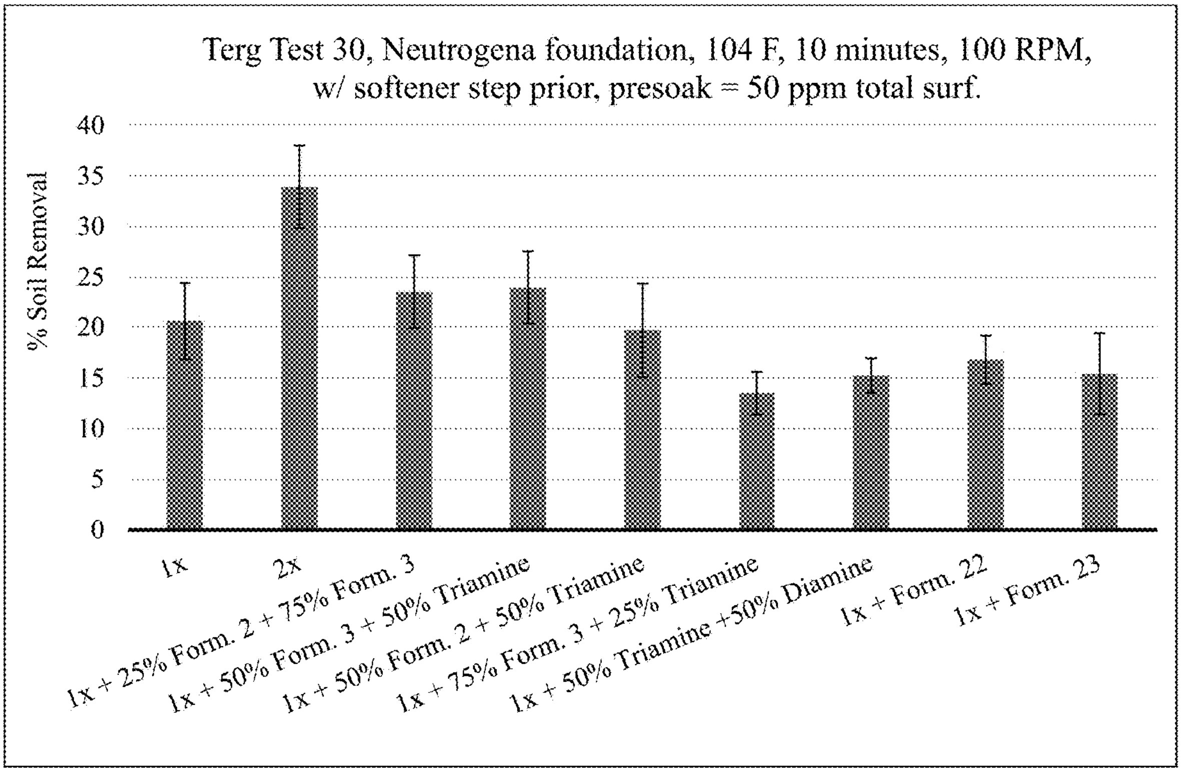
FIG. 14 shows the results of a tergotometer test assessing soil removal of Neutrogena cosmetic soil and using presoak compositions and a softener step.
Figure 15:
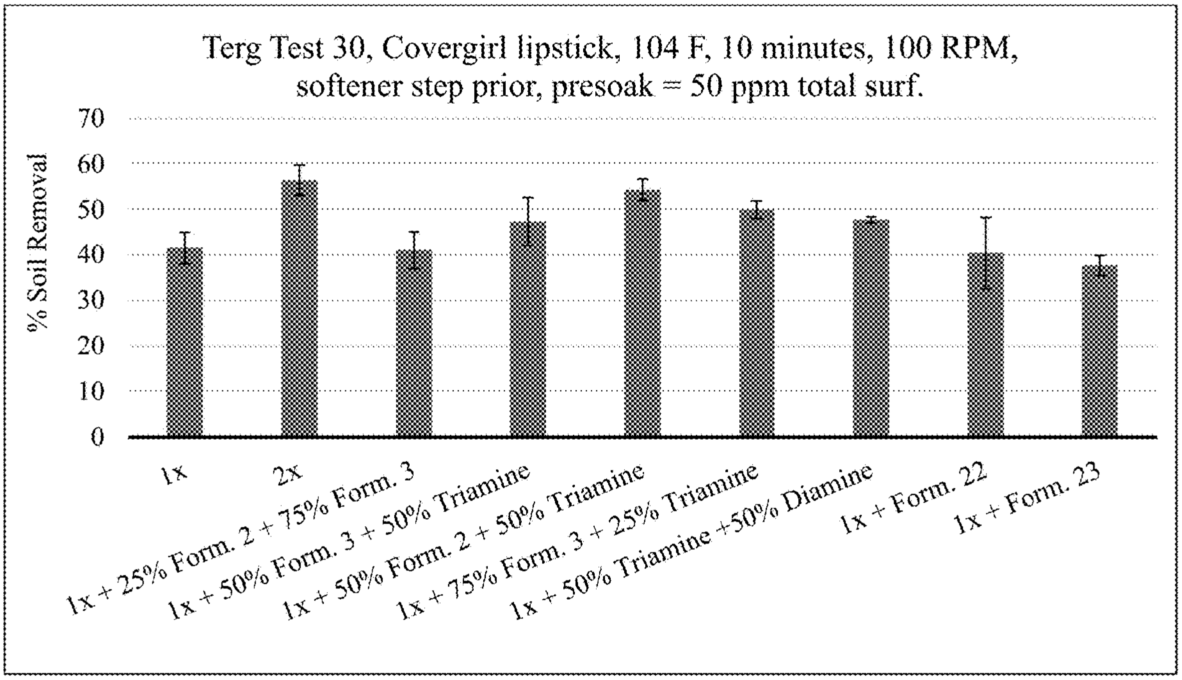
FIG. 15 shows the results of a tergotometer test assessing soil removal of Covergirl lipstick cosmetic soil and using presoak compositions and a softener.
Figure 16:
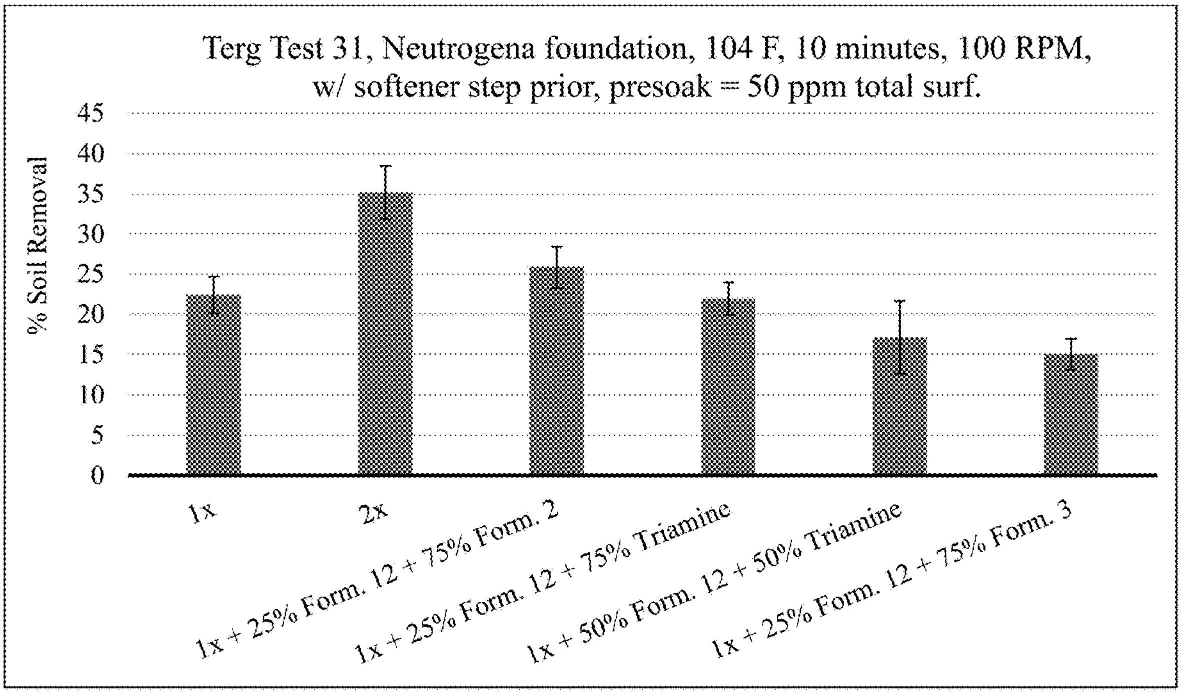
FIG. 16 shows the results of a tergotometer test assessing soil removal of Neutrogena cosmetic soil and using presoak compositions and a softener step.
Figure 17:
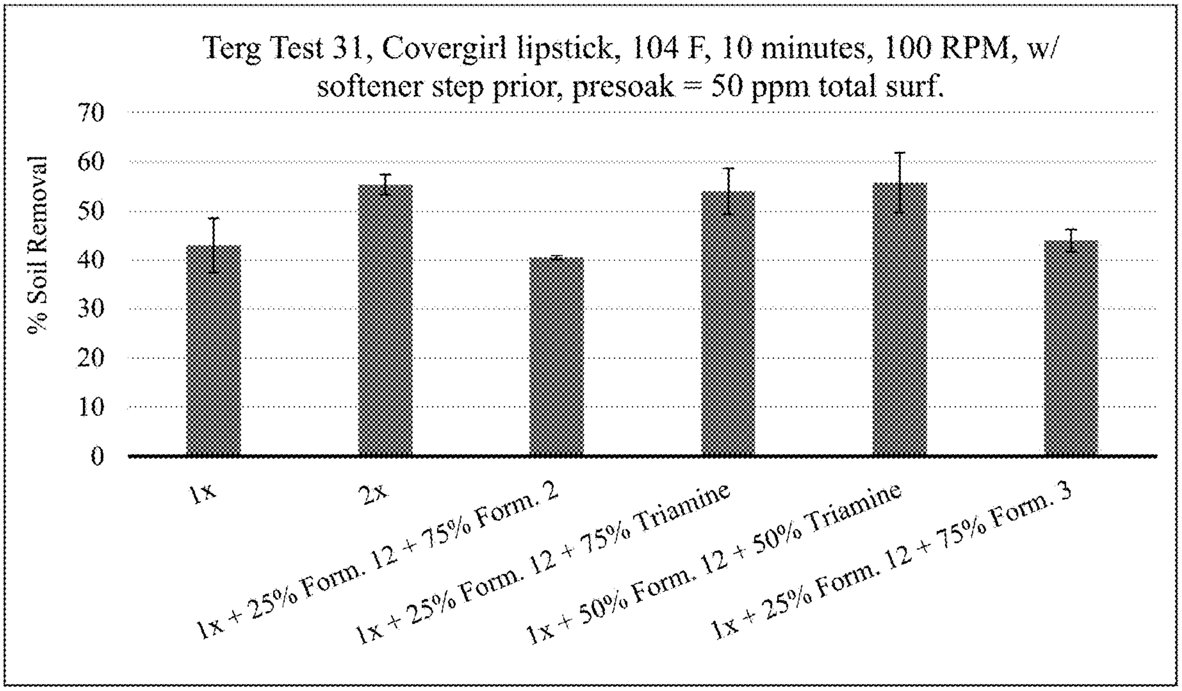
FIG. 17 shows the results of a tergotometer test assessing soil removal of Covergirl lipstick cosmetic soil and using presoak compositions and a softener.
Figure 18:
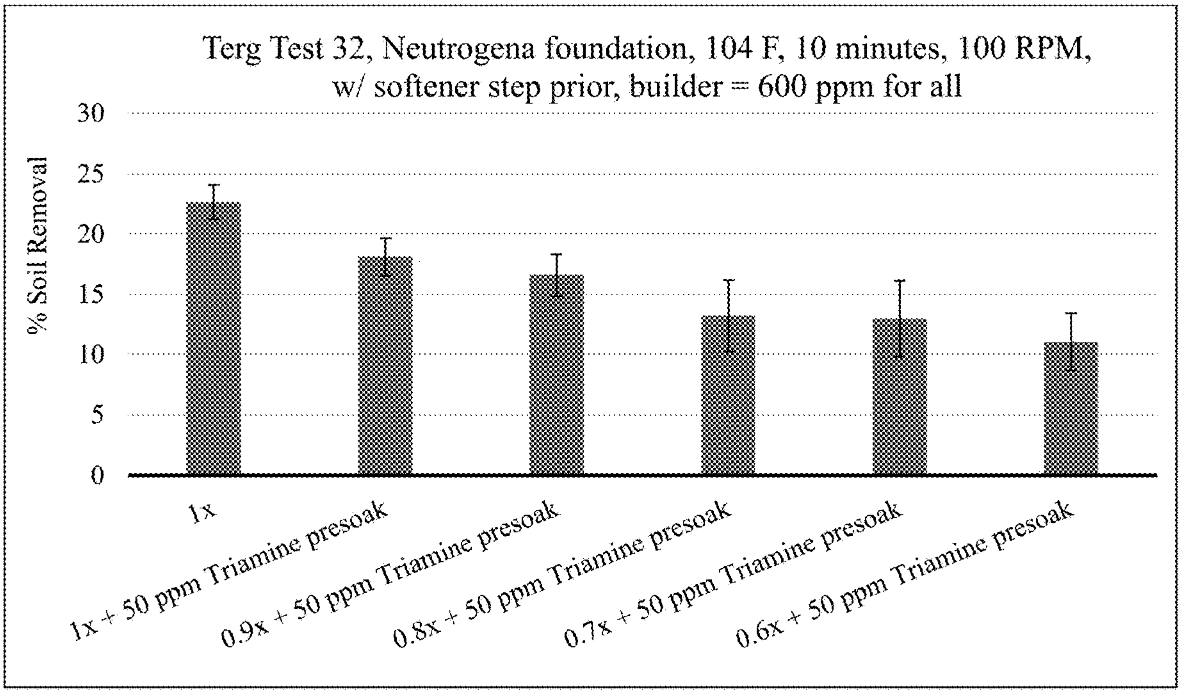
FIG. 18 shows the results of a tergotometer test assessing soil removal of Neutrogena cosmetic soil and using presoak compositions and a softener step.
Figure 19:
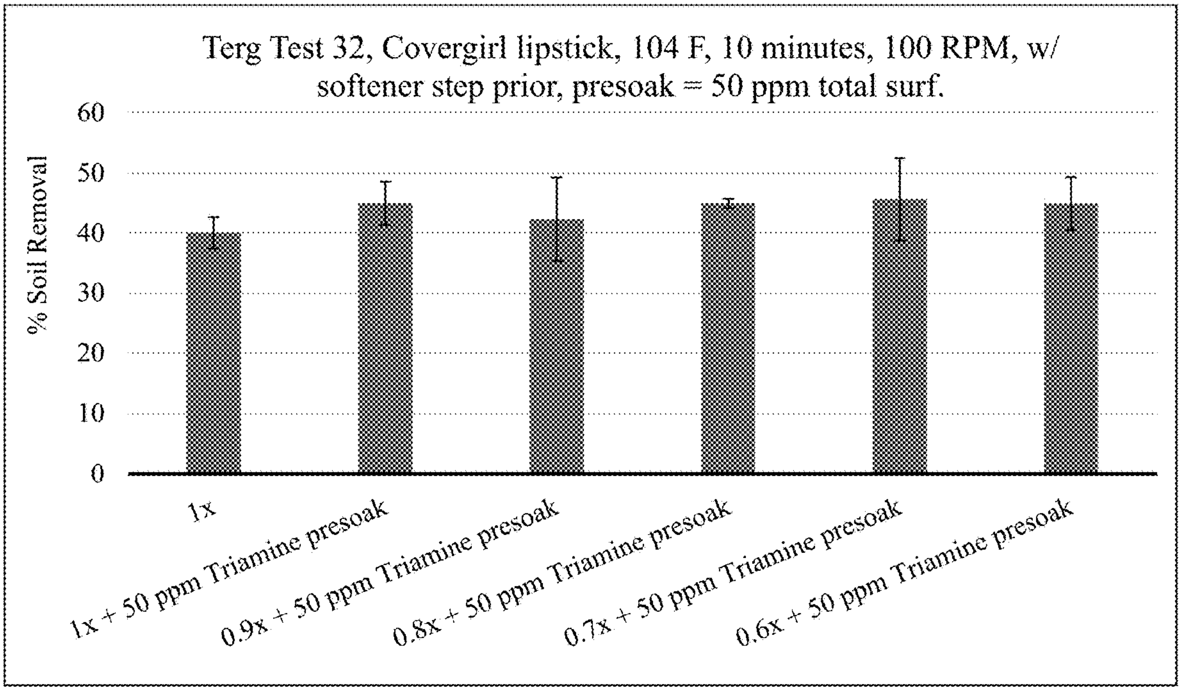
FIG. 19 shows the results of a tergotometer test assessing soil removal of Covergirl lipstick cosmetic soil and using presoak compositions and a softener.
Figure 20:
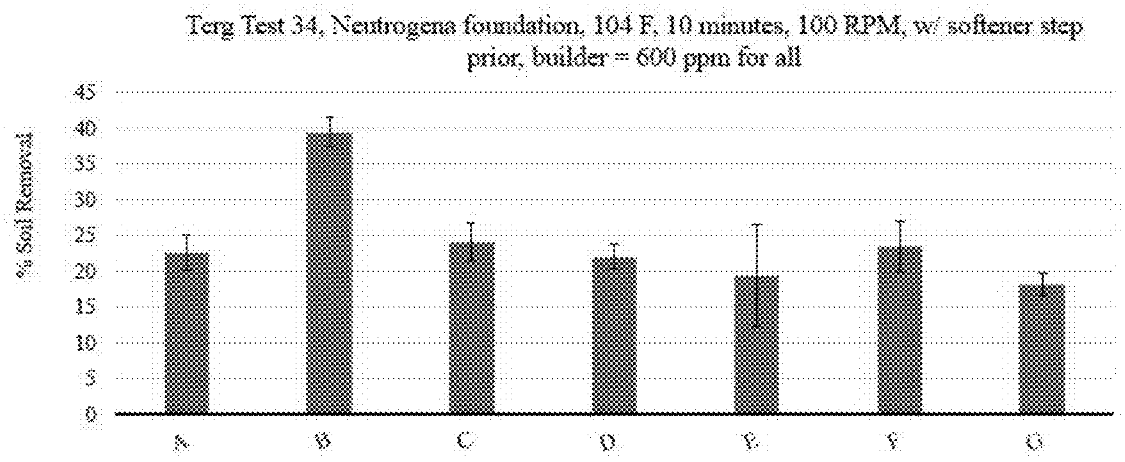
FIG. 20 shows the results of a tergotometer test assessing soil removal of Neutrogena cosmetic soil and using presoak compositions, a softener, and a builder.
Figure 21:
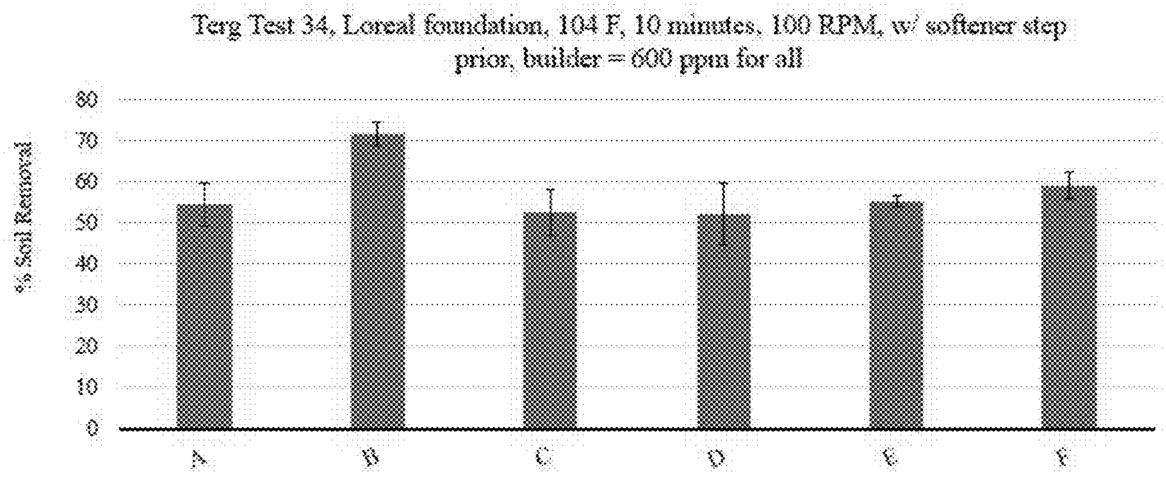
FIG. 21 shows the results of a tergotometer test assessing soil removal of L'oreal foundation cosmetic soil and using presoak compositions, a softener, and a builder.
Figure 22:
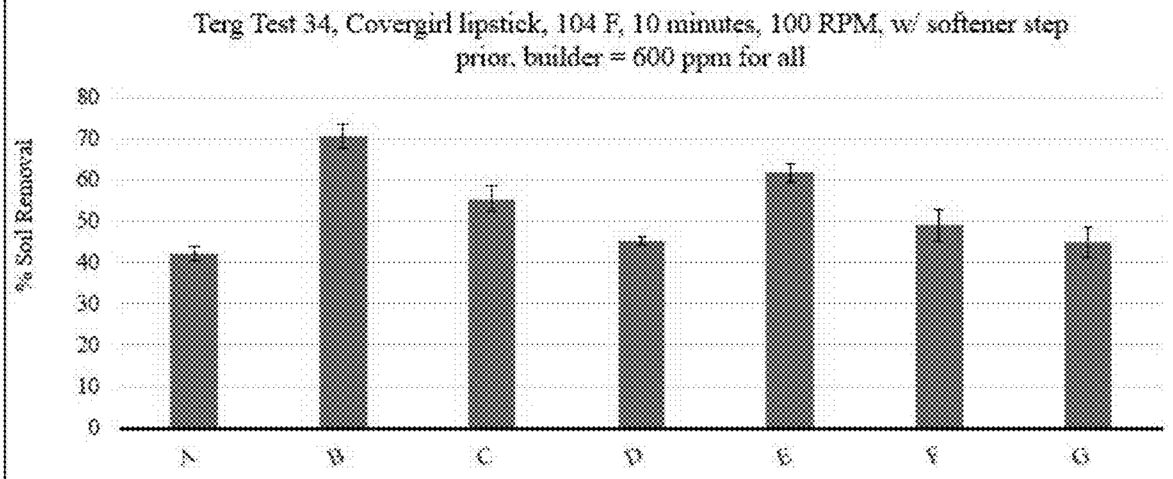
FIG. 22 shows the results of a tergotometer test assessing soil removal of Covergirl lipstick cosmetic soil and using presoak compositions, a softener, and a builder.

As shown in FIG. 6, both of the example compositions demonstrated substantially improved softness scores compared to the scoured control. Additionally, as illustrated in FIG. 7, the example compositions provided superior resilience, namely a lower resilience score indicative of a less stiff fabric, as compared to the scoured control. FIGS. 6 and 7 collectively indicate that beneficially the compositions are compatible with fabric softening and other fabric treatment applications, as they do not lead to any decline in softness or increase in stiffness.

Example 7

Further soil removal assessments were conducted using the tergotometer method of Example 1. Example compositions, including silicone control compositions, were prepared according to Table 7 below.

TABLE 7

| Example No. | Cationic Amine | Epoxide |
|---|---|---|
| Form. 1 | Pentaethylenehexamine | C12-C14 alkyl glycidyl ether |
| Form. 2 | Pentaethylenehexamine | C12-C14 alkyl glycidyl ether |
| Form. 3 | Pentaethylenehexamine | 1,2-epoxydodecane |
| Form. 4 | Pentaethylenehexamine | 1,2-epoxydodecane |
| Form. 5 | Tetraethylenepentamine | C12-C14 alkyl glycidyl ether |
| Form. 6 | Tetraethylenepentamine | C12-C14 alkyl glycidyl ether |
| Form. 7 | Diethylenetriamine | C8-C10 alkyl glycidyl ether |
| Form. 8 | Tris(2-aminoethyl)amine | C12-C14 alkyl glycidyl ether |
| Form. 9 | Tris(2-aminoethyl)amine | C12-C14 alkyl glycidyl ether |
| Form. 10 | Pentaethylenehexamine | 1,2-epoxytetradecane |
| Form. 11 | Pentaethylenehexamine | 1,2-epoxyhexadecane |
| Form. 12 | Pentaethylenehexamine | 1,2-epoxyhexadecane |
| Form. 13 | Silicone | |
| Form. 14 | Silicone | |
| Form. 15 | Triethylenetetramine | C12-C14 alkyl glycidyl ether |
| Form. 16 | Triethylenetetramine | C8-C10 alkyl glycidyl ether |
| Form. 17 | Ethyleneimine E-100 | C12-C14 alkyl glycidyl ether |
| Form. 18 | Pentaethylenehexamine | C12-C14 alkyl glycidyl ether |
| Form. 19 | Pentaethylenehexamine | 1,2-epoxy dodecane |
| Form. 20 | Tetraethylenepentamine | C12-C14 alkyl glycidyl ether |
| Form. 21 | Tetraethylenepentamine | C12-C14 alkyl glycidyl ether |
| Form. 22 | Diethylenetriamine | C8-C10 alkyl glycidyl ether |
| Form. 23 | Silica nanoparticles | |
| Form. 24 | Silica nanoparticles | |

The ratio of epoxide to cationic amine ranged from about 1:1 to about 1:5. The ability of the compositions to remove soil from soiled swatches was assessed using the procedures of Example 1. Controls evaluated included the ClearlySoft composition, which comprises a traditional quaternary ammonium fabric softener and an aminofunctional silicone. The Results are shown in the Figures and the Table below.

TABLE 8

| Sample No. | Soil Type | Form. No. | Detergent Concentration | Pre-Soak Concentration | Avg. Soil Removal |
|---|---|---|---|---|---|
| 1 | Neutrogena Foundation | n/a | 1x | n/a | 16.46292 |
| 2 | Neutrogena Foundation | n/a | 2x | n/a | 39.52249 |
| 3 | Neutrogena Foundation | Form. 1 | 1x | 500 ppm | 19.23027 |
| 4 | Neutrogena Foundation | Form. 2 | 1x | 500 ppm | 22.75517 |
| 5 | Neutrogena Foundation | Form. 3 | 1x | 500 ppm | 13.65134 |
| 6 | Neutrogena Foundation | Form. 4 | 1x | 500 ppm | 16.73899 |
| 7 | Neutrogena Foundation | Form. 5 | 1x | 500 ppm | 9.396339 |
| 8 | Neutrogena Foundation | Form. 6 | 1x | 500 ppm | 5.687766 |
| 9 | Neutrogena Foundation | Form. 7 | 1x | 500 ppm | 9.887381 |
| 10 | Neutrogena Foundation | n/a | 1x | n/a | 21.98576 |
| 11 | Neutrogena Foundation | n/a | 1x | n/a | 44.75541 |
| 12 | Neutrogena Foundation | Form. 2 | 1x | 10 ppm | 23.01246 |
| 13 | Neutrogena Foundation | Form. 2 | 1x | 30 ppm | 18.24429 |
| 14 | Neutrogena Foundation | Form. 2 | 1x | 50 ppm | 15.99698 |
| 15 | Neutrogena Foundation | Form. 2 | 1x | 70 ppm | 16.3331 |
| 16 | Neutrogena Foundation | Form. 2 | 1x | 100 ppm | 24.39784 |
| 17 | Neutrogena Foundation | Form. 2 | 1x | 300 ppm | 22.0677 |
| 18 | Neutrogena Foundation | Form. 2 | 1x | 500 ppm | 26.64115 |
| 19 | Covergirl lipstick | n/a | 1x | n/a | 41.25786 |
| 20 | Covergirl lipstick | n/a | 1x | n/a | 66.48976 |
| 21 | Covergirl lipstick | Form. 2 | 1x | 10 ppm | 41.58263 |
| 22 | Covergirl lipstick | Form. 2 | 1x | 30 ppm | 45.16258 |
| 23 | Covergirl lipstick | Form. 2 | 1x | 50 ppm | 50.74993 |
| 24 | Covergirl lipstick | Form. 2 | 1x | 70 ppm | 45.92122 |
| 25 | Covergirl lipstick | Form. 2 | 1x | 100 ppm | 45.73911 |
| 26 | Covergirl lipstick | Form. 2 | 1x | 300 ppm | 67.13947 |
| 27 | Covergirl lipstick | Form. 2 | 1x | 500 ppm | 65.55433 |
| 28 | Neutrogena Foundation | Clearly Soft | 1x | n/a | 21.78227 |
| 29 | Neutrogena Foundation | Clearly Soft | 2x | n/a | 29.98506 |
| 30 | Neutrogena Foundation | Form. 8 | 1x | 500 ppm | 15.97975 |
| 31 | Neutrogena Foundation | Form. 9 | 1x | 500 ppm | 10.57214 |
| 32 | Neutrogena Foundation | Form. 10 | 1x | 500 ppm | 13.18476 |
| 33 | Neutrogena Foundation | Form. 11 | 1x | 500 ppm | 17.292698 |
| 34 | Covergirl lipstick | Clearly Soft | 1x | n/a | 41.98896 |
| 35 | Covergirl lipstick | Clearly Soft | 1x | n/a | 51.72327 |
| 36 | Covergirl lipstick | Form. 8 | 1x | 500 ppm | 51.27055 |
| 37 | Covergirl lipstick | Form. 9 | 1x | 500 ppm | 45.90308 |

TABLE 8-continued

| Sample No. | Soil Type | Form. No. | Detergent Concentration | Pre-Soak Concentration | Avg. Soil Removal |
|---|---|---|---|---|---|
| 38 | Covergirl lipstick | Form. 10 | 1x | 500 ppm | 48.74859 |
| 39 | Covergirl lipstick | Form. 11 | 1x | 500 ppm | 42.58288 |
| 40 | Neutrogena Foundation | Clearly Soft | 1x | n/a | 20.63578 |
| 41 | Neutrogena Foundation | Clearly Soft | 1x | n/a | 33.92868 |
| 42 | Neutrogena Foundation | 25% Form. 2 + 75% Form. 3 | 1x | 50 ppm | 23.5403 |
| 43 | Neutrogena Foundation | 50% Form. 3 + 50% N,N-Bis (3-aminopropyl) dodecylamine | 1x | 50 ppm | 23.96399 |
| 44 | Neutrogena Foundation | 50 Form. 2 + 50% N,N-Bis (3-aminopropyl) dodecylamine | 1x | 50 ppm | 19.72392 |
| 45 | Neutrogena Foundation | 75% Form. 3 + 25% N,N-Bis (3-aminopropyl) dodecylamine | 1x | 50 ppm | 13.48906 |
| 46 | Neutrogena Foundation | 50% Cationic amine + 50% Cotilps 739 | 1x | 50 ppm | 15.22058 |
| 47 | Neutrogena Foundation | Form. 13 | 2x | 50 ppm | 16.78445 |
| 48 | Neutrogena Foundation | Form. 14 | 1x | 50 ppm | 15.40821 |
| 49 | Covergirl lipstick | Clearly Soft | 1x | 50 ppm | 41.4837 |
| 50 | Covergirl lipstick | Clearly Soft | 1x | 50 ppm | 56.40303 |
| 51 | Covergirl lipstick | 25% Form. 2 + 75% Form. 3 | 1x | 50 ppm | 40.98709 |
| 52 | Covergirl lipstick | 50% Form. 3 + 50% N,N-Bis (3-aminopropyl) dodecylamine | 1x | 50 ppm | 47.31249 |
| 53 | Covergirl lipstick | 50% Form. 2 + 50% N,N-Bis (3-aminopropyl) dodecylamine | 1x | 50 ppm | 54.28656 |
| 54 | Covergirl lipstick | 75% Form. 3 + 25% N,N-Bis (3-aminopropyl) dodecylamine | 1x | 50 ppm | 49.92911 |
| 55 | Covergirl lipstick | 50% Cationic amine + 50% Cotilps 739 | 1x | 50 ppm | 47.71034 |
| 56 | Covergirl lipstick | Form. 13 | 1x | 50 ppm | 47.71034 |
| 57 | Covergirl lipstick | Form. 14 | 1x | 50 ppm | 37.59706 |
| 58 | Neutrogena Foundation | Clearly Soft | 1x | n/a | 22.38605 |
| 59 | Neutrogena Foundation | Clearly Soft | 2x | n/a | 35.17591 |
| 60 | Neutrogena Foundation | 25% Form. 12 + 75% Form. 2 | 1x | 50 ppm | 25.8557 |
| 61 | Neutrogena Foundation | 25% Form. 12 + 75% N,N-Bis (3-aminopropyl) dodecylamine | 1x | 50 ppm | 21.93355 |
| 62 | Neutrogena Foundation | 50% Form. 12 + 50% N,N-Bis (3-aminopropyl) dodecylamine | 1x | 50 ppm | 17.12682 |
| 63 | Neutrogena Foundation | 25% Form. 12 + 75% Form. 3 | 1x | 50 ppm | 15.03097 |
| 64 | Covergirl lipstick | Clearly Soft | 1x | n/a | 42.96001 |
| 65 | Covergirl lipstick | Clearly Soft | 2x | n/a | 55.37728 |
| 66 | Covergirl lipstick | 25% Form. 12 + 75% Form. 2 | 1x | 50 ppm | 40.44563 |

TABLE 8-continued

| Sample No. | Soil Type | Form. No. | Detergent Concentration | Pre-Soak Concentration | Avg. Soil Removal |
|---|---|---|---|---|---|
| 67 | Covergirl lipstick | 25% Form. 12 + 75% N,N-Bis (3-aminopropyl) dodecylamine | 1x | 50 ppm | 54.01982 |
| 68 | Covergirl lipstick | 50% Form. 12 + 50% N,N-Bis (3-aminopropyl) dodecylamine | 1x | 50 ppm | 55.79395 |
| 69 | Covergirl lipstick | 25% Form. 12 + 75% Form. 3 | 1x | 50 ppm | 43.96701 |
| 70 | Neutrogena Foundation | Clearly Soft | 1x | n/a | 22.66601 |
| 71 | Neutrogena Foundation | Clearly Soft | 1x | n/a | 18.09118 |
| 72 | Neutrogena Foundation | N,N-Bis (3-aminopropyl) dodecylamine | 0.9x | 50 ppm | 16.58909 |
| 73 | Neutrogena Foundation | N,N-Bis (3-aminopropyl) dodecylamine | 0.8x | 50 ppm | 13.20268 |
| 74 | Neutrogena Foundation | N,N-Bis (3-aminopropyl) dodecylamine | 0.7x | 50 ppm | 12.96569 |
| 75 | Neutrogena Foundation | N,N-Bis (3-aminopropyl) dodecylamine | 0.6x | 50 ppm | 11.04413 |
| 76 | Covergirl lipstick | Clearly Soft | 1x | n/a | 40.06664 |
| 77 | Covergirl lipstick | Clearly Soft | 1x | n/a | 44.97318 |
| 78 | Covergirl lipstick | N,N-Bis (3-aminopropyl) dodecylamine | 0.9x | 50 ppm | 42.29299 |
| 79 | Covergirl lipstick | N,N-Bis (3-aminopropyl) dodecylamine | 0.8x | 50 ppm | 44.96247 |
| 80 | Covergirl lipstick | N,N-Bis (3-aminopropyl) dodecylamine | 0.7x | 50 ppm | 45.65354 |
| 81 | Covergirl lipstick | N,N-Bis (3-aminopropyl) dodecylamine | 0.6x | 50 ppm | 44.93393 |
| 82 | Neutrogena Foundation | Clearly Soft | 1x | n/a | 22.65279 |
| 83 | Neutrogena Foundation | Clearly Soft | 2x | n/a | 39.48564 |
| 84 | Neutrogena Foundation | Cationic amine/ Dialkyl Quat | 1x | 100 ppm | 24.08123 |
| 85 | Neutrogena Foundation | Amine oxide/ Dialkyl Quat | 1x | 100 ppm | 22.03336 |
| 86 | Neutrogena Foundation | Cationic amine/ Multiesterquat | 1x | 100 ppm | 19.47567 |
| 87 | Neutrogena Foundation | Amine oxide/ Multiesterquat | 1x | 100 ppm | 23.3927 |
| 88 | L'oreal | Clearly Soft | 1x | n/a | 54.52384 |
| 89 | L'oreal | Clearly Soft | 2x | n/a | 71.61028 |
| 90 | L'oreal | Cationic amine/ Dialkyl Quat | 1x | 100 ppm | 52.56849 |
| 91 | L'oreal | Amine oxide/ Dialkyl Quat | 1x | 100 ppm | 52.0495 |
| 92 | L'oreal | Cationic amine/ Multiesterquat | 1x | 100 ppm | 55.23293 |
| 93 | L'oreal | Amine oxide/ Multiesterquat | 1x | 100 ppm | 59.01895 |
| 94 | Covergirl lipstick | Clearly Soft | 1x | n/a | 42.17915 |
| 95 | Covergirl lipstick | Clearly Soft | 2x | n/a | 70.71064 |
| 96 | Covergirl lipstick | Cationic amine/ Dialkyl Quat | 1x | 100 ppm | 55.40387 |
| 97 | Covergirl lipstick | Amine oxide/ Dialkyl Quat | 1x | 100 ppm | 45.13164 |
| 98 | Covergirl lipstick | Cationic amine/ Multiesterquat | 1x | 100 ppm | 61.69898 |
| 99 | Covergirl lipstick | Amine oxide/ Multiesterquat | 1x | 100 ppm | 48.96113 |

TABLE 8-continued

| Sample No. | Soil Type | Form. No. | Detergent Concentration | Pre-Soak Concentration | Avg. Soil Removal |
|---|---|---|---|---|---|
| 100 | Covergirl lipstick | n/a | 1x | n/a | 38.36696 |
| 101 | Covergirl lipstick | n/a | 2x | n/a | 52.19028 |
| 102 | Covergirl lipstick | Cationic amine- air | 1x | 100 ppm | 60.944121 |
| 103 | Covergirl lipstick | Cationic amine- tumble | 1x | 100 ppm | 62.11316 |
| 104 | Covergirl lipstick | Propane-1,3-diamine, n-[3-(tridecycloxy) propyl]-, branched (90-95%) - air | 1x | 100 ppm | 41.61303 |
| 105 | Covergirl lipstick | Propane-1,3-diamine, n-[3-(tridecycloxy) propyl]-, branched (90-95%) - tumble | 1x | 100 ppm | 42.78051 |
| 106 | Covergirl lipstick | C12-C14 alcohol ethoxylate (7EO) - air | 1x | 100 ppm | 34.65807 |
| 107 | Covergirl lipstick | C12-C14 alcohol ethoxylate (7EO) - tumble | 1x | 100 ppm | 36.76425 |
| 108 | Covergirl lipstick | Multiesterquat + Cationic amine- air | 1x | n/a | 52.80367 |
| 109 | Covergirl lipstick | Multiesterquat + Cationic amine- tumble | 1x | n/a | 56.0948 |
| 110 | Covergirl lipstick | Multiesterquat + Amine oxide - air | 1x | n/a | 52.63024 |
| 111 | Covergirl lipstick | Multiesterquat + Amine oxide - tumble | 1x | n/a | 57.02554 |
| 112 | Covergirl lipstick | Pressed Softener - air | 1x | 900 ppm | 49.78581 |
| 113 | Covergirl lipstick | Pressed Softener - tumble | 1x | 900 ppm | 54.29952 |
| 114 | Covergirl lipstick | n/a | 200 ppm C12-C14 alcohol ethoxylate (7EO) | n/a | 46.36221 |
| 115 | Covergirl lipstick | n/a | 200 ppm C12-C14 alcohol ethoxylate (7EO) | n/a | 49.07407 |

Example 8

Particle size of the compositions were assessed using a laser particle size analyzer, specifically the Horiba LA-950. Samples were loaded into the laser particle size analyzer and assessed for their particle size as expressed in diameter (μm). Particle size testing was used to determine whether the mixture of the compositions formed vesicles, and how much the vesicle structure differed from that of the hydrophobic delivery agent alone. If particles were on the order of 10 nm (micelle size as opposed to typical vesicle size), this was taken as an indication that vesicle formation was disrupted and the surfactant was solubilizing the hydrophobic agent. A range of 50 nm to 100 μm was considered acceptable for deposition in a treatment application.

Figure 24:
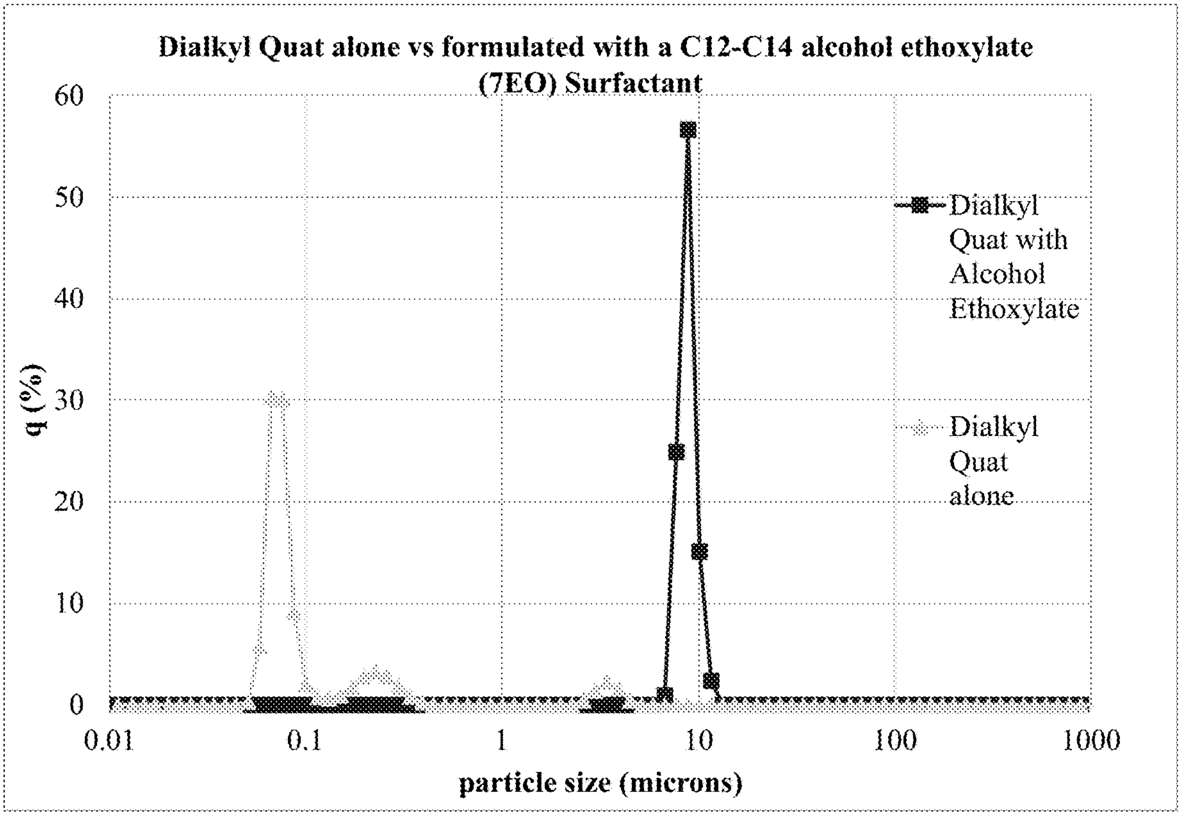
FIG. 24 depicts the results of a particle size analysis of compositions comprising a quaternary ammonium compound and a nonionic surfactant.

A first set of compositions was prepare comparing a dialkyl quaternary ammonium compound together with a 7 EO C12-14 alcohol ethoxylate nonionic surfactant, and the dialkyl quat alone. The combination of the quaternary ammonium and nonionic surfactant included a 85:20 ratio of quaternary ammonium to surfactant. The results of this analysis are shown in FIG. 24, which illustrates that the combination of the quaternary ammonium and surfactant provide a more uniform vesicle size distribution than the quaternary ammonium alone.

Figure 25:
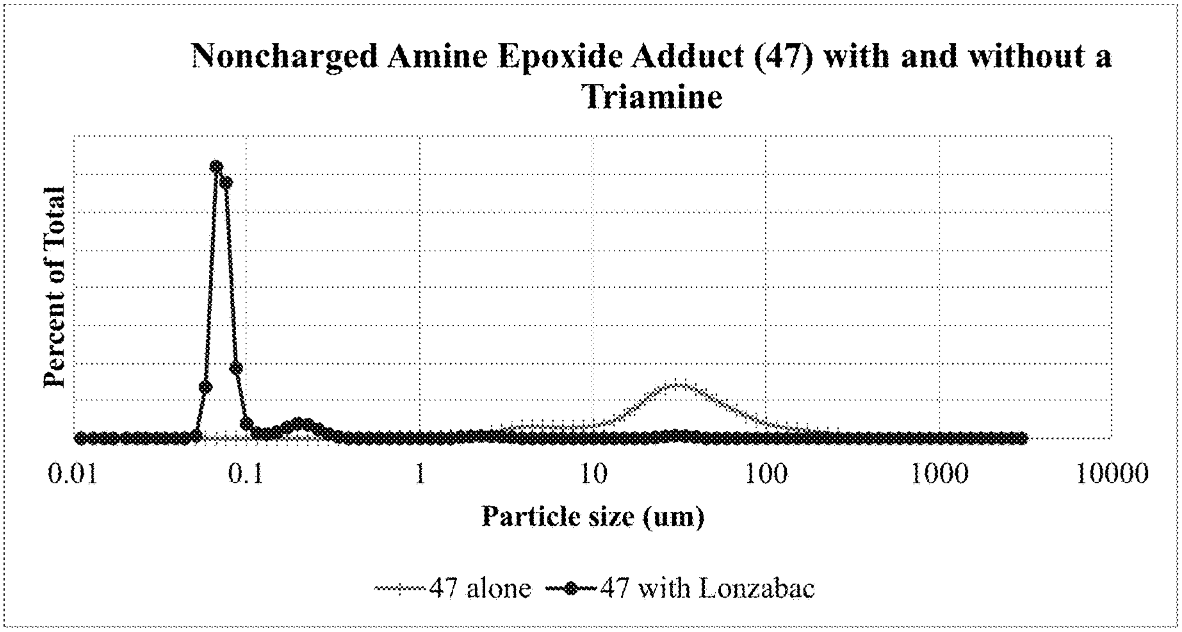
FIG. 25 shows the results of a particle size analysis of compositions comprising an amine epoxide adduct and a nonionic surfactant.

A second set of compositions was prepared comparing a non-charged amine epoxide adduct with and without a cationic amine surfactant, wherein the amine epoxide adduct and surfactant are provided in a ratio of 80:20. The results of this analysis are shown in FIG. 25, which illustrates that the combination of the adduct and surfactant resulted in a composition having particle size in the range indicative of vesicles and thus in the desirable size range for deposition.

The disclosures being thus described, it will be obvious that the same may be varied in many ways. Such variations are not to be regarded as a departure from the spirit and scope of the disclosures and all such modifications are intended to be included within the scope of the following claims.

The above specification provides a description of the manufacture and use of the disclosed compositions and methods. Since many embodiments can be made without departing from the spirit and scope of the disclosure, the disclosure resides in the claims.

What is claimed is:

1. A method of removing soil from a textile comprising:

washing a textile during a wash cycle, wherein the wash cycle comprises a pre-soak phase, a wash phase, a rinsing phase, a finishing phase, and an extraction phase;

applying a finishing composition to a surface of the textile during the finishing phase; the finishing composition comprising:

a branched cationic amine surfactant comprising N, N-bis(3-aminopropyl) dodecylamine; N1,N1,N3-tris (3-aminopropyl)-N3-dodecylpropane-1,3-diamine; N1,N1-bis(3-aminopropyl)-N3-dodecylpropane-1,3-diamine; N1-(3-aminopropyl)-N3-dodecylpropane-1,3-diamine; N-dodecylpropane-1,3-diamine; isotridecyloxypropyl-1,3-diaminopropane; N1-(3-(tridecyl-(branched)-alkyloxy) propyl) propane-1,3-diamine; N1,N1,N3-tris (3-aminopropyl)-N3-octadecyl-1,3-propanediamine; N1,N1,N3-tris (3-aminopropyl)-N3-dodecylpropane-1,3-diamine; N-(3-aminopropyl)-N-octadecyl-N-octadecyl propane-1,3-diamine; or a combination thereof;

one or more additional surfactants, wherein the one or more additional surfactants comprises a nonionic surfactant, semi-polar nonionic surfactant, a cationic surfactant, or a combination thereof; and a deposition aid comprising a quaternary ammonium compound, a silicone compound, an amine epoxide adduct, or a combination thereof; and wherein the finishing composition is applied in a concentration to deposit 10-200 ppm of the branched cationic amine surfactant to the surface of the textile, the deposited branched cationic amine surfactant remains on the surface of the textile after drying, and the deposited branched cationic amine provides improved removal of soil in a subsequent wash; and wherein the soil is removed from the textile.

2. The method of claim 1, wherein the method removes cosmetic and oily soils from the textile.

3. The method of claim 1, wherein the textile is a textile from the restaurant industry or hospitality industry.

4. The method of claim 3, wherein the textile is a tablecloth, napkin, uniform, apron, washcloth, dishcloth, mop, bedsheet, pillowcase, bedspread, towel, or robe.

5. The method of claim 1, wherein the nonionic surfactant comprises a fatty alcohol polyglycol ether, an alcohol ethoxylate, an alcohol alkoxylate, an EO/PO block copolymer, or a combination thereof.

6. The method of claim 1, wherein the finishing composition further comprises an alkalinity source.

7. The method of claim 6, wherein the alkalinity source is an alkali metal carbonate, an alkali metal hydroxide, a metal silicate, a metal borate, or a combination thereof.

8. The method of claim 1, wherein the quaternary ammonium compound comprises N,N-diethoxylated-N-coco-N-methylammonium chloride, di(hydrogenated) tallow dimethyl ammonium methyl sulfate ester quaternary ammonium, C12-C16 alkyl dimethyl benzyl ammonium chloride, decyl dimethyl octyl ammonium chloride, didecyl dimethyl ammonium chloride, dimethyl dioctyl ammonium chloride, N,N'-di(alkylcarboxyethyl)-N-hydroxyethyl-N-methylammonium methyl sulfate, or a combination thereof.

9. The method of claim 1, wherein the finishing composition comprises between about 30 wt. % to about 55 wt. % of the branched cationic amine surfactant, the one or more additional surfactants are present in an amount of between about 10 wt. % to about 70 wt. % of the one or more additional surfactants, between about 1 wt. % to about 75 wt. % of the deposition aid.

10. The method of claim 1, wherein the finishing composition is diluted to form a use solution, and wherein the branched cationic amine surfactant is present in the use solution in an amount of between about 50 ppm to about 200 ppm.

11. The method of claim 1, wherein the nonionic surfactant comprises a fatty alcohol polyglycol ether, an alcohol ethoxylate, an alcohol alkoxylate, an EO/PO block copolymer, or a combination thereof; and wherein the silicone compound is a compound according to the formula:

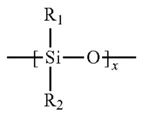

wherein $R_1$ and $R_2$ are each a $C_1$-$C_{10}$ alkyl, alkenyl radical, phenyl, substituted alkyl, or substituted phenyl group; and wherein x is a number from 50 to 300,000; wherein the substituted alkyl or substituted phenyl are substituted with a halogen, amino group, hydroxyl group, quaternary ammonium group, polyalkoxy group, carboxyl group, or nitro group.

12. The method of claim 1, wherein the textile is treated with between about 50 ppm to about 1000 ppm of the finishing composition.

13. The method of claim 1, wherein the finishing composition is a solid.

14. The method of claim 13, wherein the solid is in the form of a powder, a flake, a granule, a pellet, a tablet, a lozenge, a puck, a briquette, a brick, a solid block, or a unit dose.

15. The method of claim 1, wherein the finishing composition further comprises an enzyme.

16. The method of claim 1, wherein the silicone compound is a compound according to the formula:

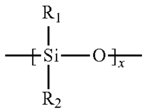

wherein $R_1$ and $R_2$ are each a C1-C10 alkyl, alkenyl radical, phenyl, substituted alkyl, or substituted phenyl group; and wherein x is a number from 50 to 300,000; and wherein the substituted alkyl or substituted phenyl are substituted with a halogen, amino group, hydroxyl group, quaternary ammonium group, polyalkoxy group, carboxyl group, or nitro group.

* * * * *